United States Patent
Donovan et al.

(10) Patent No.: US 11,926,021 B2
(45) Date of Patent: Mar. 12, 2024

(54) DRIVE SYSTEM CONFIGURED TO PROVIDE FRICTIONAL FIT ENGAGEMENT

(71) Applicant: Ttapdrive AS, Kristiansan (NO)

(72) Inventors: Steven P. Donovan, Roscoe, IL (US); David C. Goss, Rockford, IL (US); Olof Markus Ingemar Bergelin, Lerberget (SE); Jone Edland, Oslo (NO)

(73) Assignee: Ttapdrive AS, Kristiansand (NO)

(*) Notice: Subject to any disclaimer, the term of this patent is extended or adjusted under 35 U.S.C. 154(b) by 137 days.

(21) Appl. No.: 16/800,862

(22) Filed: Feb. 25, 2020

(65) Prior Publication Data
US 2020/0269398 A1    Aug. 27, 2020

Related U.S. Application Data

(60) Provisional application No. 62/810,750, filed on Feb. 26, 2019.

(51) Int. Cl.
*B25B 23/10* (2006.01)
*B25B 15/00* (2006.01)
(Continued)

(52) U.S. Cl.
CPC .......... *B25B 23/105* (2013.01); *B25B 15/004* (2013.01); *F16B 23/003* (2013.01); *B25B 23/0035* (2013.01)

(58) Field of Classification Search
CPC ..... B25B 15/02; B25B 15/004; B25B 15/005; B25B 15/007; B25B 15/008; B25B 23/00;
(Continued)

(56) References Cited

U.S. PATENT DOCUMENTS 2,397,216 A * 3/1946 Stellin ................. F16B 23/0038
                                                                411/404
3,273,442 A * 9/1966 Launay ............... F16B 23/0015
                                                                411/403
(Continued)

FOREIGN PATENT DOCUMENTS

WO    2017/031333 A1    2/2017
WO    2018/073153 A1    4/2018

OTHER PUBLICATIONS

International Search Report that issued in connection with PCT/NO2020/050051 dated Aug. 3, 2020.

*Primary Examiner* — Robert J Scruggs
(74) *Attorney, Agent, or Firm* — Quinn IP Law

(57) ABSTRACT

A drive system including a bit with a bit end configured to provide targeted frictional engagement with a fastener. The bit end has an outer leading wall tapered with respect to the bit end longitudinal axis at a leading wall angle selected from leading wall angle values ranging within a leading wall angle tolerance band and the fastener has an inner recess wall tapered with respect to the fastener longitudinal axis at a recess wall angle selected from recess wall angle values ranging within a recess wall angle tolerance band, wherein the leading wall angle values within the leading wall angle tolerance band and the recess wall angles values within the recess wall angle tolerance band do not overlap when the outer leading wall contacts the inner pilot recess wall at a targeted focal area to achieve a desired level of frictional engagement between the pilot end and the fastener.

22 Claims, 27 Drawing Sheets

(51) Int. Cl.
*F16B 23/00* (2006.01)
*B25B 23/00* (2006.01)

(58) Field of Classification Search
CPC ......... B25B 23/02; B25B 23/08; B25B 23/10; B25B 23/105; B25B 23/0035; F16B 23/003; F16B 23/0007
See application file for complete search history.

(56) References Cited

U.S. PATENT DOCUMENTS

| | | |
|---|---|---|
| 3,584,677 A | 6/1971 | Hammerton |
| 3,888,144 A * | 6/1975 | Parsons ............... F16B 23/0038 81/436 |
| 5,207,132 A | 5/1993 | Goss et al. |
| 2005/0172761 A1* | 8/2005 | Brooks ............... F16B 23/0038 81/439 |
| 2005/0172762 A1* | 8/2005 | Suzuki ................. B25B 15/005 81/460 |
| 2010/0269644 A1* | 10/2010 | Edland ............... F16B 23/0053 411/407 |
| 2014/0060268 A1 | 3/2014 | Goss |
| 2018/0106286 A1* | 4/2018 | Cone, III ............ F16B 23/0053 |

* cited by examiner

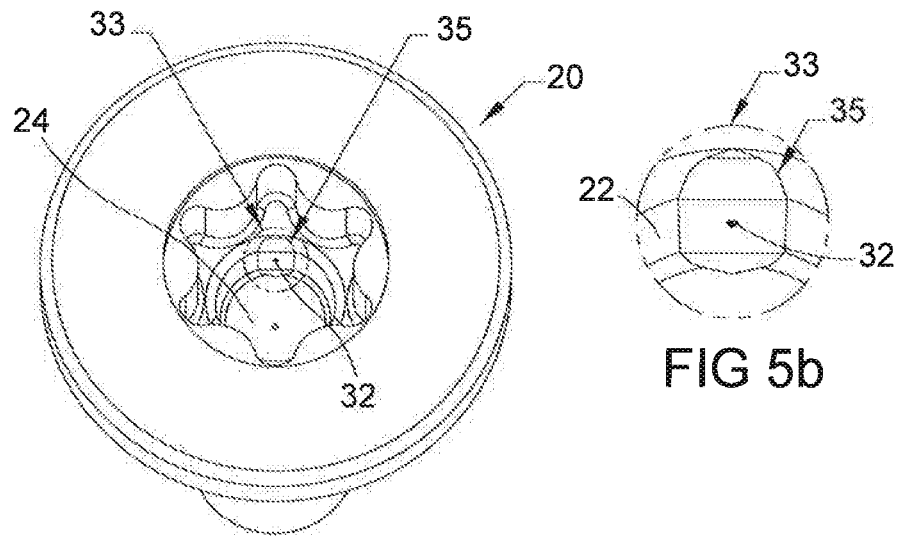
FIG 5a
FIG 5b
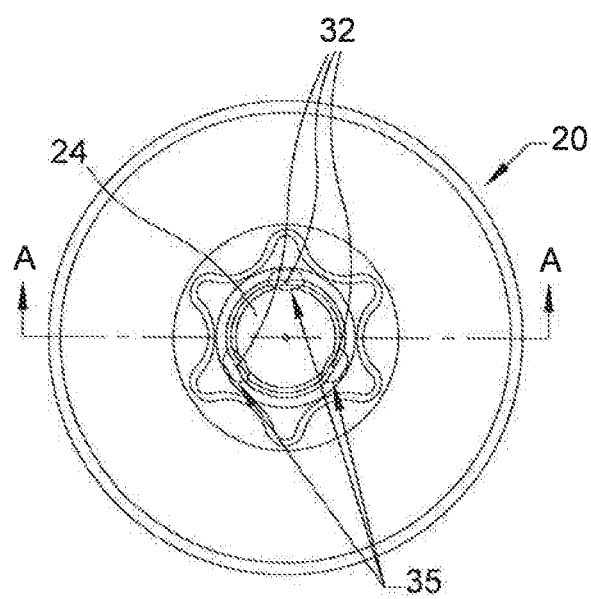
FIG 6
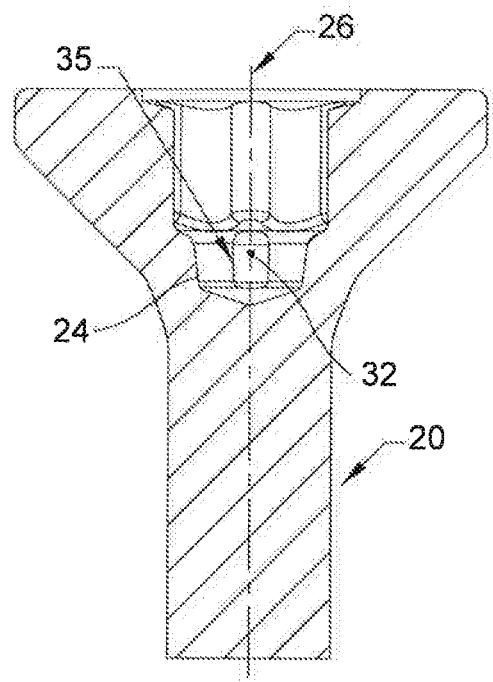
SECTION A-A
FIG 7

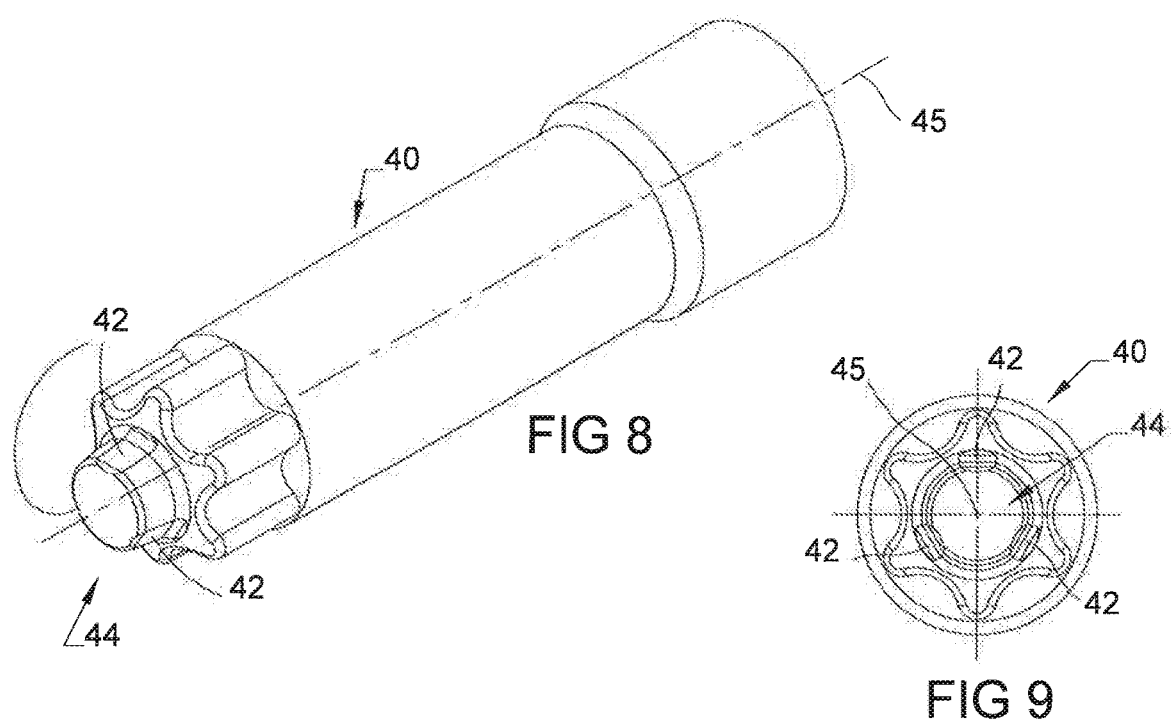
FIG 8
FIG 9
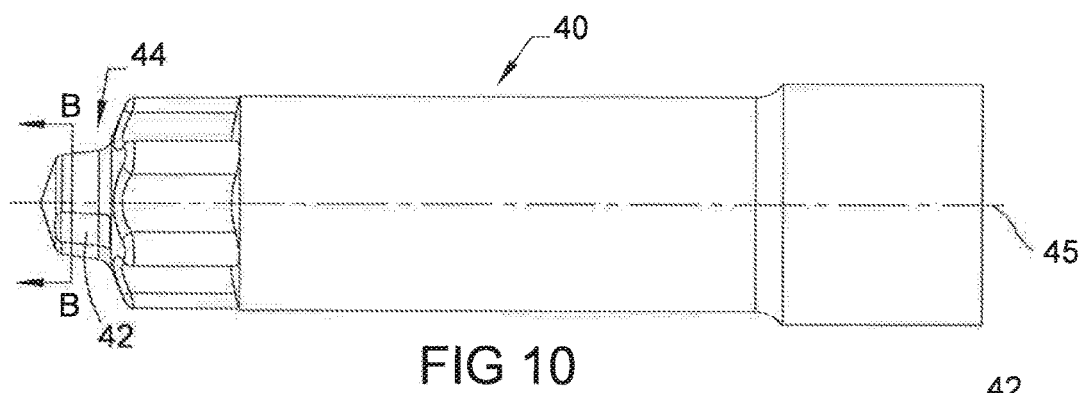
FIG 10
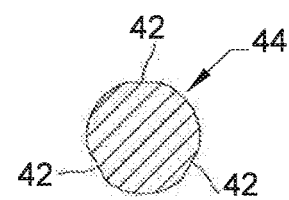
SECTION B-B
FIG 11

SECTION C-C

SECTION D-D

SECTION E-E

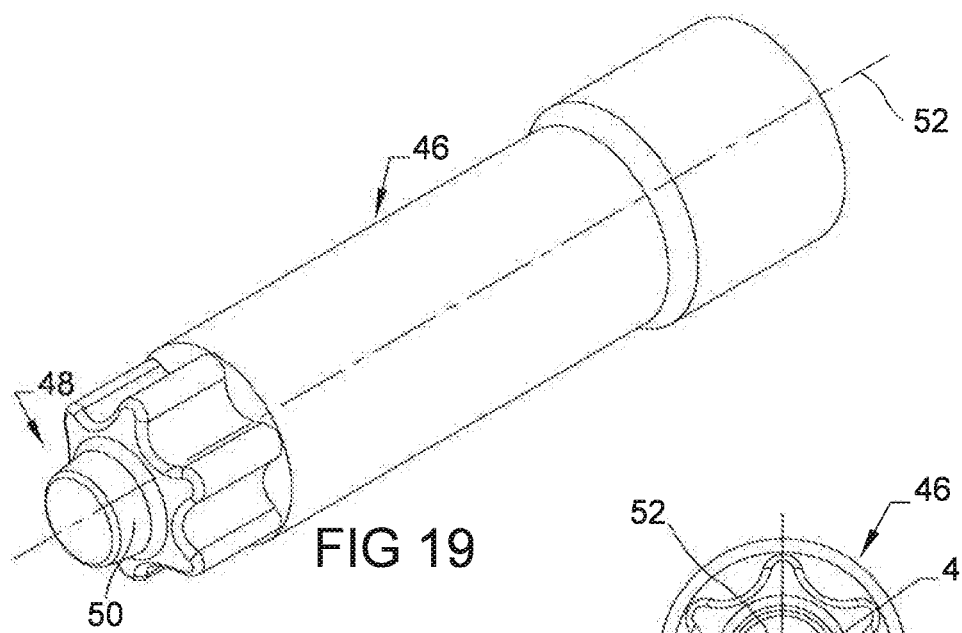
FIG 19
FIG 20
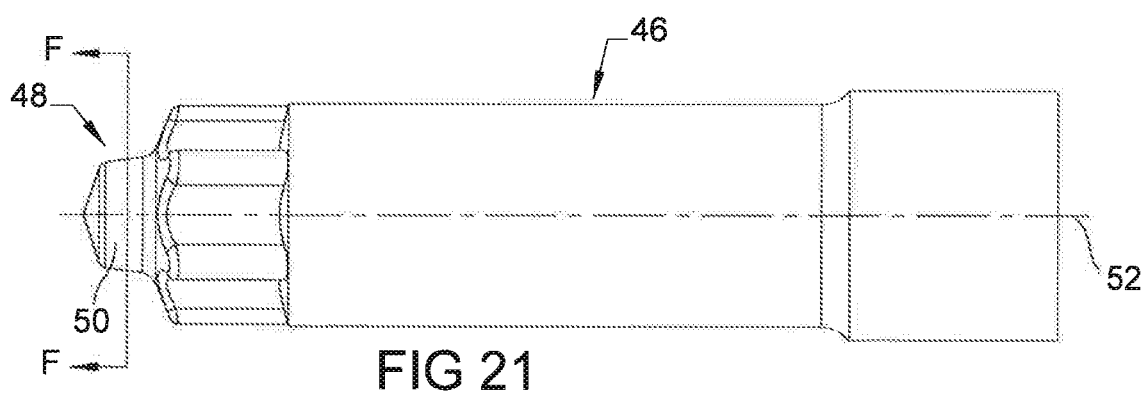
FIG 21
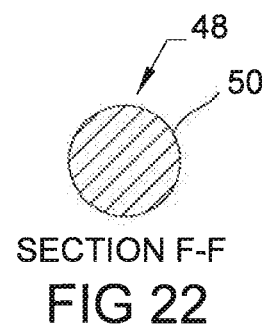
SECTION F-F
FIG 22

SECTION G-G

SECTION H-H

SECTION I-I

SECTION J-J

SECTION K-K

SECTION L-L

SECTION M-M

SECTION N-N

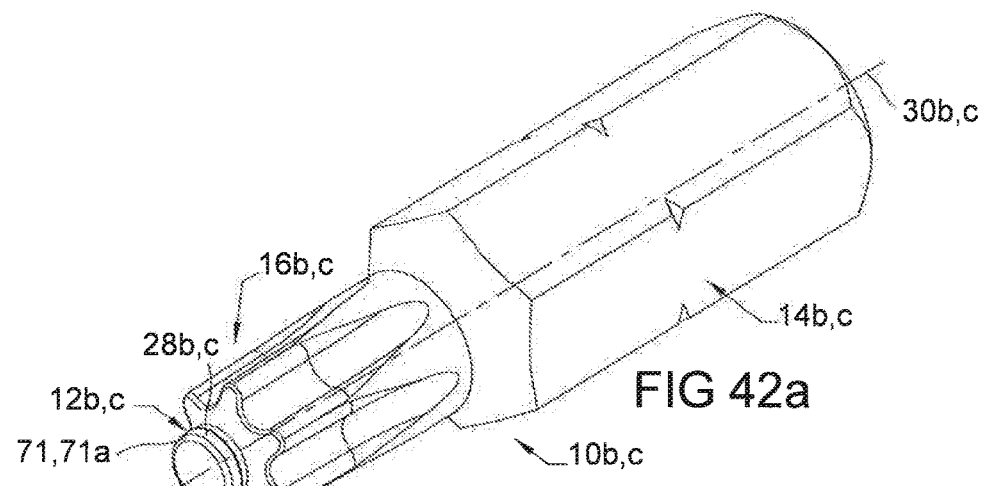
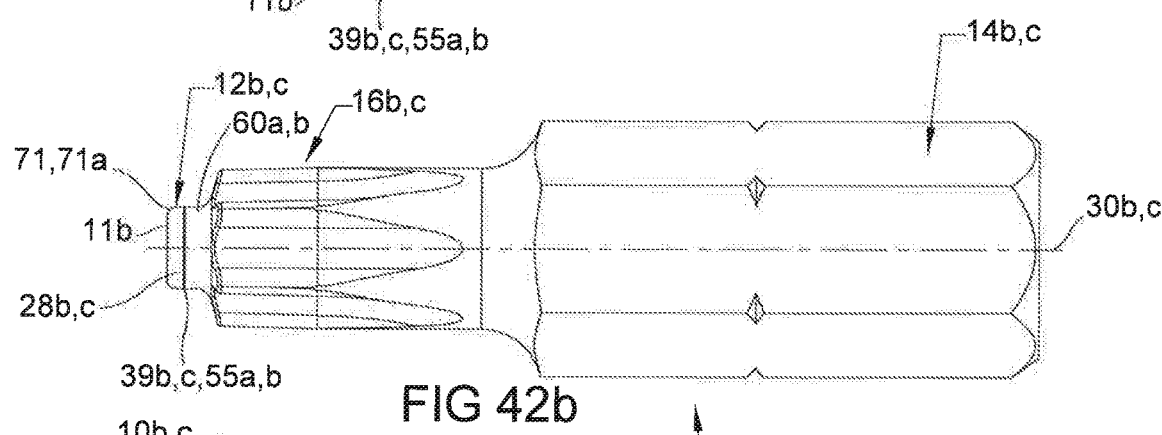
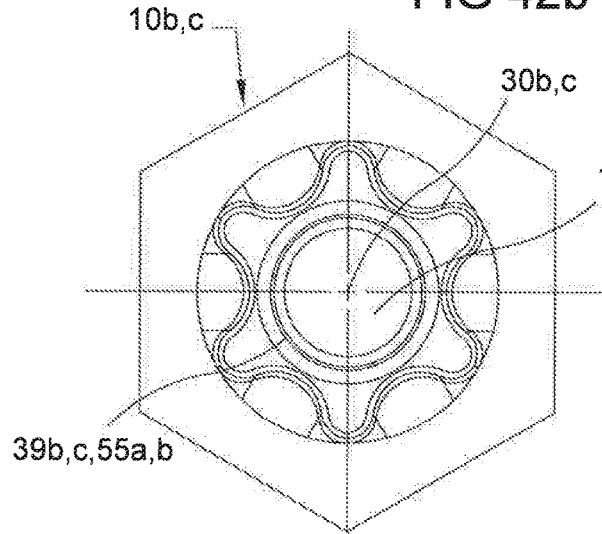
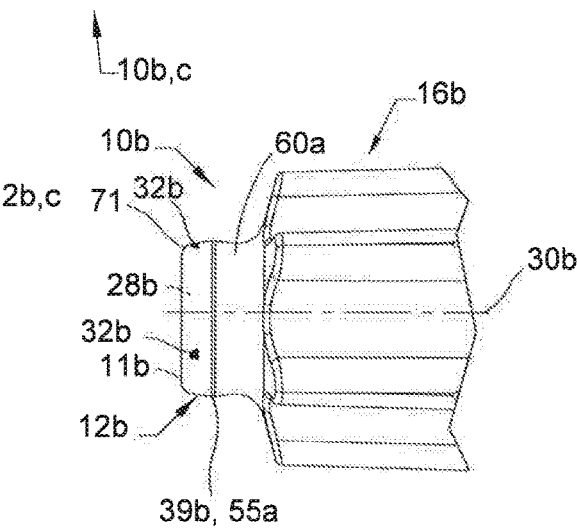

SECTION O - O

SECTION P-P

SECTION Q-Q

SECTION R-R

SECTION S-S

SECTION T-T

SECTION U-U

SECTION V-V

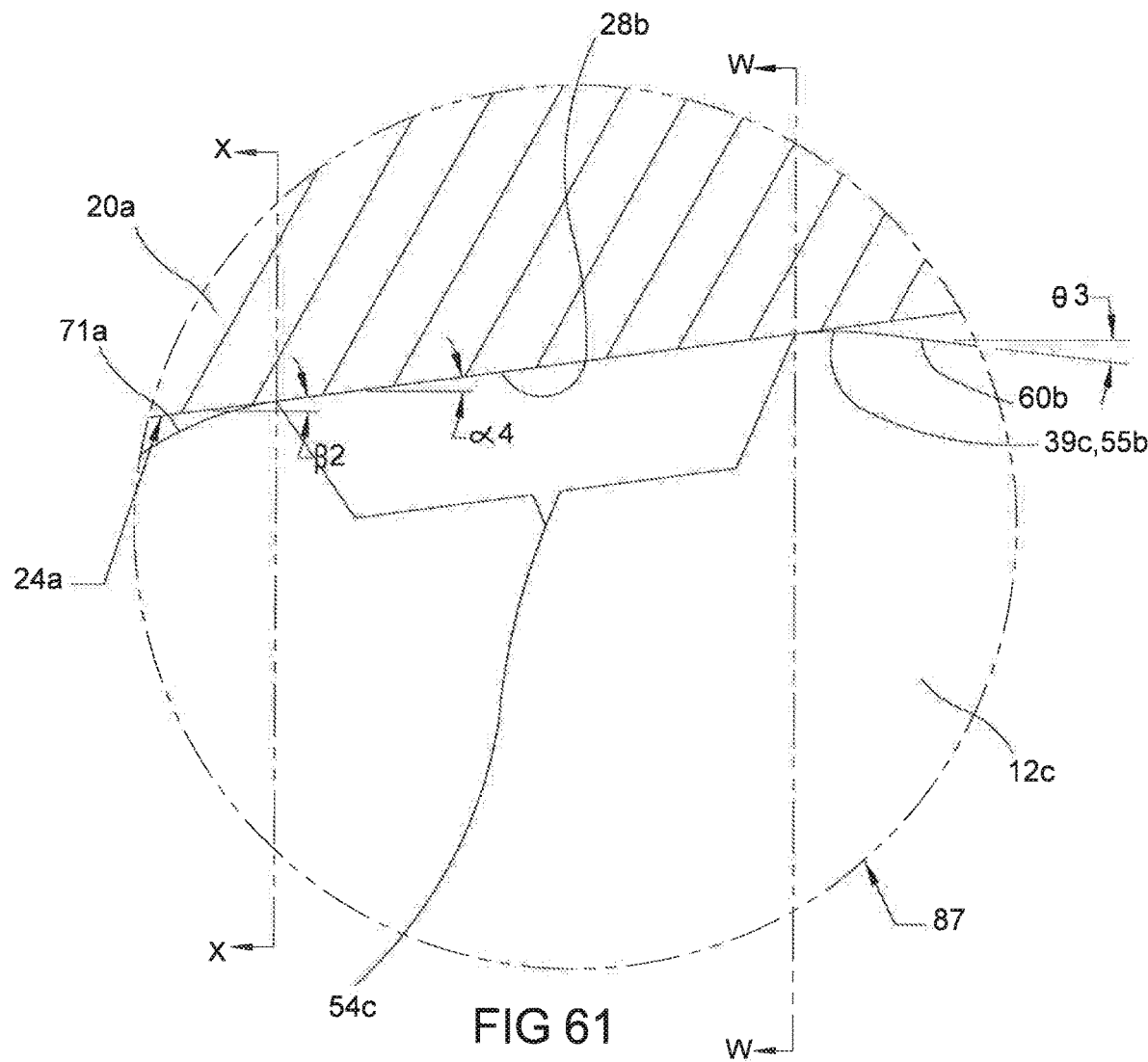

SECTION W-W

SECTION X-X

DRIVE SYSTEM CONFIGURED TO PROVIDE FRICTIONAL FIT ENGAGEMENT

RELATED APPLICATION (PRIORITY CLAIM)

This application claims the benefit of U.S. Provisional Application Ser. No. 62/810,750, filed on Feb. 26, 2019, and is hereby incorporated herein by reference in its entirety.

BACKGROUND

A typical drive system provides a fastener that has a recess in the head of the fastener and a corresponding drive bit that inserts into the recess for driving the fastener. Current drive systems, such as current multi-lobular drive systems, lack consistent and reliable frictional engagement between the drive bit and the recess, depending on the level of frication engagement, the fastener can be put on the drive bit before installation, and the fastener remains on the drive bit (due to a desired level of frictional engagement) without the fastener falling off.

In an attempt to provide a desired level of frictional engagement between the fastener and drive bit, current drive systems provide for a pilot recess down in the recess of the fastener which is configured to engage a corresponding pilot end of the drive bit such that the fastener tends to stay on the drive bit (i.e., before installation). In an attempt to provide consistency and reliability to that frictional engagement, drive systems are typically configured such that the angle of the pilot recess (i.e., the angle of the side wall of the pilot recess as the pilot recess extends down deeper into the fastener) matches with the angle of the pilot end of the drive bit but where an overlap in tolerance bands between the respective angles of the drive bit that engages the pilot recess and the pilot recess exists. This has proven to provide such a frictional engagement that is not necessarily consistent and reliable.

Friction holds the bit into the pilot recess and requires a predefined force, i.e., end load to push the bit into the pilot recess to achieve a desired level of frictional engagement between the bit pilot end and the pilot recess. The pilot recess may or may not be coated and depending on the desired level of frictional engagement between the bit pilot end and the pilot recess, either just the coating that is integrally formed with the pilot recess may be deformed or both the pilot recess including the coating may be deformed. The level of force to reach the desired level of frictional engagement varies based on the amount of elastic and non-elastic deformation desired on the recess; once a desired amount of deformation of the recess is reached, the desired frictional engagement has been achieved and the end load exerted on the bit can be stopped.

A light force that does cause any deformation in the recess enough to retain the fastener on the bit results in no engagement. A "friction fit", the lowest level of frictional engagement between the pilot end and the internal pilot recess is achieved when the bit is able to hold the weight of the fastener without disengaging from the fastener. A friction fit is achieved by applying enough force on the bit to elastically deform the internal pilot recess. A "jam fit", the highest level of frictional engagement between the pilot end and the internal pilot recess and is achieved when the bit sticks in the pilot recess but pulls out of a drive bit holder before pulling out of the pilot recess. A "jam fit" is achieved by applying enough force on the bit to have the internal pilot recess both elastically and non-elastically deformed with more non-elastic than elastic deformation of the recess. A "stick fit", the middle level of frictional engagement between the pilot end and the pilot recess, is achieved when the bit is able to hold the weight of the fastener without disengaging from the fastener but has more frictional engagement than with a friction fit.

A stick fit is achieved by applying enough force to the bit to have the internal pilot recess both elastically and non-elastically deformed with more elastic than non-elastic deformation of the recess.

SUMMARY

An embodiment of the invention provides a drive system that includes a drive bit that is configured to provide consistent and reliable frictional engagement with a fastener.

More particularly, in an embodiment of the invention, the drive system comprises: a drive bit including a pilot end having a pilot end surface extending between a drive portion and the pilot end surface, the drive bit including
  a pilot end longitudinal axis, and an outer leading wall that is tapered with respect to the pilot end longitudinal axis to define a leading wall angle selected from a plurality of leading wall angle values ranging within a leading wall angle tolerance band; and
  a fastener having an internal pilot recess that receives the drive bit, the internal pilot recess having a recess longitudinal axis and an inner pilot recess wall that is tapered with respect to the recess longitudinal axis to define a recess wall angle selected from a plurality of recess wall angle values ranging within a recess wall angle tolerance band; and wherein the plurality of leading wall angles within the leading wall angle tolerance band and the plurality of recess wall angles within the recess wall angle tolerance band do not overlap when the outer leading wall contacts the inner pilot recess wall at a targeted focal area to achieve a desired level of frictional engagement between the pilot end and the fastener.

The plurality of leading wall angle values are equal to or are between a maximum leading wall angle and a minimum leading wall angle; and the plurality of recess wall angle values are equal to or are between a maximum recess wall angle and a minimum recess wall angle.

A tolerance band gap equal to or greater than zero exists between the leading wall angle tolerance band and the recess wall angle tolerance band. When the tolerance band is greater than or equal to zero, there is no tolerance band overlap between the two respective tolerance bands when the plurality of leading wall angle values within the leading wall angle tolerance band do not overlap with the plurality of recess wall angle values within the recess wall angle tolerance band.

In an embodiment of the invention, when the tolerance band gap is greater than zero, then the minimum leading wall angle is greater than but not equal to the maximum recess wall angle. In another embodiment, the minimum leading wall angle is 0.13 percent greater than the maximum recess wall angle and the maximum leading wall angle is 38 percent greater than a minimum recess wall angle.

In the embodiment where the minimum leading wall angle is greater than but not equal to the maximum recess wall angle, the pilot end includes an apex defined by a maximum diameter of the pilot end, wherein the apex contacts the inner pilot recess wall at the targeted focal area defining at least one point of contact between apex and the inner pilot recess wall to form a frictional engagement with the fastener.

Alternatively, in another embodiment, the pilot end apex has an apex radius, wherein the targeted focal area is where a tangent of the apex radius longitudinally below the apex toward the pilot end surface contacts the inner pilot recess wall to form a frictional engagement between the pilot end and the inner pilot recess wall.

In both embodiments, 1) where the apex contacts the inner pilot recess wall or 2) where the tangent of the apex contacts the inner pilot recess wall, the internal pilot recess wall either includes: at least one flat integrally formed with the inner pilot recess wall, or a conical configuration with a round cross-section.

In an embodiment, the pilot includes a bit end radius extending between the pilot end surface and a lower portion of the outer leading wall, wherein the targeted focal area is at a tangent of the bit end radius longitudinally above and away from the pilot end surface when the bit end radius contacts the inner pilot recess wall to form a frictional engagement between the pilot end and the inner pilot recess wall.

In an embodiment of the invention that includes the bit end radius, when the tolerance band gap is greater than zero, the recess wall angle is less than the leading wall angle. More particularly, in an embodiment, a minimum recess wall angle is 0.14 percent greater than a maximum leading wall angle and a maximum recess wall angle is 35 percent greater than minimum leading wall angle.

In another embodiment of the pilot end including the bit end radius, when the tolerance band is equal to zero, the minimum recess wall angle is equal to the maximum leading wall angle. More particularly, in an embodiment, the minimum recess wall angle is equal to the maximum leading wall angle and the maximum recess wall angle is 32 percent greater than the minimum leading wall angle. The targeted focal area includes a line of contact between the outer leading wall and the inner pilot recess wall.

Additionally, in the embodiments of the pilot end that includes the bit end radius, the inner pilot recess wall either includes at least one flat integrally formed with the inner pilot recess wall, or a conical configuration with a round cross-section. When the inner pilot recess wall includes the at least one flat, the bit end radius contacts the inner pilot recess wall at the targeted focal area to form a line of contact between the outer leading wall and the at least one flat.

When the inner pilot recess wall includes the conical configuration with the round cross-section, the bit end radius contacts the inner pilot recess wall at the targeted focal area to form a circumferential line of contact between the outer leading wall and the inner pilot recess wall.

In the embodiments having the apex radius alone or in combination with the bit end radius, the pilot end further includes an optional back trailing wall that extends from the apex longitudinally upward towards the drive portion at a back taper angle to form a back taper, wherein the back taper angle is greater than the leading wall angle and is greater than the recess wall angle, and wherein back taper angle operates to prevent the outer leading wall from contacting the inner pilot recess wall at another point other than at the targeted focal area.

In each of the embodiments, the level of frictional engagement at a respective targeted focal area can range between a friction fit up to a jam fit between the pilot end and the inner pilot recess wall, depending on the desired amount of deformation desired on the inner pilot recess wall.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 5a is a perspective view of a top of a fastener having an internal pilot recess with recess flats on an inner recess wall that engages the fastener shown in FIG. 4.

FIG. 5b is an enlarged view of the encircled portion 33 shown in FIG. 5a.

FIG. 6 is a top view of the fastener shown in FIG. 5a.

FIG. 7 is a cross-sectional view taken along line A-A of FIG. 6.

FIG. 8 is a perspective view of the punch pin of a punch pin used to form the internal pilot recess in a head of the fastener shown in FIG. 5a.

FIG. 9 is an end view of the punch pin shown in FIG. 8.

FIG. 10 is a side view of the punch pin shown in FIG. 8.

FIG. 11 is a cross-sectional view taken along line B-B of FIG. 10.

FIG. 12a shows the drive bit shown in FIG. 4 engaged with the fastener shown in FIG. 5a.

FIG. 12b shows an enlarged view of encircled portion 37 shown in FIG. 12a.

FIG. 13a is a cross-sectional view taken along line C-C of FIG. 12b. 13b is an enlarged view of the encircled portion 29 of FIG. 13a.

FIG. 14a is a cross-sectional view taken along line D-D of FIG. 12b. 14b is an enlarged view of the encircled portion 41 of FIG. 14a.

FIG. 19 a side perspective view of a punch pin used to form the internal pilot recess in a head of the fastener shown in FIG. 16.

FIG. 20 is an end view of the punch pin shown in FIG. 19.

FIG. 21 is a side view of the punch pin shown in FIG. 19.

FIG. 22 is a cross-sectional view taken along line F-F of FIG. 21.

FIG. 23b shows an enlarged view of the encircled portion 47 shown in FIG. 23a.

FIG. 25b is an enlarged view of the encircled portion 51 of FIG. 25a.

FIG. 26b is a side view of the drive bit shown in FIG. 26a.

FIG. 27 is an end view of the drive bit shown in FIG. 26a.

FIG. 29b is an enlarged view of the encircled portion 33 shown in FIG. 29a.

FIG. 30 is a top view of the fastener shown in FIG. 29a.

FIG. 32b includes an enlarged view of encircled portion 53 shown in FIG. 32a.

FIG. 33b is an enlarged view of the encircled portion 53 of FIG. 33a.

FIG. 34b is an enlarged view of the encircled portion 59 of FIG. 34a.

FIG. 39b shows an enlarged view of encircled portion 61 shown in FIG. 39a.

FIG. 40b is an enlarged view of the encircled portion 63 of FIG. 40a.

FIG. 41b is an enlarged view of the encircled portion 65 of FIG. 41a.

FIG. 42a is a perspective view of a drive bit 10 that has a pilot end 12 that is in accordance with an embodiment of the invention.

FIG. 42b is a side view of the drive bit of FIG. 42a.

FIG. 43 is an end view of the drive bit of FIG. 42a.

FIG. 44 is a side view of a portion of the drive bit 10b shown in FIGS. 42a-42b and 43.

FIG. 45b is an enlarged view of the encircled portion 33a shown in FIG. 5a.

FIG. 46 is a top view of the fastener shown in FIG. 45a.

FIG. 48b provides an enlarged view of the encircled portion 67 shown in FIG. 48a.

FIG. 49b is an enlarged view of the encircled portion 69 of FIG. 48a.

FIG. 55b includes an enlarged view of encircled portion 73 shown in FIG. 55a.

FIG. 56b is an enlarged view of the encircled portion 75 of FIG. 56a.

FIG. 57b is an enlarged view of the encircled portion 77 of FIG. 575a.

FIG. 59b is an enlarged view of the encircled portion 83 of FIG. 56a.

FIG. 60b is an enlarged view of the encircled portion 85 of FIG. 60a.

FIG. 61 is a cross-sectional view of a pilot end of the drive bit shown in FIGS. 42a-44, and 55a in accordance with an embodiment of the invention.

FIG. 62b is an enlarged view of the encircled portion 89 of FIG. 62a.

FIG. 63b is an enlarged view of the encircled portion 91 of FIG. 63a.

DESCRIPTION OF ILLUSTRATED EMBODIMENTS

Figure 1:
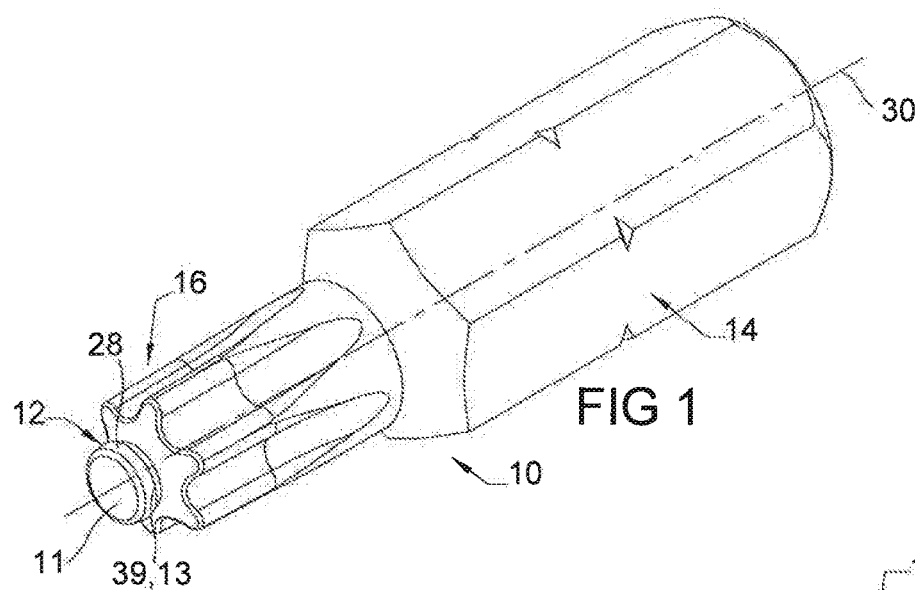
FIG. 1 is a perspective view of a drive bit in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 63A:
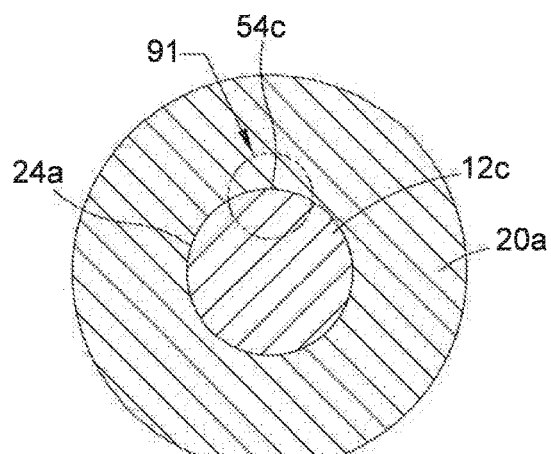
FIG. 63a is a cross-sectional view taken along line X-X of FIG. 61.
Figure 63B:
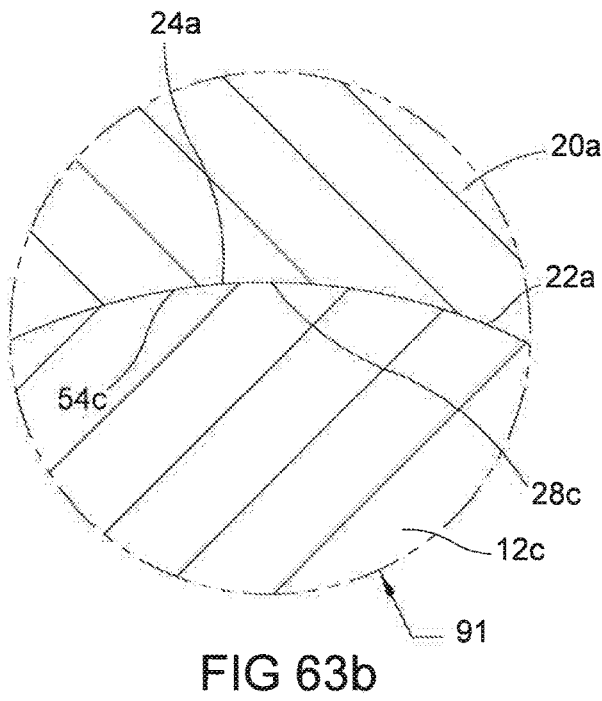

Generally shown with respect to FIGS. 1-63b are several embodiments of a drive system that each include a drive bit including a pilot end extending between a drive portion and a pilot end surface, the drive bit including pilot end longitudinal axis, and an outer leading wall that is tapered with respect to the pilot end longitudinal axis to define a leading wall angle having a plurality of leading wall angle values ranging within a leading wall angle tolerance band; and a fastener having an internal recess that receives the drive bit, the internal recess having a recess longitudinal axis and an inner pilot recess wall that is tapered with respect to the recess longitudinal axis to define a recess wall angle having a plurality of recess wall angle values ranging within a recess wall angle tolerance band; and herein the leading wall tolerance band and the recess wall tolerance band do not overlap when the pilot end outer leading wall contacts the inner pilot recess wall at a targeted focal area to achieve a desired level of frictional engagement between the pilot end and the fastener.

The plurality of leading wall angle values are equal to or are between a maximum leading wall angle and a minimum leading wall angle; and wherein the plurality of recess wall angle values are equal to or are between a maximum recess wall angle and a minimum recess wall angle.

Additionally, there is a tolerance band gap that is greater than or equal to zero when the leading wall angle tolerance band and the recess wall tolerance band do not overlap. When the tolerance band is negative, an undesirable overlap between the leading wall angle tolerance band and the recess wall tolerance band exists.

In one embodiment, the tolerance band gap is greater than zero when the minimum leading wall angle is greater than the maximum recess wall angle.

In another embodiment, the tolerance band gap is greater than or equal to zero when the minimum recess wall angle is greater than the maximum leading wall angle.

In another embodiment, the tolerance band gap is equal to zero when the minimum recess wall angle equals the maximum leading wall angle.

Referring now to the specific embodiments, in particular, FIGS. 1-25b illustrating several embodiments disclosed with respect to a drive bit 10 having a pilot end 12 shown in FIGS. 1-3 that in two different embodiments engages two different fastener recesses (discussed below in more detail below).

FIG. 1 is a perspective view of a drive bit 10 that has a pilot end 12 that is in accordance with an embodiment of the present invention.

Figure 2:
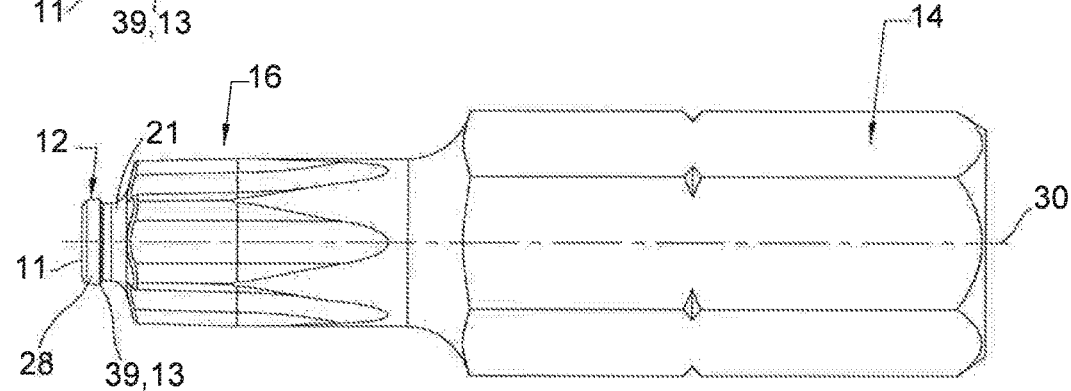
FIG. 2 is a side view of the drive bit shown in FIG. 1.
Figure 3:
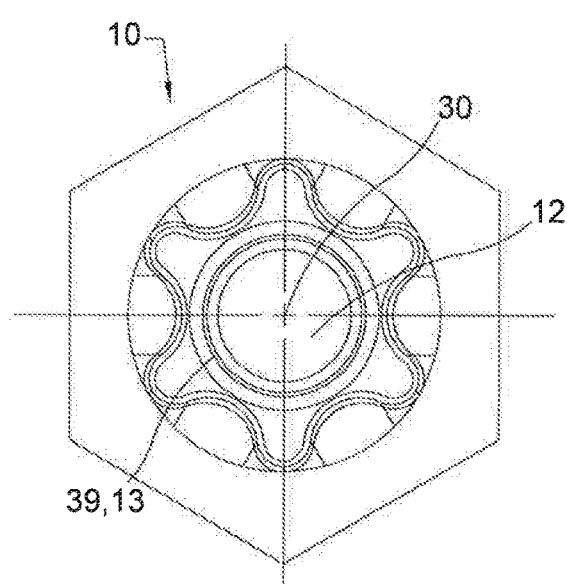
FIG. 3 is an end view of the drive bit shown in FIG. 1.

FIG. 2 is a side view of the drive bit 10, and FIG. 3 is an end view.

As shown in FIGS. 1-2, the drive bit 10 comprises a driver engaging portion 14 for engaging a driver (such as a hand tool, power tool, or automated driver), and a drive portion 16 for engaging and driving (i.e., rotating) a fastener recess. The drive portion 16 may take many forms such as a multi-lobular profile consistent with either U.S. Pat. No. 3,584,677 or 5,207,132, for example.

The drive bit 10 is configured such that it can engage many different fastener recess profiles. For example, the drive bit 10 can engage a fastener such as is disclosed in United States Patent Application Publication No. 2014/0060268, wherein the recess in the head of the fastener includes a recess pilot that includes a plurality of protrusions, such as flats or ribs, for engaging the pilot end 12 of the drive bit 10. Alternatively, the drive bit 10 can engage a fastener that has a conventional, round pilot recess. Still further, the drive bit 10 can engage fasteners having still other pilot recess profiles.

Also a pilot end 12 (shown in FIGS. 1-3) is integrally formed with the drive portion 16, wherein the pilot end 12 terminates at an end surface 11 (shown in FIGS. 4, 12b, and 23b as discussed in detail below) along a longitudinal axis 30 (also shown in FIGS. 4, 15, 12a, and 23a) and is configured to engage a pilot recess in a fastener, and is specifically configured to provide for consistent and reliable frictional engagement between the drive bit and the fastener. The embodiments disclosed herein are specifically directed at the pilot end 12 of the drive bit 10, and the other portions (i.e., portions 14, and 16) can very well be conventional.

As shown in FIGS. 1-2, the drive bit 10 includes the pilot end 12 extending between the drive portion 16 and pilot end surface 11 that defines an end of the pilot end 12 along a pilot longitudinal axis 30. The pilot end 12 further includes an outer leading wall 28 that is tapered with respect to the pilot end longitudinal axis 30.

FIG. 3 shows an end view of the drive bit 10 having the longitudinal axis 30. Regardless, the drive bit 10 is configured to engage the drive recess of a fastener and provide consistent and reliable frictional engagement relative thereto. How that is achieved will now be described.

In particular, FIGS. 1-4, 15, 12b, 23b, the pilot end 12 has an apex 39 with defined by a maximum diameter of the pilot end 12 with a minimal radius 13 and an undercut 21 (not shown in FIG. 3) that extends longitudinally above the apex 39 and terminates at the drive portion 16 along the longitudinal axis 30.

Referring now to the drive system embodiment shown in FIGS. 1-14b, having the pilot end 12 (shown in FIGS. 1-4, 12a-14b) that engages an internal pilot recess 24 (shown in FIGS. 5a-7, 12a-2b, 13b, and 13c).

Figure 4:
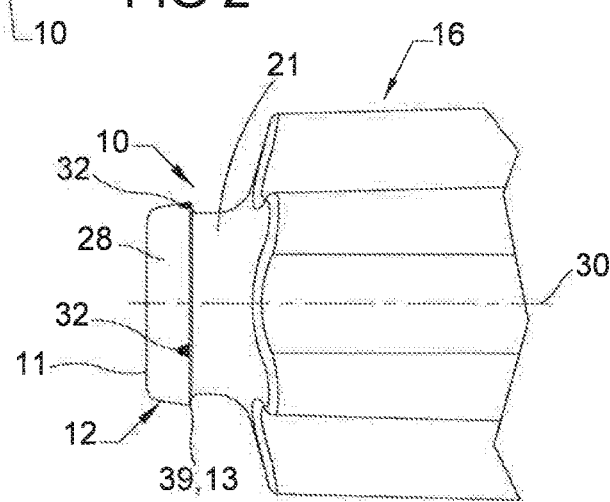
FIG. 4 is a side view of a portion of the drive bit shown in FIGS. 1-3 in accordance with an embodiment of the invention.

FIG. 4 is a side view of a portion of the drive bit 10 shown in FIGS. 1-3, namely an end portion of the drive bit 10 including the pilot end 12 terminating in the end surface 11, the pilot end 12 having the outer leading wall 28, showing two of the points of contact 32 between the pilot end 12 of the drive bit 10 and the fastener 20 as disclosed in more detail below. The pilot end 12 has an apex 39 (shown in FIGS. 1-4 and 12b) defined by a maximum diameter of the pilot end 12 with a minimal radius 13 (shown in FIGS. 1-4 and 12b) and an undercut 21 (shown in FIGS. 2-4, and 12b) that extends longitudinally above the apex 39 and terminates at the drive portion 16 along longitudinal axis 30.

FIGS. 5a and 5b are views of the fastener 20 (also shown in FIGS. 6, 7, 12a, 12b, 13a, 13b, 14a, and 14b) showing at least one point of contact 32 between the pilot end 12 of the drive bit 10 (shown in FIGS. 1-4) and the fastener 20. FIG. 5a is a perspective view of a top of the fastener 20, showing at least one point of contact 32 between pilot end 12 of the drive bit 10 and an internal pilot recess 24 of the fastener 20; and FIG. 5b is a an enlarged view of the encircled portion 33 showing an inner pilot recess wall 22 having at least one flat 35 integrally formed with the inner pilot recess wall 22.

Assuming that the pilot recess 24 includes three flats such as is disclosed in United States Patent Application Publication No. 2014/0060268, a plurality of contact points 32 result between the leading wall of the pilot end 12 of the drive bit 10 and the inner pilot recess wall 22 of the pilot recess 24 of the fastener 20.

FIG. 6 is a top view of the fastener 20, showing the points of contact 32 between the pilot fastener recess 24 at the flats 35 and the pilot end 12 (the points of contact 32 on the pilot end 12 are shown in FIGS. 4, 12a, 12b, 13a, and 13b.

Figure 12A:
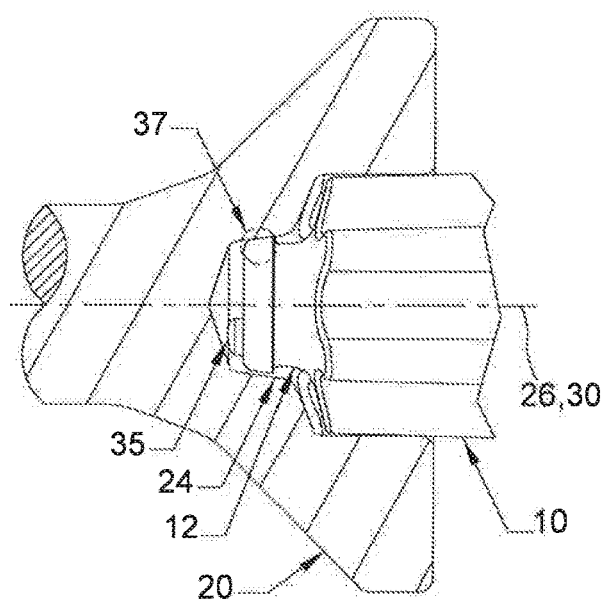

FIG. 7 is a cross-sectional view taken along line A-A of FIG. 6, showing the at least one point of contact 32 in the internal pilot recess 24 between pilot end 12 (the points of contact 32 on the pilot end 12 are shown in FIGS. 4, 12a, 12b, 13a, and 13b) and the pilot recess flat 35, the fastener having a longitudinal axis 26 (also shown in FIG. 12a).

FIGS. 8-11 are views that relate to a punch pin 40 that may be used to punch a recess into the head of a fastener to provide a pilot recess having at least one flat. Specifically, FIG. 8 is a perspective view of the punch pin 40; FIG. 9 is an end view; FIG. 10 is a side view; and FIG. 11 is a cross-sectional view taken along line B-B of FIG. 10.

As shown in FIGS. 8-10, the punch pin 40 includes (among other things) a longitudinal axis 45, punch pin flats 42 (shown in FIGS. 8-11) on a leading end 44 (also shown in FIG. 11) of the punch pin 40 that are configured to form the corresponding pilot recess flats 35 in the pilot recess 24 of the fastener 20 (shown in FIGS. 5a, 5b, 6, and 7). The punch pin 40 is preferably consistent with that which is disclosed in United States Patent Application Publication No. 2014/0060268, which is hereby incorporated herein by reference in its entirety.

Figure 12B:
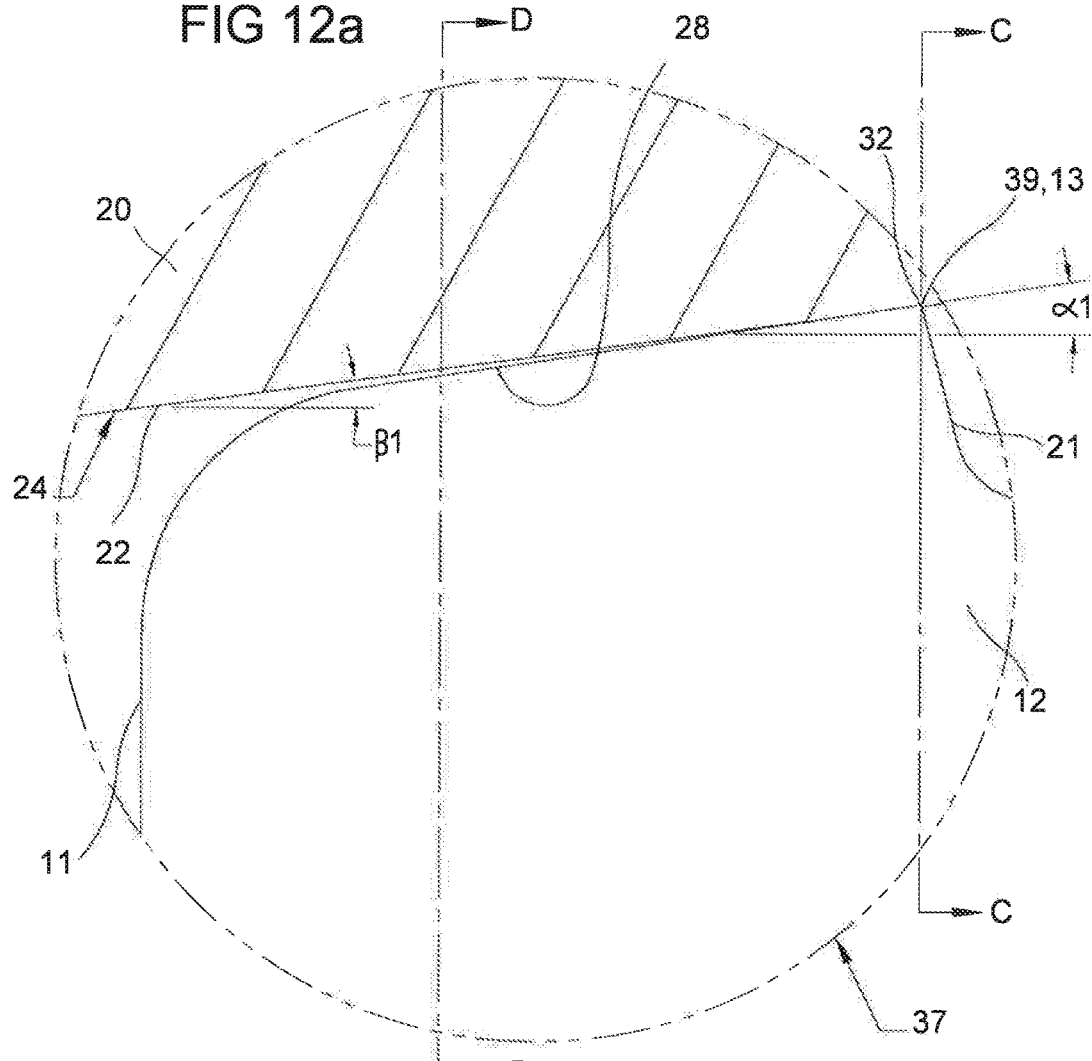

FIGS. 12a-12b show the drive bit 10 engaged with the fastener 20, wherein the fastener 20 is shown in cross-section (FIG. 12a), and FIG. 12b includes an enlarged view of encircled portion 37 shown in FIG. 12a.

As shown in FIGS. 12a and 12b show the bit 10 having all of the features disclosed with respect to FIGS. 1-4 having pilot end 12 (FIG. 12a-12b) engaging the fastener 20 (disclosed with respect to FIGS. 5a-7) in the pilot recess 24 at the at the at least one flat 35 (the internal pilot recess 24 shown engaged with the pilot 12 in FIGS. 12a, 12b, 13b and 14b).

As shown in more detail in FIG. 12b, the pilot end 12 outer leading wall 28 is tapered with respect to the pilot end longitudinal axis 30 to define a leading wall angle α1 that is selected from a plurality of leading wall angle values ranging within a leading wall angle tolerance band. Similarly, the inner pilot recess wall 22 is tapered with respect to the recess longitudinal axis 26 to define a recess wall angle β1 that is selected from a plurality of recess wall angle values ranging within a recess wall angle tolerance band.

The plurality of leading wall angle values are equal to or are between a maximum leading wall angle $α1_{max}$ and a minimum leading wall angle $α1_{min}$; and wherein the plurality of recess wall angle values are equal to or are between a maximum recess wall angle value $β1_{max}$ and a minimum recess wall angle value $β1_{mm}$.

A tolerance band gap exists between the leading wall angle tolerance band and the recess wall angle tolerance band. In an embodiment of the invention, when the leading wall angle is greater than the recess wall angle, the tolerance band gap is the difference between $α1_{min}$ and $β1_{max}$.

There is no overlap of the plurality of leading wall angle values within the leading wall angle tolerance band with the plurality of recess wall angle values within the recess wall angle tolerance band when the minimum leading wall angle $α1_{min}$ is greater than or equal to the maximum recess wall angle $β1_{max}$.

If the tolerance band gap is equal to or greater than zero, then the leading wall angle tolerance band and the recess wall angle tolerance band do not overlap.

In an embodiment, shown in FIG. 12b, the leading wall 28 of the pilot end 12 of the bit 10 is tapered at the angle α1, which is a greater than the angle β1 of the inner pilot recess wall 22 of the fastener 20. The relationship between: these two tapers and the apex is what provides the frictional engagement at the targeted focal area. The frictional engagement at the targeted focal area can range between a friction fit up to a jam fit depending on the desired amount of deformation desired on the inner pilot recess wall 22.

More particularly, in an embodiment shown in FIG. 12b, the $α1_{min}$ is greater than $β1_{max}$ by a tolerance band greater than zero, thereby ensuring that the apex 39 of the pilot end 12 contacts the inner pilot recess wall 22 only at the targeted focal area and nowhere else between the leading wall 28 and the inner pilot recess wall 22. Since the tolerance band gap is greater than zero, then there cannot be an overlap of the angles α1 and β1.

If the tolerance band gap is less than zero, then $α1_{min}$ may be less than $β1_{min}$ and then $α1_{min}$ would fall within the recess wall angle tolerance band and thus, there would be an overlap of the leading wall angle tolerance band with the recess wall angle tolerance band, which is undesirable and which could cause the leading wall 28 of the pilot end 12 to contact the inner pilot recess wall of the internal pilot recess 24 at another point or points other than at the targeted focal area.

In an embodiment of the invention, the tolerance band gap is greater than zero as shown in the chart below, which is the Tolerance band gap chart for pilot end 12 and inner pilot recess 24 (Chart 1).

CHART 1

| Leading Wall Angle α1 | | Recess Wall Angle β1 | | % Difference ($α1_{max}$ − $β1_{min}$)/$β1_{min}$ | % Difference ($α1_{min}$ − $β1_{max}$)/$β1_{max}$ |
|---|---|---|---|---|---|
| $α1_{max}$ | 10.00° | $β1_{max}$ | 7.75° | 38% | |
| $α1_{min}$ | 7.76° | $β1_{min}$ | 7.25° | | 0.13% |
| α1 Tolerance Band | 2.24° | β1 Tolerance Band | 0.50° | | |
| Tolerance Band Gap ($α1_{min}$ > $β1_{max}$) | 0.01°  ° | | | | |

As shown in Chart 1, the tolerance band gap in particular, is the difference between $α1_{min}$ and $β1_{max}$, wherein $α1_{min}$>$β1_{max}$, and thus, the tolerance band gap is greater than zero (shown as) 0.01° and no overlap occurs between the leading wall angle tolerance band (shown as 2.24°, which is the maximum span for the angle values for leading wall angle α1, i.e., $α1_{min}$<=$α1_{max}$) and the recess wall angle tolerance band (shown as 0.5°, which is the maximum span for the angle values for leading wall angle β1, i.e., $β1_{min}$<=$β1_{max}$).

In particular, as shown with respect to this non-limiting embodiment, the $α1_{min}$ (7.76°) is less than or equal to $α1_{max}$(10.00°), the leading wall angle tolerance band, 2.24°, is the difference between $α1_{max}$ and $α1_{min}$, (10.00°-7.76°), and the wherein the recess wall angle tolerance band, 0.50°, is the difference between $β1_{min}$ and $β1_{max}$ (7.75°-7.25°), In an embodiment of the invention, the tolerance band gap is the difference between $α1_{min}$ and $β1_{max}$, wherein $α1_{min}$>$β1_{max}$, thus $α1_{min}$(7.76°) is greater than $β1_{max}$ (7.75°) by the amount of the tolerance band gap (0.01°).

In this embodiment, the minimum leading wall angle $α1_{min}$ (7.76° is 0.13 percent greater than the maximum recess wall angle (7.75°) and the maximum leading wall angle (10.00°) is 38 percent greater than the minimum recess wall angle (7.25°). However, the embodiment described with respect to Chart 1 is not limited to the specific values for the variables disclosed in the chart as the chart is for illustrative purposes only.

However, in another embodiment, the angle α1 is greater than or equal to the angle β1.

As shown in FIG. 12b, the apex 39 having a minimal radius 13 of the pilot end 12 contacts the inner pilot recess wall 22 at a targeted focal area that defines the at least one point of contact 32 between apex 39 and the inner pilot recess wall 22 to form a frictional engagement with the fastener 20. The level of frictional engagement at the targeted focal area can range between a friction fit up to a jam fit depending on the desired amount of deformation desired on the inner pilot recess wall 22.

Figure 13A:
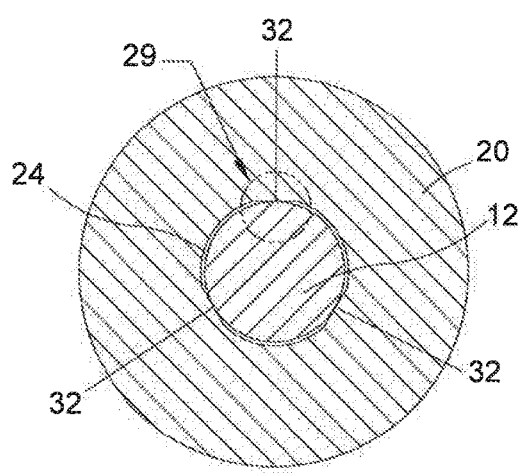
Figure 13B:
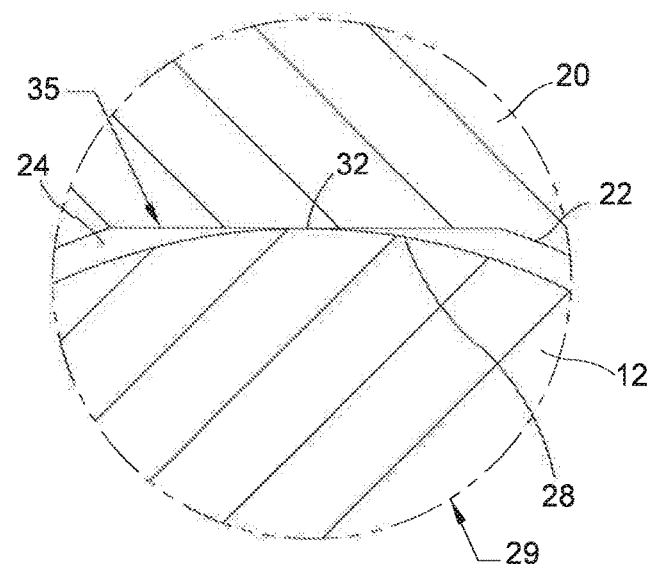

FIGS. 13*a* and 13*b* show more detailed views of the cross-sectional view taken along line C-C of FIG. 12*b*. More specifically, FIG. 13*a* is a cross-sectional view taken along line C-C of FIGS. 12*b*, and 13*b* is an enlarged view of the encircled portion 29 of FIG. 13*a*. FIGS. 13*a*, and 13*b* show the contact points 32 between the leading wall 28 (FIG. 13*b*) of the pilot end 12 of the drive bit 10 (shown in FIG. 12*a*) and the at least one pilot recess flat 35.

FIGS. 12*a*, 12*b*, 13*a*, and 13*b* show the frictional engagement between the pilot end 12 of the bit 10 and the pilot recess 24 of the fastener 20. As shown in FIGS. 12*a*, 12*b*, 13*a*, 13*b*, the targeted focal area includes the contact points 32 at the apex 39 of the pilot bit 12 (shown in FIG. 12*b*). When the apex 39 of leading wall 28 of the pilot end 12 engages the pilot recess 24 at the pilot recess flats 35 on the inner pilot recess wall 22 at the contact points 32, the highest stress concentrations occur in the recess pilot flats 35.

A stress occurs when an end load, i.e., force, is applied to the bit within the recess over the targeted focal area. The smaller the targeted focal area, the higher the stress as the stress is inversely proportional to the area of contact.

Figure 14A:
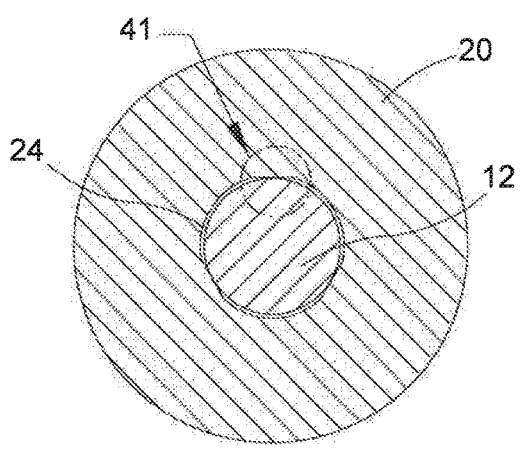
Figure 14B:
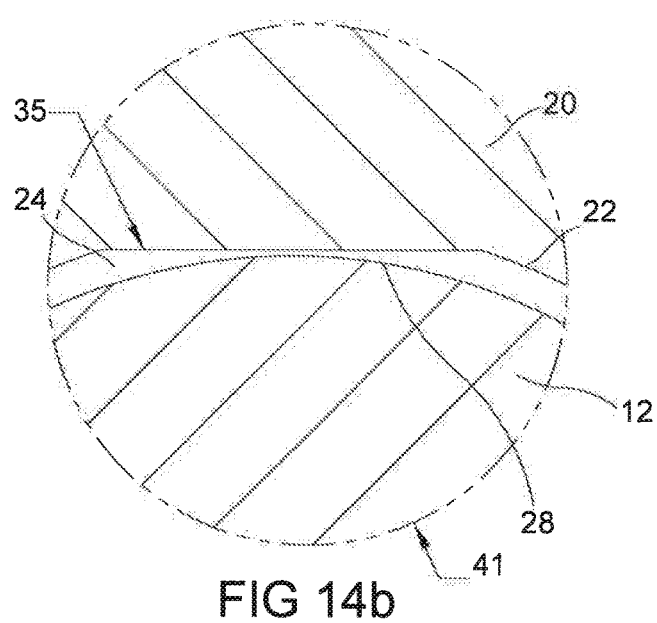

FIGS. 14*a* and 14*b* show more detailed views of the cross-sectional view taken along line D-D of FIG. 12*b* on a plane further down in the pilot recess 24 than the plane of the line C-C shown in FIG. 12*b*. More specifically, FIG. 14*a* is a cross-sectional view taken along line D-D of FIGS. 12*b*, and 14*b* is an enlarged view of the encircled portion 41 of FIG. 14*a*. As shown in FIGS. 14*a* and 14*b*, the pilot end 12 does not contact the fastener 20 across section D-D. As shown in more detail in FIG. 14*b*, the leading wall 28 of the pilot end 12 of the drive bit 10 is spaced away from the pilot recess flats 35 of the pilot recess wall 22 of the pilot recess 24.

As discussed above, since respective tolerance bands for the leading wall angle values of the tapered pilot end outer leading wall 28 and for the recess wall angles values of the inner pilot recess wall 22 do not overlap, then all portions of the pilot end 12 longitudinally between the apex 39 and the end surface 11 (shown in FIGS. 4 and 12*b*) of the pilot end 12 of the drive bit 10 do not contact the pilot recess wall 22. There is a predefined axial distance between the two tapered walls 22, 28 that is defined by the maximum value $\beta 1_{max}$ of the recess wall angle $\beta 1$, and the minimum value $\alpha 1_{min}$ of the leading wall angle $\alpha 1$, which, in an embodiment, is greater than $\beta 1_{max}$. Thus, this ensures that the targeted focal area is at the apex 39 of the drive bit 10.

As discussed above, the drive bit 10 can engage many different pilot recess profiles. To this end, in an embodiment, the pilot end 12 of the drive bit 10 has a round cross-section as discussed with reference to FIGS. 15-25*b*.

The foregoing description discussed the drive bit 10 engaging a pilot recess 24 having flats. However, the drive bit 10 can also be engaged with a fastener having an internal pilot recess that is round (i.e., in cross section, but tapers or is conical in terms of depth).

In another embodiment, shown in FIGS. 15-25*b*, pilot 12 (shown in FIGS. 1-3, 15, 23*a*-26*b*) engages a fastener recess 24*a* (shown in FIGS. 16-18, 23*a*-23*b*, and 25*b*).

Figure 15:
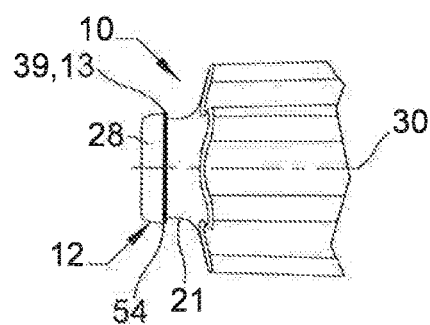
FIG. 15 is a cross-sectional view of a pilot end a drive bit in accordance with an embodiment of the invention.

FIG. 15 is a cross-sectional view of pilot end 12 of the drive bit 10, wherein the pilot end 12 is the same pilot end 12 as shown in FIGS. 1-3 with like reference numbers shown for like elements as disclosed with respect to the bit 12 shown in FIGS. 4 and 12*a*, except, instead of points of contact 32 as shown in FIGS. 4 and 12*a*-13*b*, the bit 12 in FIG. 15 has a circumferential line of contact 54 at the apex 39 when the bit 10 contacts a fastener with a conical recess having a round cross-section.

Figure 16:
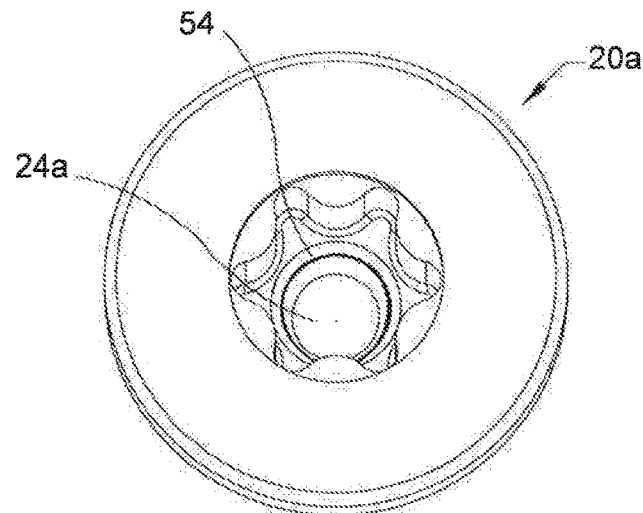
FIG. 16 is a top perspective view of a fastener with an internal pilot recess that is conical having a round cross section in accordance with another embodiment of the invention

FIG. 16 is a top perspective view of a fastener 20*a*, similar to fastener 20, having a pilot recess 24*a* without the flats 35, showing the circumferential line of contact 54 (also shown in FIGS. 17-18, 23*b*-24*b*) between the pilot end 12 (shown in FIGS. 1-3, 15, 23*a*-24*b*) and the fastener 20*a*.

Figure 17:
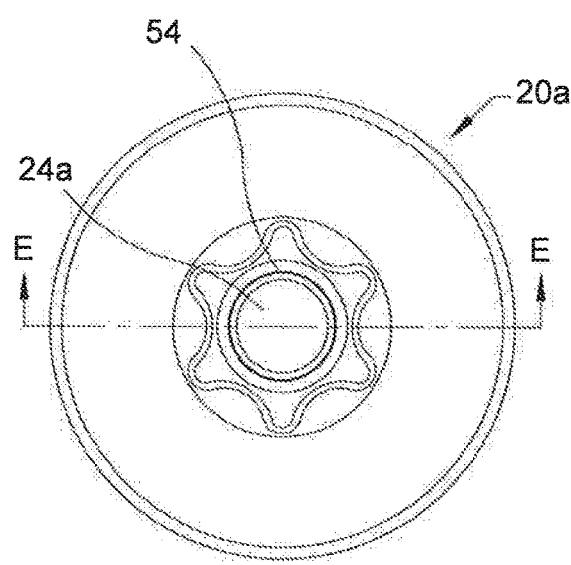
FIG. 17 is a top view of the fastener shown in FIG. 16.

FIG. 17 is a top view of the fastener 20*a*, showing the circumferential line of contact 54 between the pilot end 12 of the drive bit and the pilot recess 24*a* of the fastener 20*a*.

Figure 18:
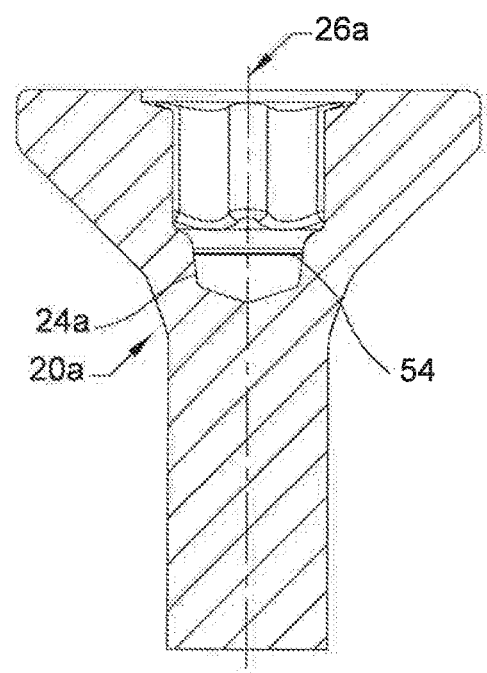
FIG. 18 is a cross-sectional view taken along line E-E of FIG. 17.
Figure 23A:
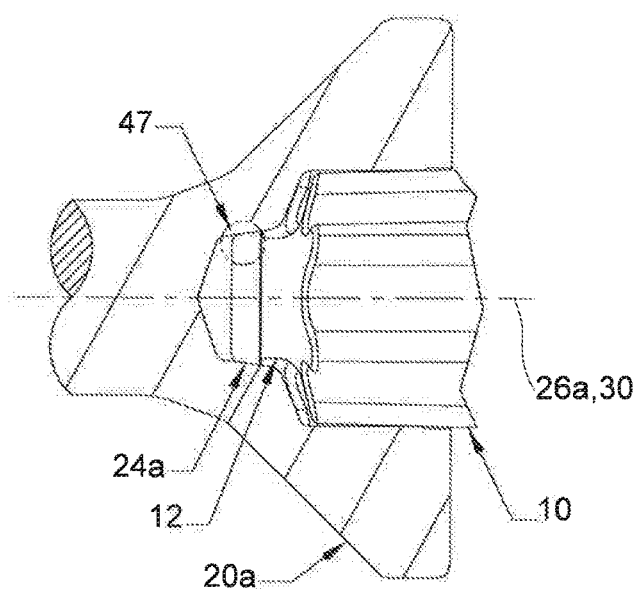
FIG. 23a shows the drive bit shown in FIG. 15 engaged with the fastener shown in FIGS. 16-18

FIG. 18 is a cross-sectional view taken along line E-E of FIG. 17, showing the circumferential line of contact 54 between pilot end 12 of the drive bit 10 (shown in FIGS. 15, and 23*a*), the fastener recess 24*a* within fastener 20*a* having a longitudinal axis 26*a* as shown in FIGS. 18 and 23*a*.

As shown in FIGS. 19-22, are views that relate to a punch pin 46 that can be used to form the pilot recess 24*a* in a head of the fastener 20*a* that is conical with a circular cross section. Specifically, FIG. 19 is a perspective view of the punch pin 46; FIG. 20 is an end view; FIG. 21 is a side view; and FIG. 22 is a cross-sectional view taken along line F-F of FIG. 21.

As shown in FIGS. 19-21, the punch pin 46 includes (among other things) a longitudinal axis 45, on a leading end 48 (also shown in FIG. 22) of the punch pin 46 that are configured to form the corresponding internal pilot recess 24*a* of the fastener 20*a* (shown in FIGS. 16-18).

In this case, FIG. 19 shows that the leading end 48 of the punch pin 46 lacks any flats and instead merely provides for a conical tapered wall 50 (i.e., relative to a longitudinal axis 52 of the punch pin 46) with a circular cross-section.

Figure 23B:
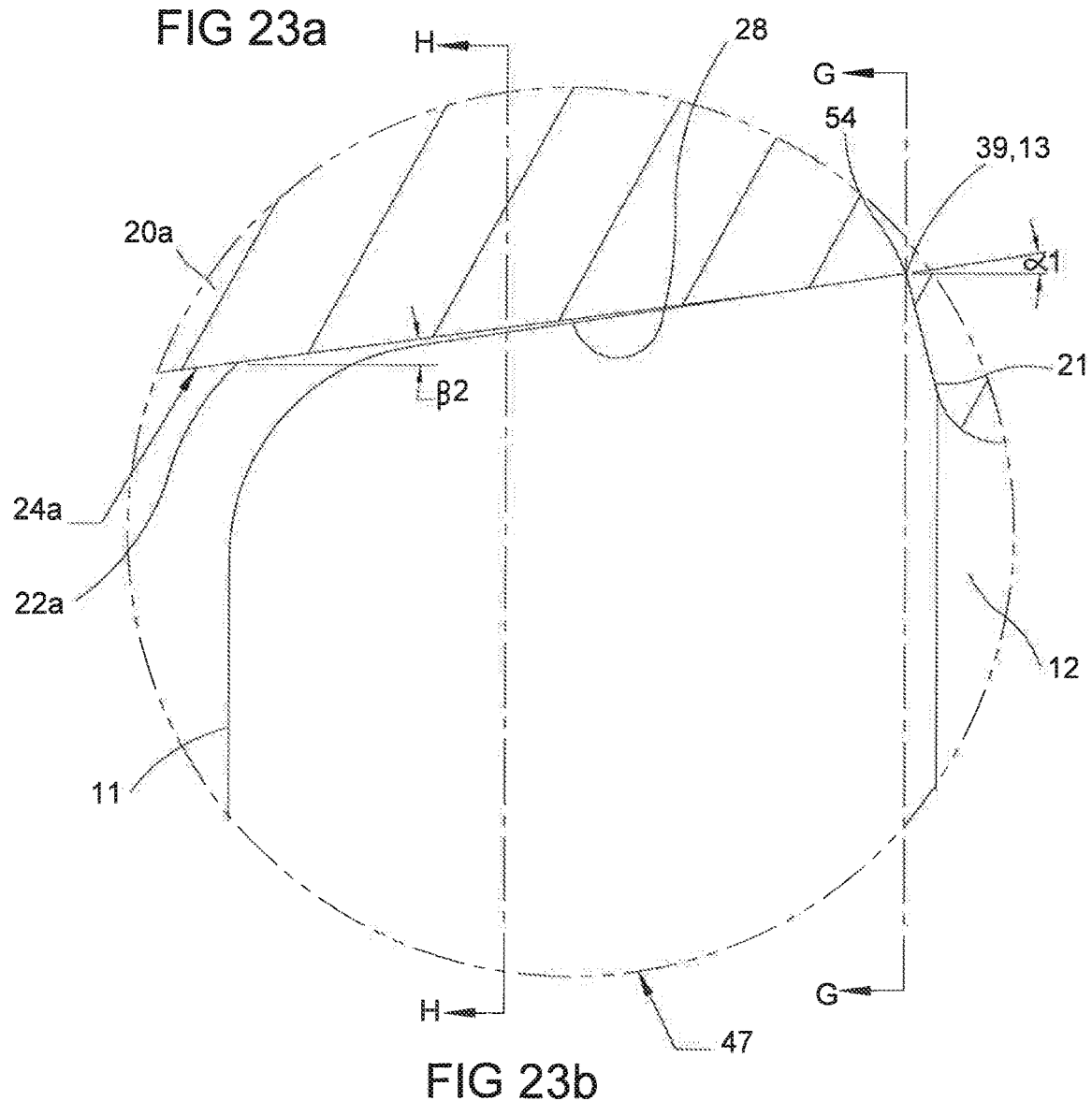

FIG. 23*a* show the drive bit 10 shown in FIG. 15 engaged with the fastener 20*a*, wherein the fastener 20*a* is shown in cross-section, and FIG. 23*b* includes an enlarged view of encircled portion 47 shown in FIG. 23*a*.

Figure 24A:
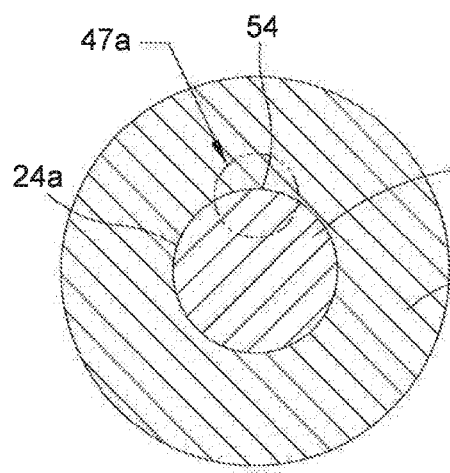
FIG. 24a is a cross-sectional view taken along line G-G of FIG. 23b.
Figure 24B:
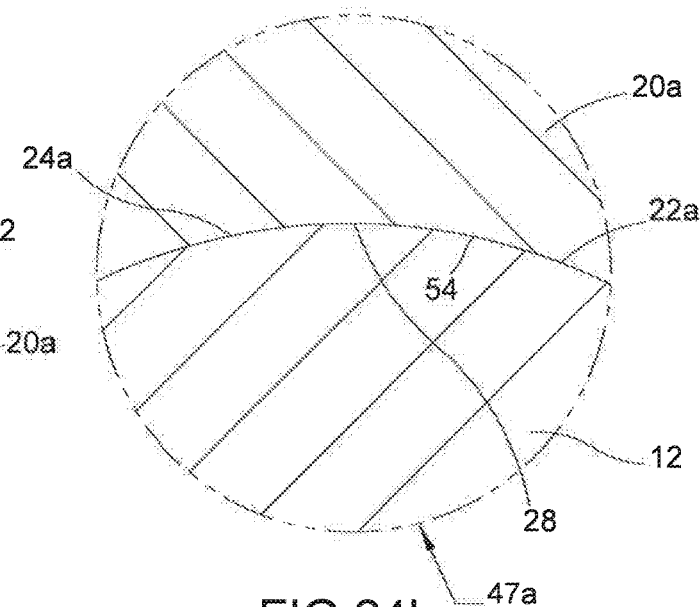
FIG. 24b is an enlarged view of the encircled portion 49

As shown in FIGS. 23*a* and 23*b*, the bit 10 (shown in FIGS. 1-3 and 15) having pilot end 12 and the longitudinal axis 30 engaging the fastener 20*a* having the longitudinal axis 26*a* in the internal pilot recess 24*a* (the internal pilot recess 24*a* shown engaged with the pilot 12 in FIGS. 23*a*, 23*b*, 23*b*, and 24*b*).

As shown in more detail in FIG. 23*b*, the bit 12 has a circumferential line of contact 54 at the apex 39. Similar to the inner pilot recess wall 22 disclosed above with respect to FIG. 12*b*, The inner pilot recess wall 22*a* is tapered with respect to the recess longitudinal axis 26*a* to define a recess wall angle $\beta 2$ having a plurality of recess wall angle values ranging within a recess wall angle tolerance band.

In an embodiment, as discussed with reference to FIG. 12*b*, the plurality of leading wall angle values are equal to or are between a maximum leading wall angle value $\alpha 1_{max}$ and a minimum leading wall angle value $\alpha 1_{min}$. Similarly, in an embodiment shown in FIG. 23*b* the plurality of recess wall angle values are equal to or are between a maximum recess wall angle value $\beta 2_{max}$ and a minimum recess wall angle value $\beta 2_{min}$.

In an embodiment of the invention as shown in Chart 2, the recess wall angle $\beta 2$ is the same as recess wall angle $\beta 1$, and the recess wall angle tolerance band for the recess wall angle $\beta 2$ is the same as the recess wall angle tolerance band for the recess wall angle $\beta 1$, and wherein $\beta 2_{min}$ equals $\beta 1_{min}$ and $\beta 2_{max}$ equals $\beta 1_{max}$. Thus, as all of the angle values for $\alpha 1$, and $\beta 2$, as well as their associated tolerance bands and tolerance band gaps are the same, the discussion above with regard to Chart 1 for bit 12 and internal pilot recess 24 equally applies to Chart 2 below, which is a tolerance band gap chart for bit 12 and internal pilot recess 24a

CHART 2

| Leading Wall Angle $\alpha 1$ | | Recess Wall Angle $\beta 2$ | | % Difference $(\alpha 1_{max} - \beta 2_{min})/\beta 2_{min}$ | % Difference $(\alpha 1_{min} - \beta 2_{max})/\beta 2_{max}$ |
|---|---|---|---|---|---|
| $\alpha 1_{max}$ | 10.00° | $\beta 2_{max}$ | 7.75° | 38% | |
| $\alpha 1_{min}$ | 7.76° | $\beta 2_{min}$ | 7.25° | | 0.13% |
| $\alpha 1$ Tolerance Band | 2.24° | $\beta 2$ Tolerance Band | 0.50° | | |
| Tolerance Band Gap $(\alpha 1_{min} > \beta 2_{max})$ | 0.01° | | | | |

As shown in FIG. 23b, the apex 39 of the pilot end 12 having tapered outer leading wall 28 that is tapered at the angle α1 contacts the inner pilot recess wall 22a within the fastener recess 24a at a targeted focal area that defines the circumferential line of contact 54 between apex 39 and the inner pilot recess wall 22a to form a frictional engagement with the fastener 20a. The level of frictional engagement at the targeted focal area can range between a friction fit up to a jam fit depending on the desired amount of deformation desired on the inner pilot recess wall 22a. FIGS. 24a and 24b show more detailed views of the cross-sectional view taken along line G-G of FIG. 23b. More specifically, FIG. 24a is a cross-sectional view taken along line G-G of FIGS. 23b, and 24b is an enlarged view of the encircled portion 47a of FIG. 24a. FIGS. 24a, and 24b show the circumferential line of contact 54 between the leading wall 28 (FIG. 24b) of the pilot end 12 of the drive bit 10 (shown in FIG. 23a) and the inner pilot wall 22a.

FIGS. 23a, 23b, 24a, and 24b show the frictional engagement between the pilot end 12 of the bit 10 and the pilot recess 24a of the fastener 20a. As shown in FIGS. 23a, 23b, 24a, and 24b, the targeted focal area includes the circumferential line of contact 54 at the apex 39 of the pilot bit 12 (shown in FIG. 23b). When the apex 39 of leading wall 28 of the pilot end 12 engages the pilot recess 24a at the circumferential line of contact 54, the highest stress concentrations occur at the circumferential line of contact 54.

In the embodiment shown with respect to FIGS. 1-25b, the stress concentrations occur at the apex 39 where the apex 39 contacts the at least one contact points 32, 54 (contact points forming a circumferential line of contact 54b is shown in FIGS. 15-18, 23b-24b) on the inner pilot recess wall 22. Because the apex 39 has a very minimal radius 13, the stresses are concentrated over a small target focal area, and thus the stress concentrations are high at the at least one contact points 32 or the circumferential line of contact 54

Figure 25A:
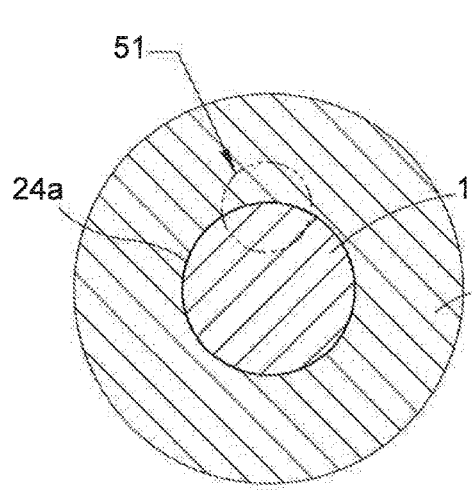
FIG. 25a is a cross-sectional view taken along line H-H of FIG. 23b.
Figure 25B:
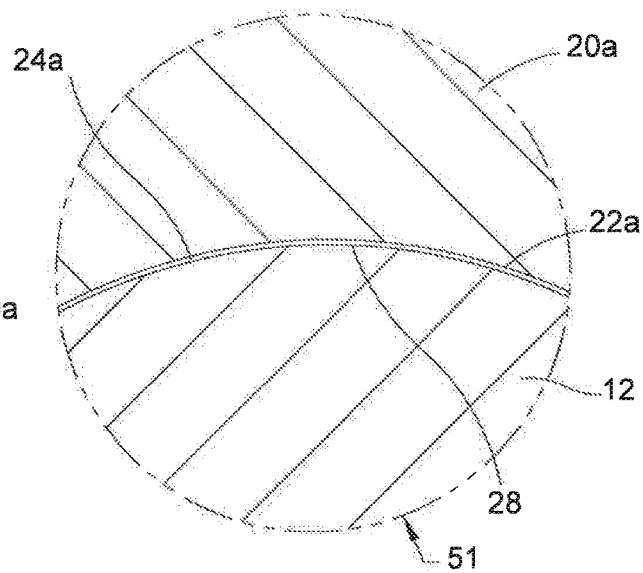

FIGS. 25a and 25b show more detailed views of the cross-sectional view taken along line H-H of FIG. 23b on a plane further down in the pilot recess 24a than the plane of the line G-G shown in FIG. 23b. More specifically, FIG. 25a is a cross-sectional view taken along line H-H of FIGS. 23b, and 25b is an enlarged view of the encircled portion 51 of FIG. 25a. As shown in FIGS. 25a and 25b, the pilot end 12 does not contact the fastener 20a across section H-H. As shown in more detail in FIG. 25b, the leading wall 28 of the pilot end 12 of the drive bit 10 is spaced away from the pilot recess wall 22a of the pilot recess 24a.

As discussed above, since respective tolerance bands for the leading wall angle values of the tapered pilot end outer leading wall 28 and for the recess wall angles values of the inner pilot recess wall 22a do not overlap, then all portions of the pilot end 12 longitudinally between the apex 39 and the end surface 11 (shown in FIGS. 15 and 23b) of the pilot end 12 of the drive bit 10 do not contact the pilot recess wall 22a. There is a predefined axial distance between the two tapered walls 22a, 28 that is defined by the maximum value $\beta 2_{max}$ of the recess wall angle β2, and the minimum value $\alpha 1_{max}$ of the leading wall angle α1, which, in an embodiment, is greater than $\beta 2_{max}$. Thus, this ensures that the targeted focal area is at the apex 39 of the drive bit 10.

Figure 26A:
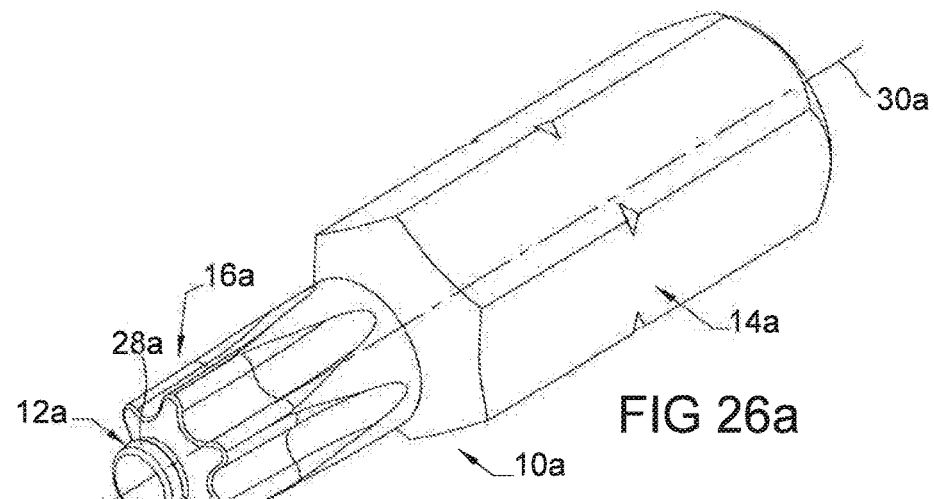
FIG. 26a is a perspective view of a drive bit that has a pilot end in accordance with another embodiment of the invention.
Figure 26B:
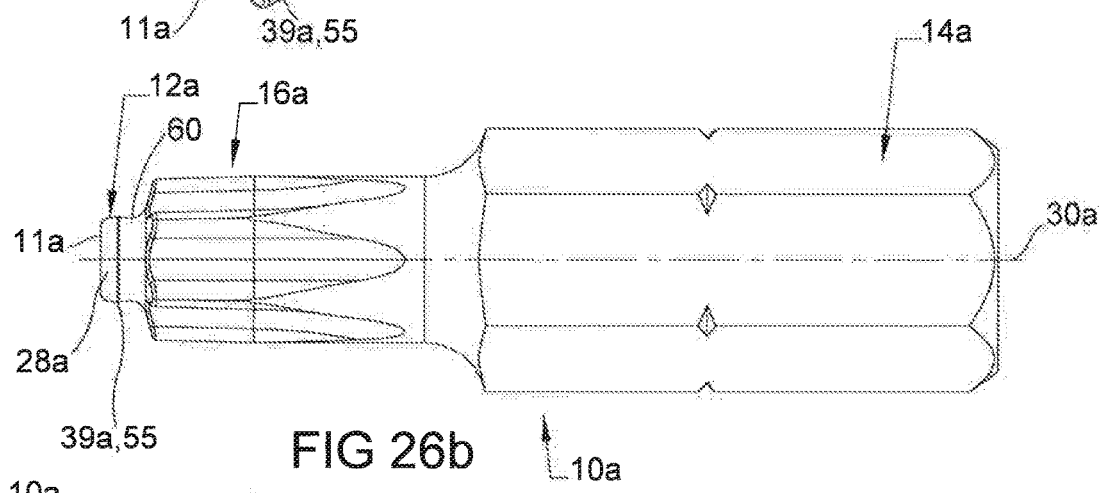
Figure 27:
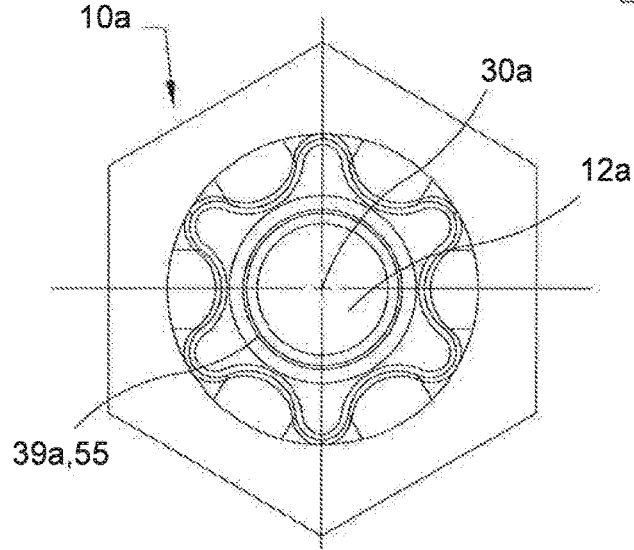

Referring now to the specific embodiments, in particular, FIGS. 26a-41b illustrating several embodiments disclosed with respect to a pilot end 12a shown in FIGS. 26a-27 that engages two different embodiments of fastener recesses.

Alternative embodiments of the present invention will now be described using like reference numerals to identify like parts, and adding a letter suffix to the reference numerals.

More specifically, FIG. 26a is a perspective view of a drive bit 10a that has a pilot end 12a that is in accordance with an embodiment. FIG. 26b is a side view of the drive bit 10a, and FIG. 27 is an end view of the bit 10a.

As shown in FIGS. 26a-26b, the drive bit 10a comprises a driver engaging portion 14a for engaging a driver, a drive portion 16a, and a pilot end 12a. Similar to the pilot end 12 shown in FIGS. 1-3, the pilot end 12a is configured to engage a pilot recess in a fastener, and is specifically configured to provide for consistent and reliable frictional engagement between the drive bit and the fastener. The present invention is specifically directed at that portion of the drive bit 10a (i.e., the pilot end 12a), and the other portions (i.e., 14a, and 16a) can very well be conventional.

Like the drive bit 10, shown in FIGS. 1-3, the drive bit 10a is configured such that it can engage many different fastener recess profiles, similar to the fastener recesses disclosed above with respect to bit 10.

As shown in the embodiments in FIGS. 26a-28, and 32b, the drive bit 10a having a pilot end 12a (also shown in 32a as well) that terminates at an end surface 11a (26a, 26b, 28, and 32b) along the longitudinal axis 30a (also shown in FIG. 32a), wherein the pilot end 12a has an outer leading wall 28a (shown in FIGS. 26a, 26b, 28, and 32b) and has an apex 39a defined by a maximum diameter of the pilot end 12a with a radius 55 that is greater than the minimal radius 13 described with respect to FIGS. 1-4, 15, 12b, and 23b, and a back trailing wall 60 (shown in 26a-26b, 28, and 32b), that extends from the apex 39a longitudinally upward towards the drive portion 16a at a back taper angle to form a back taper, wherein the leading wall 28a the pilot end 12a and the trailing wall 60 meet at the apex 39a.

Figure 28:
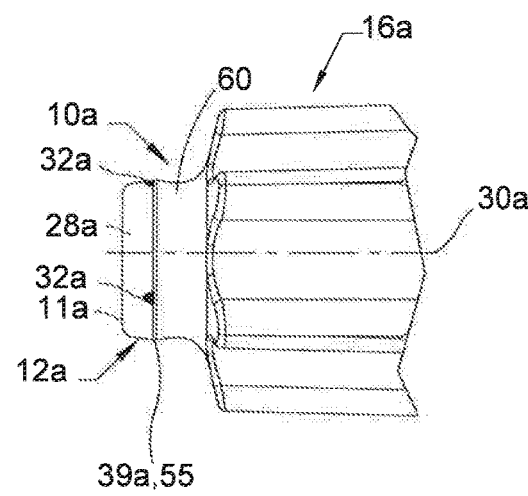
FIG. 28 is a side view of a portion of the drive bit 10a shown in FIGS. 26a-27 in accordance with an alternative embodiment of the present invention.

FIG. 28 illustrates a drive bit 10a that is in accordance with an alternative embodiment of the present invention. FIG. 28 is a side view of a portion of the drive bit 10a shown in FIGS. 26a-27, namely an end portion of the drive bit 10a including the pilot end 12a terminating at the end surface 11a, the pilot end 12a having the outer leading wall 28a, showing two of the points of contact 32a that occur when the pilot end 12a of the drive bit 10a engages a fastener 20.

The fastener 20 as shown in embodiment in FIGS. 29a-31, 32a-34b is the same fastener 20 as referenced above in FIGS. 5a, 5b, 6, 7, 12a, 12b, 13a, 13b, 14a, and 14b with like reference numbers shown for like elements and with a suffix added for the similar elements for bit 10a. However, since the bit 10a that engages the fastener 20 shown in FIGS. 29a, 29b, 30, and 31 is different than bit 10 shown in FIGS. 1-4, the bit 10a contacts the flats 35 on the fastener 20 as shown in FIGS. 29a, 29b, 30, and 31 at the at least one point of contact 32a.

Figure 29A:
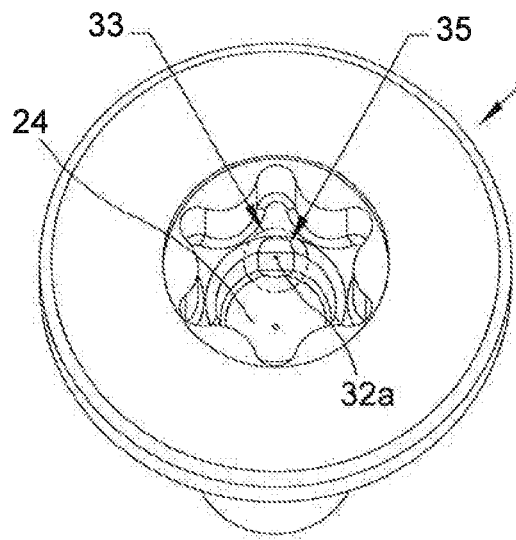
FIG. 29a is a perspective view of a top of a fastener having an internal pilot recess with recess flats on an inner recess wall that engages the pilot end shown in FIG. 28.
Figure 29B:
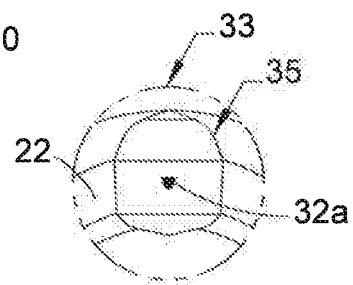

FIG. 29a is a perspective view of a top of the fastener 20, showing at least one point of contact 32a that occurs when between pilot end 12a of the drive bit 10a contacts the internal pilot recess 24 of the fastener 20; and FIG. 29b is a an enlarged view of the encircled portion 33 showing an inner pilot recess wall 22 having at least one flat 35 integrally formed with the inner pilot recess wall 22.

Figure 30:
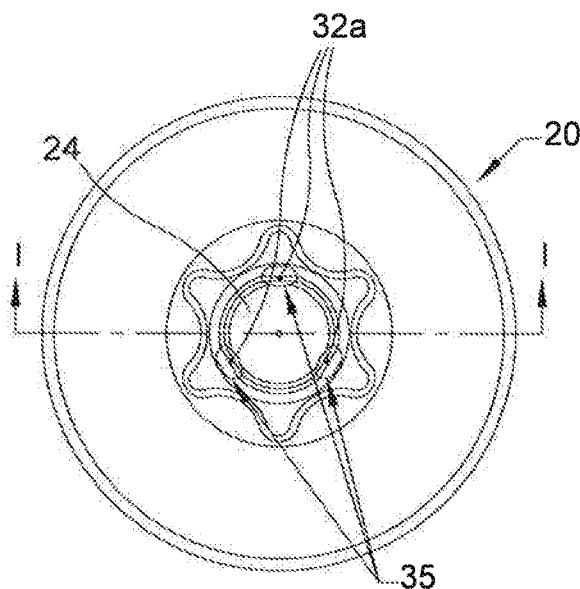

FIG. 30 is a top view of the fastener 20, showing the points of contact 32a between the pilot fastener recess 24 at the flats 35 and the pilot end 12a.

Figure 31:
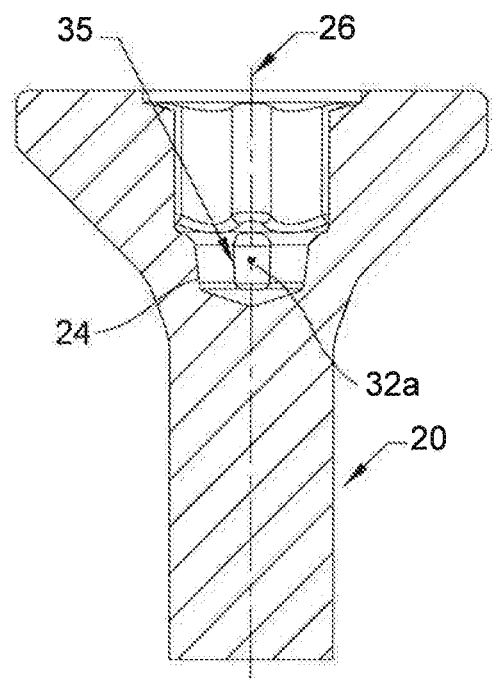
FIG. 31 is a cross-sectional view taken along line I-I of FIG. 39.
Figure 32A:
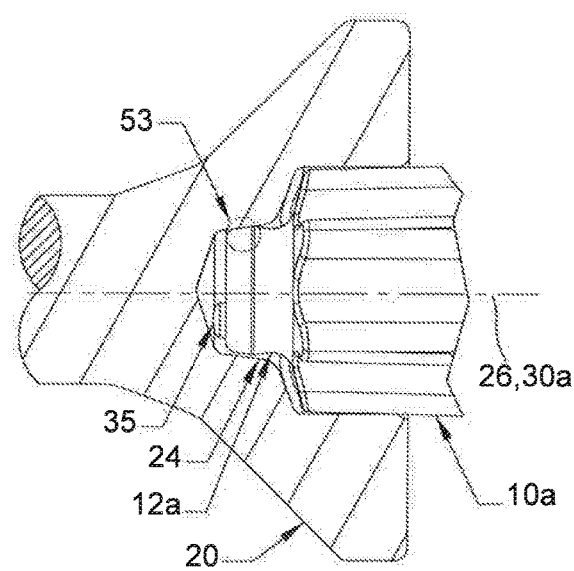
FIG. 32a shows a partial cross sectional view of the drive bit of FIG. 28 engaged with the fastener.
Figure 32B:
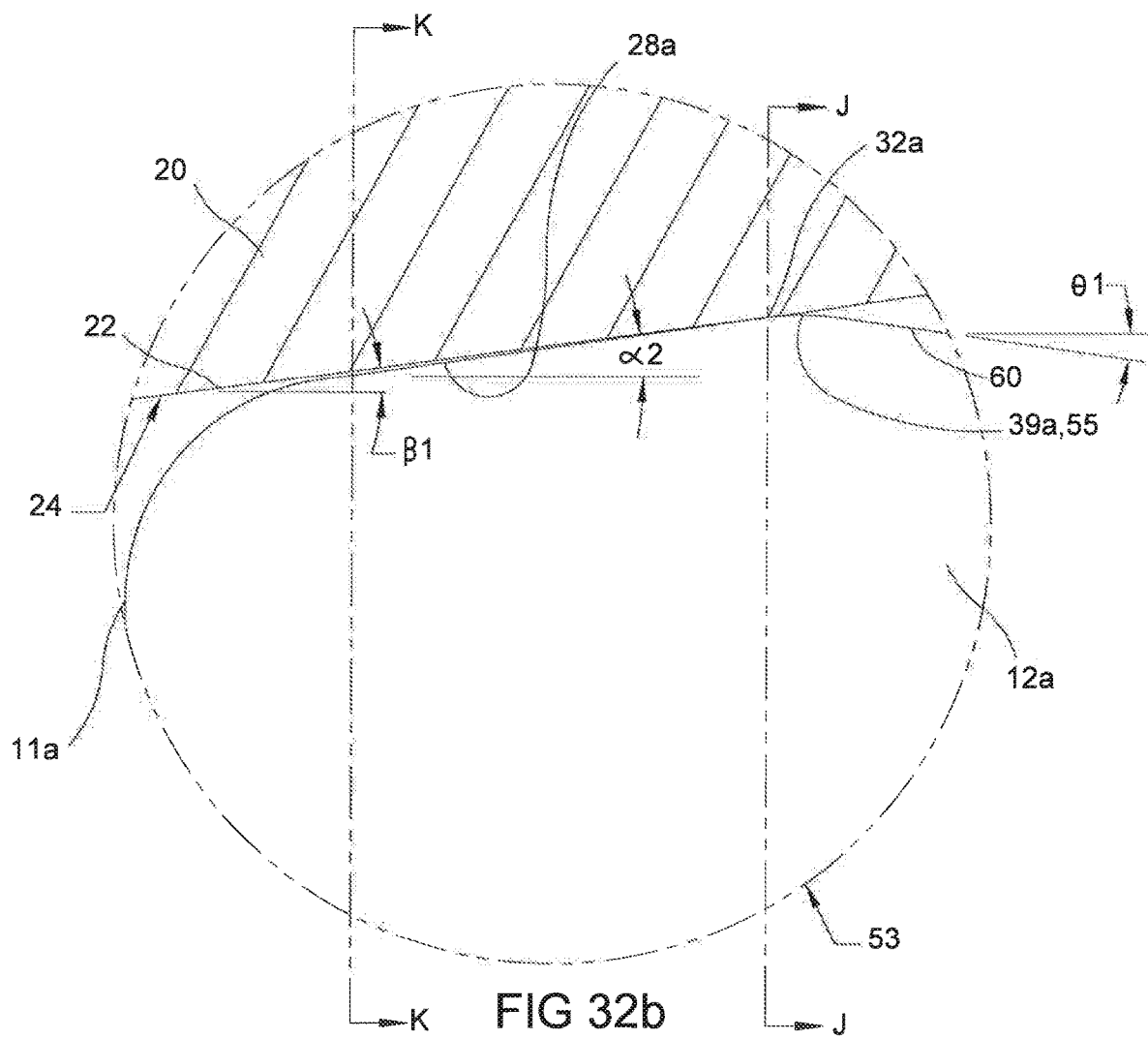

FIG. 31 is a cross-sectional view taken along line I-I of FIG. 30, showing the at least one point of contact 32a between pilot end 12a (the points of contact 32a on the pilot end 12a are shown in FIGS. 28, 32a, 32b, 33a, and 33b) and the pilot recess flat 35 in internal pilot recess 24, the fastener having a longitudinal axis 26 (also shown in FIG. 32a), FIGS. 32a-32b show the drive bit 10a engaged with the fastener 20, wherein the fastener 20 is shown in cross-section (FIG. 32a), and FIG. 32b includes an enlarged view of encircled portion 53 shown in FIG. 32a.

As shown in FIGS. 32a and 32b show the bit 10a (shown in FIGS. 26a-28 and 32a) having pilot end 12a (FIG. 32a-32b) and the longitudinal axis 30a engaging the fastener 20 having the longitudinal axis 26 in the pilot recess 24 at the at the at least one flat 35 (the internal pilot recess 24 shown engaged with the pilot end 12a in FIGS. 32a, 32b, 33b and 34b).

As shown in more detail in FIG. 32b, the pilot end 12a outer leading wall 28a is tapered with respect to the pilot end longitudinal axis 30a to define a leading wall angle α2 having a plurality of leading wall angle values ranging within a leading wall angle tolerance band. Similarly, the inner pilot recess wall 22 is tapered with respect to the recess longitudinal axis 26 to define a recess wall angle β1 having a plurality of recess wall angle values ranging within a recess wall angle tolerance band.

The plurality of leading wall angle values are equal to or are between a maximum leading wall angle value $α2_{max}$ and a minimum leading wall angle $α2_{min}$; and wherein the plurality of recess wall angle values are equal to or are between a maximum recess wall angle value $β1_{max}$ and a minimum recess wall angle $β1_{max}$.

A tolerance band gap exists between the leading wall angle tolerance band and the recess wall tolerance band.

In an embodiment of the invention, when the leading wall angle is greater than the recess wall angle, the tolerance band gap is the difference between $α1_{min}$ and $β1_{max}$.

There is no overlap of the plurality of leading wall angle values within the leading wall angle tolerance band with the plurality of recess wall angle values within the recess wall angle tolerance band when the minimum leading wall angle $α1_{min}$, is greater than or equal to the maximum recess wall angle $β1_{max}$.

In an embodiment, shown in FIG. 32b, the leading wall 28a of the pilot end 12a of the bit 10a is tapered at the angle α2, which is a greater than the angle β1 of the inner pilot recess wall 22 of the fastener 20. The relationship between: these two tapers and the apex radius is what provides the frictional engagement at the targeted focal area.

More particularly, in an embodiment shown in FIG. 32b, the $α1_{min}$ is greater than $β1_{max}$ by a tolerance band greater than zero, thereby ensuring that the tangent of the apex radius 55 of the pilot end 12 contacts the inner pilot recess wall 22 only at the targeted focal area and nowhere else between the leading wall 28a and the inner pilot recess wall 22. Since the tolerance band gap is greater than zero, then there cannot be an overlap of the angles α1 and β1.

If the tolerance band gap is less than zero, then $α1_{min}$ may be less than $β1_{max}$ and then $α1_{min}$ would fall within the recess wall angle tolerance band and thus, there would be an overlap of the leading wall angle tolerance band with the recess wall angle tolerance band, which is undesirable and which could cause the leading wall 28a of the pilot end 12 to contact the inner pilot recess wall of the internal pilot recess 24 at another point or points other than at the targeted focal area.

In an embodiment of the invention, the tolerance band gap is greater than zero as shown in the chart below, which is the Tolerance band gap chart for pilot end 12a and inner pilot recess 24 (Chart 3).

CHART 3

| Leading Wall Angle α2 | | Recess Wall Angle β1 | | % Difference $(α2_{max} - β1_{min})/β1_{min}$ | % Difference $(α2_{min} - β1_{max})/β1_{max}$ |
|---|---|---|---|---|---|
| $α2_{max}$ | 10.00° | $β1_{max}$ | 7.75° | 38% | |
| $α2_{min}$ | 7.76° | $β1_{min}$ | 7.25° | | 0.13% |
| α21 Tolerance Band | 2.24° | β1 Tolerance Band | 0.50° | | |
| Tolerance Band Gap $(α1_{min} > β1_{max})$ | 0.01° | | | | |

As shown in Chart 3, the tolerance band gap in particular, is the difference between $α2_{min}$ and $β1_{max}$, wherein $α2_{min} > β1_{max}$, and thus, the tolerance band gap is greater than zero (shown as) 0.01° and no tolerance band overlap occurs between the leading wall angle tolerance band (shown as 2.24°, which is the maximum span for the angle values for leading wall angle α2, i.e., $α2_{min} <= α2_{max}$) and the recess wall angle tolerance band (shown as 0.5°, which is the maximum span for the angle values for leading wall angle β1, i.e., $β1_{min} <= β1_{max}$).

In particular, as shown with respect to this non-limiting embodiment, the α2 min(7.76°) is less than or equal to $α2_{max}$ (10.00°), the leading wall angle tolerance band, 2.24°, is the difference between $α2_{max}$ and $α2_{min}$ (10.00°-7.76°), and the wherein the recess wall angle tolerance band, 0.50°, is the difference between $β1_{max}$ and $β1_{min}$)(7.75°-7.25°), In an embodiment of the invention, the tolerance band gap is the difference between $α2_{min}$ and $β1_{max}$, wherein $α2_{min} > β1_{max}$, thus $α2_{min}$(7.76°) is greater than $β1_{max}$ (7.75°) by the amount of the tolerance band gap (0.01°).

In this embodiment, the minimum leading wall angle $α2_{min}$ (7.76°) is 0.13 percent greater than the maximum recess wall angle $β1_{max}$ (7.75°) and the maximum leading wall angle $α2_{max}$ (10.00°) is 38 percent greater than the minimum recess wall angle $β1_{min}$ (7.25°). However, the embodiment described with respect to Chart 3 is not limited to the specific values for the variables disclosed in the chart as the chart is for illustrative purposes only.

As shown in FIG. 32b, pilot end 12a contacts the inner pilot recess wall 22 at a targeted focal area that defines the at least one point of contact 32a. The at least one point of contact 32a is at a point of tangency longitudinally below the apex 39a toward the pilot end surface 11a where the apex radius 55 contacts the inner pilot recess wall 22, which is a predefined nominal distance both axially inward from and longitudinally below apex 39a. The pilot end 12a engages the inner pilot recess wall 22 at the at least one point of contact 32a, i.e. the recess flat 35 within the internal pilot recess 24, to form a frictional engagement with the fastener 20. The level of frictional engagement at the targeted focal area can range between a friction fit up to a jam fit depending on the desired amount of deformation desired on the inner pilot recess wall. In an embodiment of the invention, the trailing wall 60 is optional and has angle θ1 (shown in FIG. 32b) that is greater than the leading wall angle α1 (shown in FIG. 32b). The angle θ1 exists to allow trailing wall 60 to form a back taper, thereby avoiding having the leading wall 28a contact recess wall 22 at another location other than at the recess flat 35 at the at least one point of contact 32a.

Figure 33A:
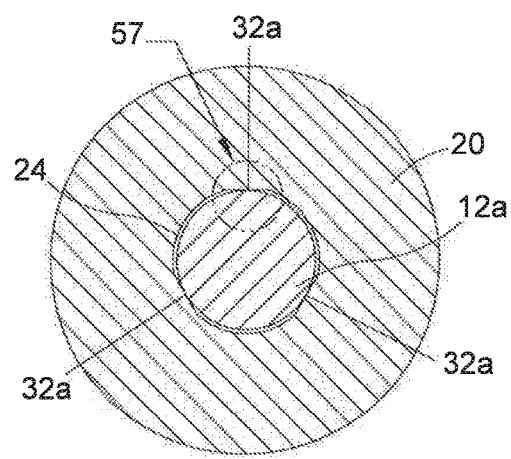
FIG. 33a is a cross-sectional view taken along line J-J of FIG. 32b.
Figure 33B:
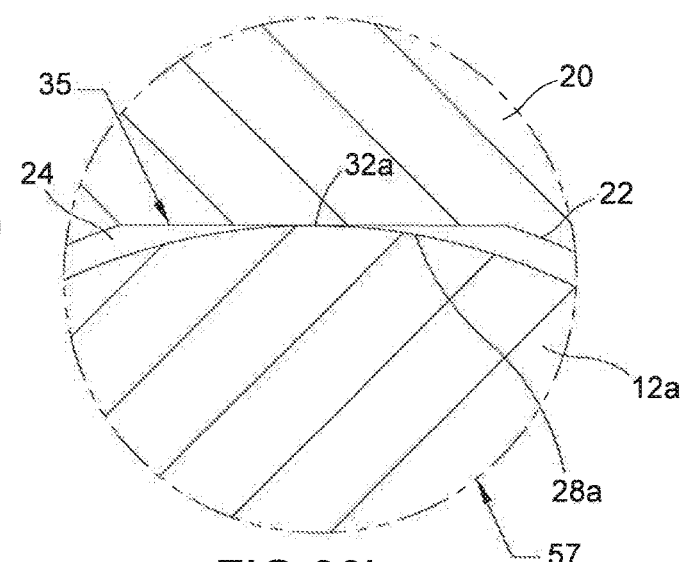

FIGS. 33a and 33b show more detailed views of the cross-sectional view taken along line J-J of FIG. 32b. More specifically, FIG. 33a is a cross-sectional view taken along line J-J of FIGS. 32b, and 33b is an enlarged view of the encircled portion 57 of FIG. 33a. FIGS. 33a and 33b show the at least one point of contact 32a between the leading wall 28a (FIG. 33b) of the pilot end 12a of the drive bit 10a (shown in FIG. 32a) and the pilot recess flat 35. FIGS. 32a, 32b, 33a, and 33b show the frictional engagement between the pilot end 12a of the bit 10a and the pilot recess 24 of the fastener 20. As shown in FIGS. 32a, 32b, 33a, 33b, the targeted focal area includes the at least one point of contact 32a at the point of tangency where the apex radius 55 contacts the inner pilot recess wall 22 of the pilot bit 12a (shown in FIG. 32b). When the apex radius 55 of the pilot end 12a engages the pilot recess 24 at the pilot recess wall flats 35, the stress concentrations occur in the recess pilot wall at the flats 35 but are less than the stress concentrations occurring in the flats 35 shown with respect to FIGS. 12a-12b for pilot 12 having the apex 39 with minimal radius 13. The apex radius 55 is greater than the apex radius 13, and thus, the apex radius 55 allows for the contact stress to be distributed across the at least one contact point 32a over a larger area than the higher contact stresses concentrated at apex 39 having the minimal radius 13 of pilot bit 10 (as shown in FIGS. 4, and 12b) to allow for a consistent and reliable frictional engagement between the drive bit 10a and the fastener 20 at the contact points 32a.

Figure 34A:
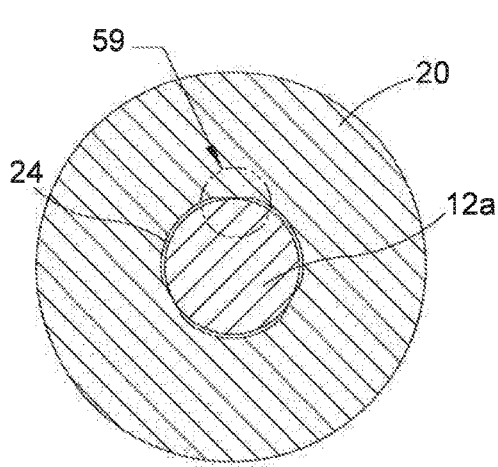
FIG. 34a is a cross-sectional view taken along line K-K of FIG. 32b.
Figure 34B:
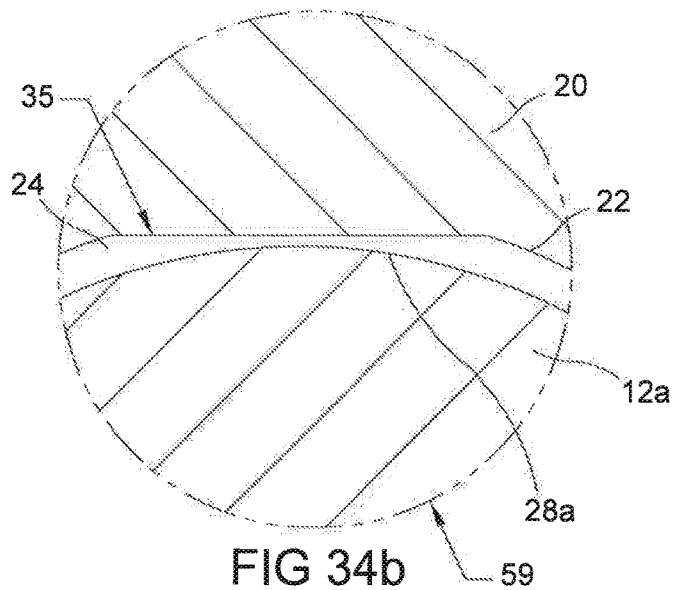

FIGS. 34a and 34b show more detailed views of the cross-sectional view taken along line K-K of FIG. 32b on a plane further down longitudinally in the pilot recess 24 than the plane of the line J-J shown in FIG. 32b. More specifically, FIG. 34a is a cross-sectional view taken along line K-K of FIGS. 32b, and 34b is an enlarged view of the encircled portion 59 of FIG. 34a. As shown in FIGS. 34a and 34b, the pilot end 12a does not contact the fastener 20 across section K-K. As shown in more detail in FIG. 34b, the leading wall 28a of the pilot end 12a of the drive bit 10a is spaced away from the pilot recess flats 35 of the pilot recess wall 22 of the pilot recess 24.

As discussed above, since there is no tolerance band overlap of the respective leading wall angle tolerance band and the recess wall angle tolerance band, then all portions of the pilot end 12a longitudinally between the tangent of the apex radius 55 and the end surface 11a (shown in FIGS. 28 and 32b) of the pilot end 12a of the drive bit 10a do not contact the pilot recess wall 22.

There is a predefined axial distance between the two tapered walls 22, 28a that is defined by the minimum recess wall angle $β1_{min}$, and the maximum leading wall angle $α2_{max}$, wherein in an embodiment, is $α2_{max}$ greater than $β1_{min}$. Thus, this ensures that the targeted focal area is at the tangent of the apex radius 55 and the internal pilot recess wall 22.

The foregoing description discussed the drive bit 10a engaging a pilot recess 24 having flats. However, the drive bit 10a can also be engaged with a fastener having an internal pilot recess that is round (i.e., in cross section, but tapers or is conical in terms of depth).

As discussed above, the drive bit 10a can engage many different pilot recess profiles. To this end, in an embodiment, the pilot end 12a of the drive bit 10a engages an internal pilot recess that has a round cross-section as discussed with reference to FIGS. 35-41b.

More particularly, in another embodiment, shown in FIGS. 35-41b, pilot 12a (shown in FIGS. 25a-27, 35, 39a-41b) engages a fastener recess 24a (shown in FIGS. 36-38, 39a-39b, and 41b). The fastener recess 24a is the same as the fastener recess 24a disclosed with respect to FIGS. 16-18 above with like reference numbers shown for like elements as disclosed with respect to the fastener 24a above.

Figure 35:
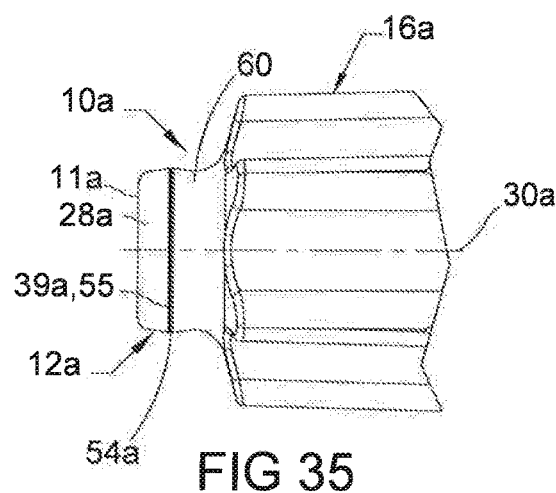
FIG. 35 is a cross-sectional view of pilot end shown in FIGS. 26a-27 in accordance with an embodiment of the invention.

FIG. 35 is a cross-sectional view of pilot end 12a of the drive bit 10a, wherein the pilot end 12a is the same pilot end 12a as shown in FIGS. 26a-27 with like reference numbers shown for like elements as disclosed with respect to the bit 12a, except, instead of points of contact 32a as shown in FIGS. 28 and 32a-33b, the bit 12a has a circumferential line of contact 54a at the tangent of the apex radius 55 when the bit 10a contacts a fastener with a conical recess having a round cross-section.

Figure 36:
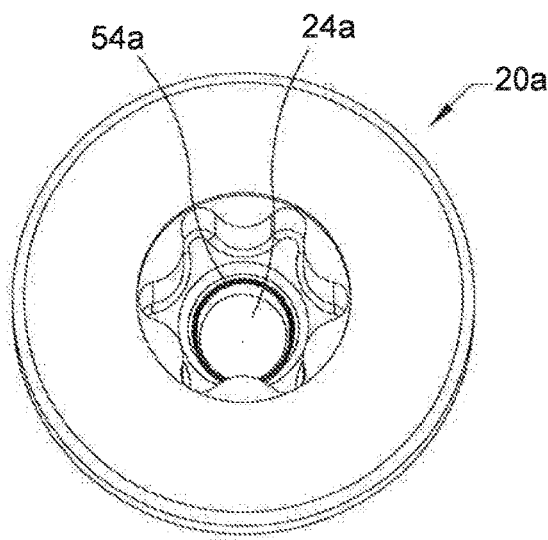
FIG. 36 is a top perspective view of a fastener with an internal pilot recess that is conical having a round cross section in accordance with another embodiment of the invention

FIG. 36 is a top perspective view of the fastener 20a, having a pilot recess 24a without the recess wall flats 35, showing the circumferential line of contact 54a (also shown in FIGS. 37-38, 39b-40b) between the pilot end 12a (shown in FIGS. 35, 39a-40b) and the fastener 20a.

Figure 37:
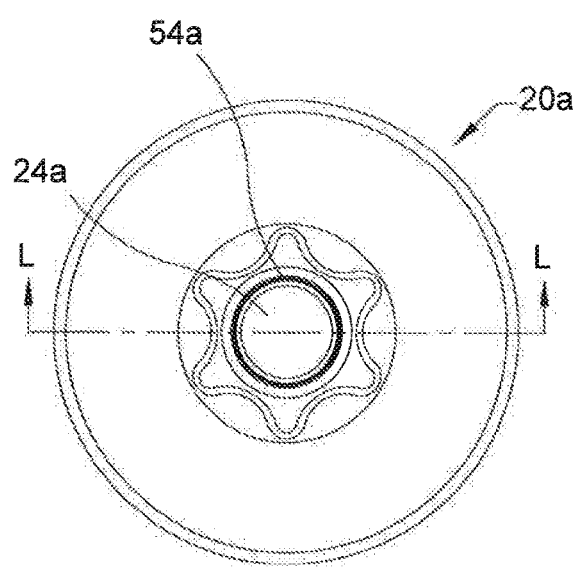
FIG. 37 is a top view of the fastener shown in FIG. 36.

FIG. 37 is a top view of the fastener 20a, showing the circumferential line of contact 54a between the pilot end 12a of the drive bit 10a and the pilot recess 24a of the fastener 20a.

Figure 38:
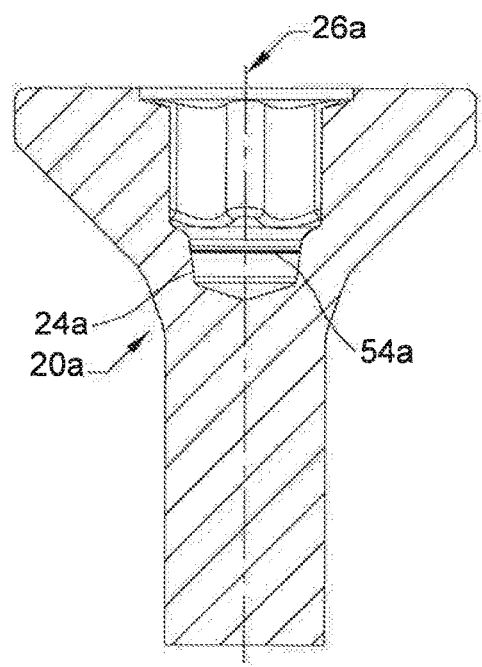
FIG. 38 is a cross-sectional view taken along line L-L of FIG. 37.
Figure 39A:
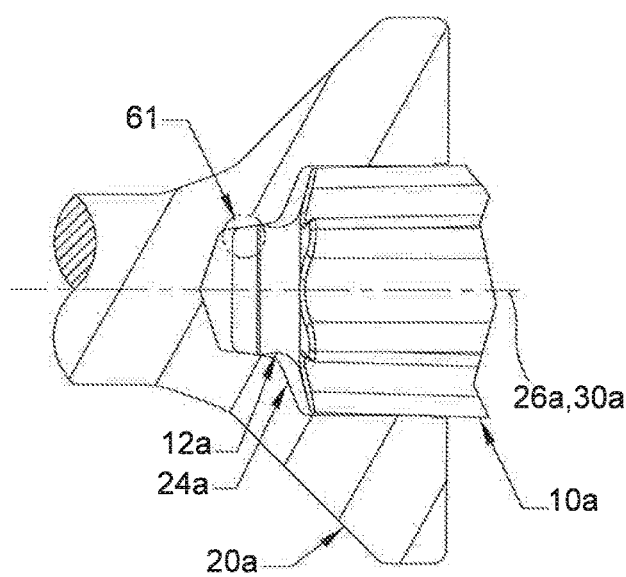
FIG. 39a shows the drive bit shown in FIG. 35 engaged with the fastener shown in FIGS. 36-38.

FIG. 38 is a cross-sectional view taken across line L-L of FIG. 37, showing the circumferential line of contact 54a that occurs when the pilot end 12a of the drive bit 10a (shown in FIGS. 35, 39b-40b) engages the fastener 20a at the pilot recess 24a having a longitudinal axis 26a (as shown in FIGS. 38 and 39a).

Figure 39B:
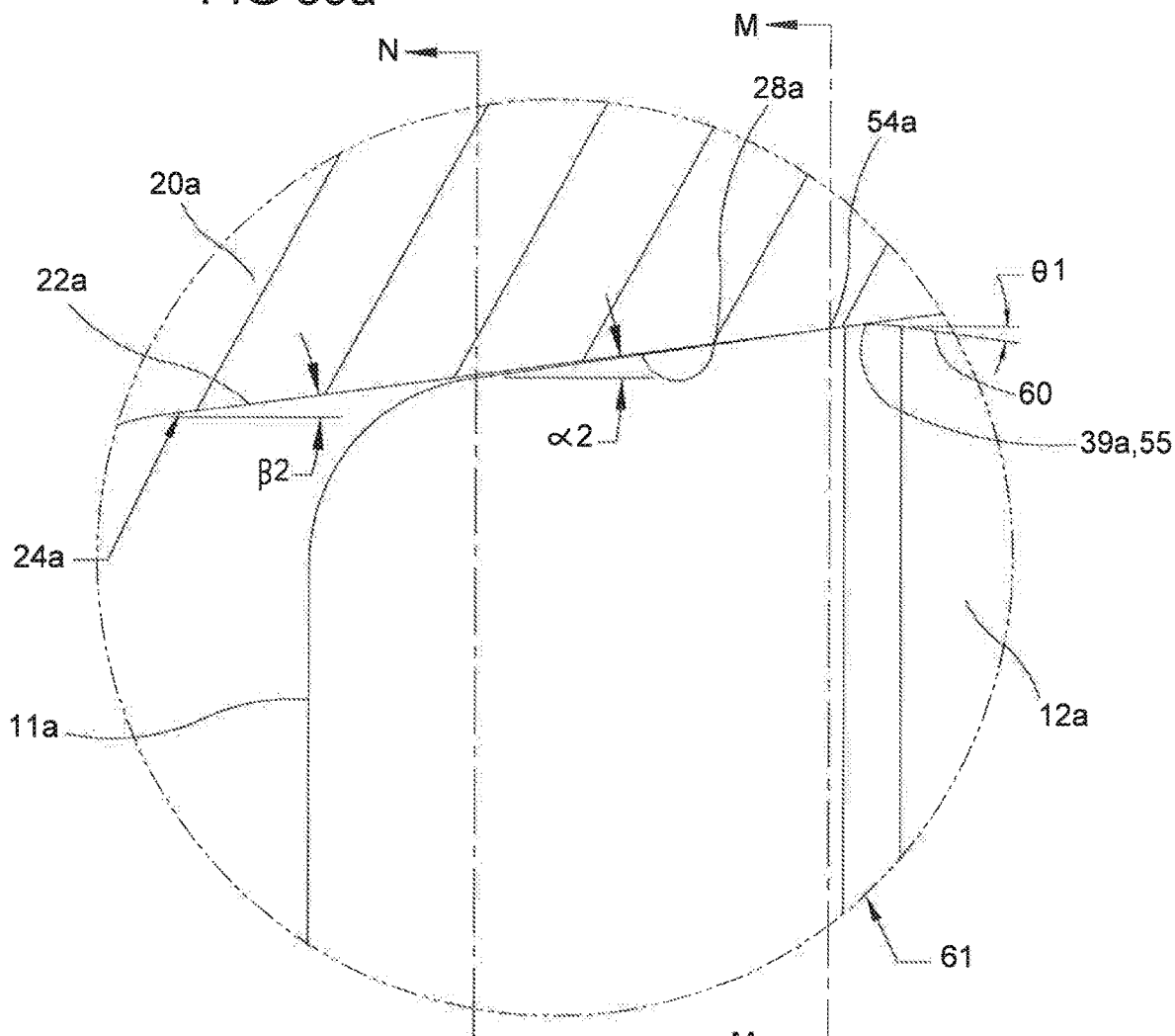

FIGS. 39a-39b show the drive bit 10a engaged with the fastener 20a, wherein the fastener 20a is shown in cross-section (FIG. 39a), and FIG. 39b includes an enlarged view of encircled portion 61 shown in FIG. 39a.

As shown in FIGS. 39a and 39b, the bit 10a (shown in FIGS. 26a-27, 35 and 39a) having pilot end 12a and the longitudinal axis 30a engaging the fastener 20a having the longitudinal axis 26a in the internal pilot recess 24a (the internal pilot recess 24a shown engaged with the pilot end 12a in FIGS. 39a, 39b, 40b, and 41b).

As shown in more detail in FIG. 39b, the pilot end 12a has a circumferential line of contact 54a at the tangent to the apex radius 55. The inner pilot recess wall 22a is tapered with respect to the recess longitudinal axis 26a to define a recess wall angle β2 having a plurality of recess wall angle values ranging within a recess wall angle tolerance band.

In an embodiment, as discussed with reference to FIG. 39b, the plurality of leading wall angle values are equal to or are between a maximum leading wall angle value $α2_{max}$ and a minimum leading wall angle value $α2_{min}$. Similarly, in an embodiment shown in FIG. 39b, the plurality of recess wall angle values are equal to or are between a maximum recess wall angle value $\beta 2_{max}$ and a minimum recess wall angle value $\beta 2_{min}$.

In an embodiment of the invention as shown in Chart 3, the recess wall angle $\beta 2$ is the same as recess wall angle $\beta 1$, and the recess wall angle tolerance band for the recess wall angle $\beta 2$ is the same as the recess wall angle tolerance band for the recess wall angle $\beta 1$, and wherein $\beta 2_{min\ equals}\beta 1_{min}$ and $\beta 2_{max}$ equals $\beta 1_{max}$. Thus, as all of the angle values for $\alpha 1$, and $\beta 2$, as well as their associated tolerance bands and tolerance band gaps are the same, the discussion above with regard to Chart 3 for bit 12 and internal pilot recess 24 equally applies to Chart 4 below, which is a tolerance band gap chart for bit 12a and internal pilot recess 24a

CHART 4

| Leading Wall Angle α2 | | Recess Wall Angle β2 | | % Difference $(\alpha 2_{max} - \beta 2_{min})/\beta 2_{min}$ | % Difference $(\alpha 2_{min} - \beta 2_{max})/\beta 2_{max}$ |
|---|---|---|---|---|---|
| α21$_{max}$ | 10.00° | β2$_{max}$ | 7.75° | 38% | |
| α2$_{min}$ | 7.76° | β2$_{min}$ | 7.25° | | 0.13% |
| α2 Tolerance Band | 2.24° | β2 Tolerance Band | 0.50° | | |
| Tolerance Band Gap (α1$_{min}$ > β2$_{max}$) | 0.01° | | | | |

In an embodiment, the trailing wall angle θ1 (shown in FIG. 39b) is greater than the leading wall angle α2 (shown in FIG. 39b). As discussed previously with respect to FIG. 32b, the angle θ1 exists to allow trailing wall 60 to form a back taper, thereby avoiding having the leading wall 28a contact recess wall 22a at another location other than at the circumferential line of contact 54a.

As shown in FIG. 39b, the tangent of the apex radius 55 of the pilot end 12a having tapered outer leading wall 28a that is tapered at the angle α2 contacts the inner pilot recess wall 22a within the fastener recess 24a at a targeted focal area that defines the circumferential line of contact 54a between the tangent to the apex radius 55 and the inner pilot recess wall 22a to form a frictional engagement with the fastener 20a.

Figure 40A:
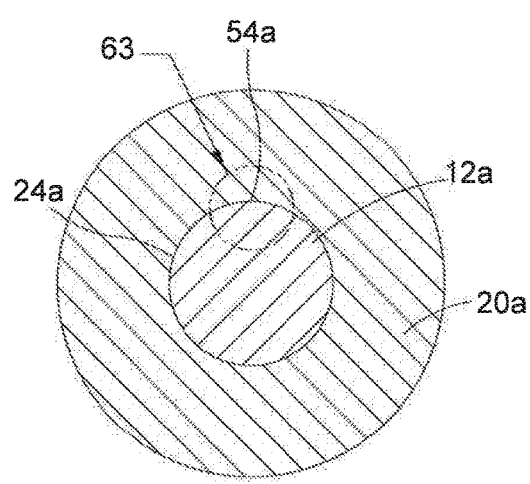
FIG. 40a is a cross-sectional view taken along line M-M of FIG. 39b.
Figure 40B:
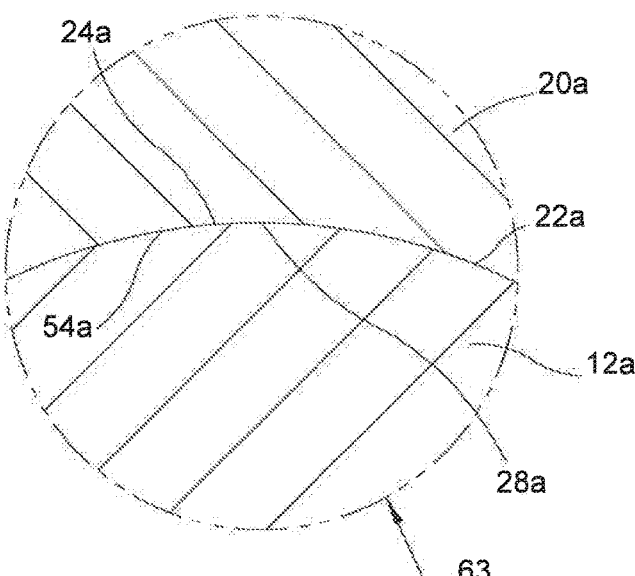

FIGS. 40a and 40b show more detailed views of the cross-sectional view taken along line M-M of FIG. 39b. More specifically, FIG. 40a is a cross-sectional view taken along line M-M of FIGS. 39b, and 40b is an enlarged view of the encircled portion 63 of FIG. 40a. FIGS. 40a and 40b show the circumferential line of contact 54a between the leading wall 28a of the internal pilot recess 24a (FIG. 40b) of the pilot end 12a of the drive bit 10a (shown in FIG. 39a) and the pilot recess wall 22a.

FIGS. 39a, 39b, 40a, and 40b show the frictional engagement between the pilot end 12a of the bit 10a and the pilot recess 24a of the fastener 20a. As shown in FIGS. 39a, 39b, 40a, and 40b, the targeted focal area includes the circumferential line of contact 54a at the tangent to the apex radius 55 of the pilot bit 12a (shown in FIG. 39b). When the tangent to the apex radius 55 engages the pilot recess 24a at the circumferential line of contact 54a, the highest stress concentrations occur at the circumferential line of contact 54a.

As discussed previously, the apex radius 55 is greater than the bit end 12 apex 39 having a minimal apex radius 13, and thus, has more contact surface area to more evenly distribute stresses over the larger target focal area of the circumferential line of contact 54a than at the circumferential line of contact 54 as shown in FIGS. 23a-23b. The radius 55 is greater than the radius 13, and thus, the apex radius 55 allows for the contact stress to be distributed across the circumferential line of contact 54a over a larger area than the higher contact stresses concentrated at apex 39 having the minimal radius 13 of pilot bit 10 (as shown in FIGS. 15, and 23b) to allow for a consistent and reliable frictional engagement between the drive bit 10a and the fastener 20a at the circumferential line of contact 54a.

FIGS. 40a and 40b show more detailed views of the cross-sectional view taken along line M-M of FIG. 39b. More specifically, FIG. 40a is a cross-sectional view taken along line M-M of FIGS. 39b, and 40b is an enlarged view of the encircled portion 63a of FIG. 40a. FIGS. 40a and 40b show the circumferential line of contact 54a between the leading wall 28a (FIG. 40b) of the pilot end 12a of the drive bit 10a (shown in FIG. 39a) and the inner pilot recess wall 22a.

FIGS. 39a, 39b, 40a, and 40b show the frictional engagement between the pilot end 12a of the bit 10a and the pilot recess 24a of the fastener 20a. As shown in FIGS. 39a, 39b, 40a, and 40b, the targeted focal area includes the circumferential line of contact 54a at the tangent to the apex radius 55 of the pilot bit 12a (shown in FIG. 39b). When the tangent to the apex radius 55 of the pilot end 12 engages the pilot recess 24a at the circumferential line of contact 54a, the highest stress concentrations occur at the circumferential line of contact 54a.

Figure 41A:
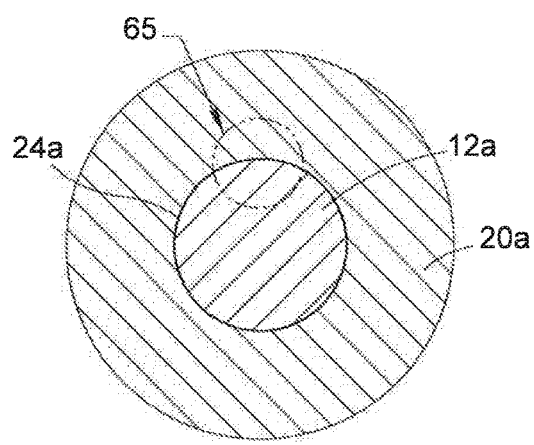
FIG. 41a is a cross-sectional view taken along line N-N of FIG. 39b.
Figure 41B:
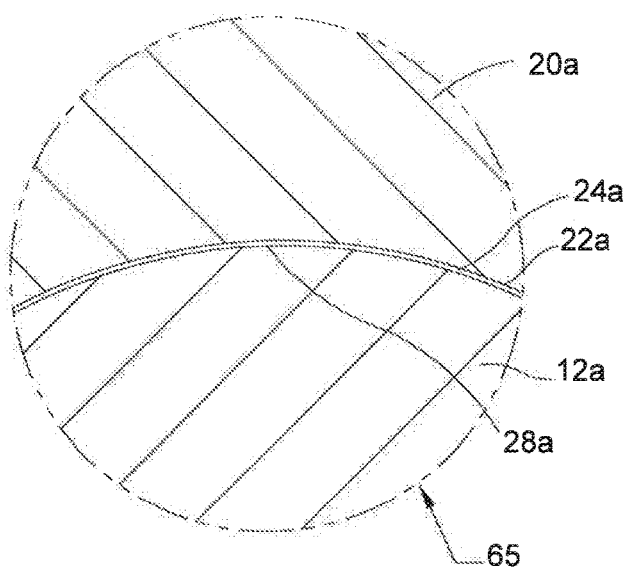

FIGS. 41a and 41b show more detailed views of the cross-sectional view taken along line N-N of FIG. 39b on a plane further down longitudinally in the pilot recess 24a than the plane of the line M-M shown in FIG. 39b. More specifically, FIG. 41a is a cross-sectional view taken along line N-N of FIGS. 39b, and 41b is an enlarged view of the encircled portion 65 of FIG. 41a. As shown in FIGS. 41a and 41b, the pilot end 12a does not contact the fastener 20a across section N-N. As shown in more detail in FIG. 41b, the leading wall 28a of the pilot end 12a of the drive bit 10a is spaced away from the pilot recess wall 22a of the pilot recess 24a.

As discussed above, since respective tolerance bands for the leading wall angle values of the tapered pilot end outer leading wall 28a and for the recess wall angles values of the inner pilot recess wall 22a do not overlap, then all portions of the pilot end 12a longitudinally between the tangent to the apex radius 55 and the end surface 1a (shown in FIGS. 35 and 39b) of the pilot end 12a of the drive bit 10a do not contact the pilot recess wall 22a. There is a predefined axial distance between the two tapered walls 22a, 2a8 that is defined by the maximum value $\beta 2_{max}$ of the recess wall angle β2, and the minimum value $\alpha 1_{max}$ of the leading wall angle α1, which, in an embodiment, is greater than $\beta 2_{max}$. Thus, this ensures that the targeted focal area is at the tangent to the apex radius 55 of the drive bit 10.

FIGS. 42a, 42b, and 43-44 illustrate a drive bit 10b having a pilot end 12b that is in accordance with an alternative embodiment.

More specifically, FIG. 42a is a perspective view of a drive bit 10b that has a pilot end 12b that is in accordance with an embodiment. FIG. 42b is a side view of the drive bit 10b, and FIG. 43 is an end view of the drive bit 10b.

As shown in FIGS. 42a-42b, the drive bit 10b comprises a portion 14b for engaging a driver, a drive portion 16b, and a pilot end 12b. Similar to the pilot end 12 shown in FIGS. 1-3, the pilot end 12b is configured to engage a pilot recess in a fastener, and is specifically configured to provide for consistent and reliable frictional engagement between the drive bit and the fastener. This embodiment is specifically directed at that portion of the drive bit (i.e., the pilot end 12b), and the other portions (i.e., 14b, and 16b) can very well be conventional.

The drive bit 10b is configured such that it can engage many different fastener recess profiles, similar to the fastener recesses disclosed above with respect to bit 10.

As shown in FIGS. 42a-42b, the pilot end 12b of the drive bit 10b has a leading wall 28b that is tapered relative to a longitudinal axis 30b (shown in FIGS. 42a, 42b, and 43) of the drive bit 10b. Regardless, the drive bit 10b is configured to engage the drive recess of a fastener and provide consistent and reliable frictional engagement relative thereto. How that is achieved will now be described.

Figure 48A:
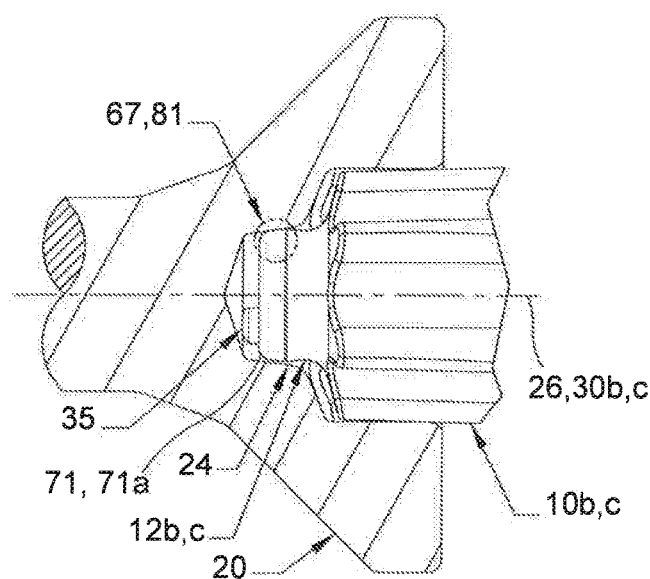
FIG. 48a shows a side cross sectional view of a top portion of the fastener shown in FIG. 45a-47 engaged with the pilot end shown in FIG. 44.
Figure 48B:
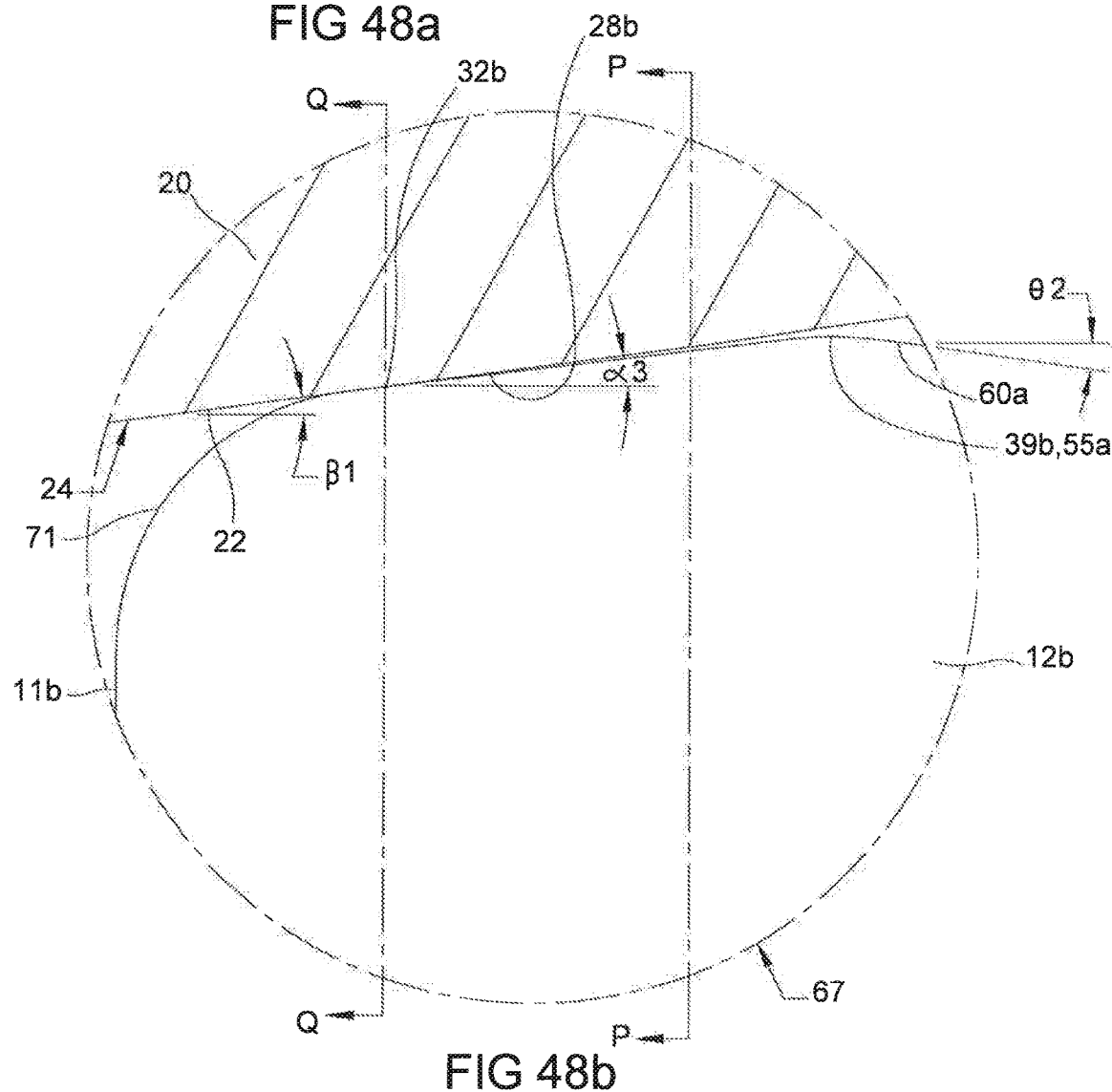

As shown in FIGS. 42a-42b, 43-44, 48a-48b the drive bit 10b provides that the pilot end 12b of the drive bit 10b includes an apex 39b having an apex radius 55a (shown in FIG. 44, 48b). FIGS. 42a-42b and 48a show the drive bit 10b further including the longitudinal axis 30b, the leading wall 28b extending longitudinally below the apex 39b terminating at an end surface 11b (shown in FIGS. 44, and 48b) and an optional trailing wall 60a (shown in FIGS. 42b, 44, and 48b) that extends longitudinally above the apex 39b towards the drive portion 16b. Additionally, the pilot end 12b has a bit end radius 71 disposed between the end surface 11b (FIGS. 44, and 48b) and the leading wall 28b. The pilot end 12b engages the fastener 20 (shown in FIGS. 44, 48a, 48b, 50a, 50b) at least one point of contact 32b.

In an embodiment shown in FIG. 44 is a side view of a portion of the drive bit 10b shown in FIGS. 42a-42b and 43, namely an end portion of the drive bit 10b including the pilot end 12b terminating in the end surface 11b, the pilot end 12b having a leading wall 28b, showing two of the points of contact 32b between the pilot end 12b of the drive bit 10b and a fastener 20. The pilot end 12b has the apex 39b with the radius 55a (shown in FIGS. 42a-44 and 48b) and a back trailing wall 60a (shown in FIGS. 42a-42b, 44, and 48b) that that extends from the apex 39a longitudinally upward towards the drive portion 16b to form a back taper, wherein the leading wall 28b and the trailing wall 60a meet at the apex 39b.

The fastener 20 is referenced above in FIGS. 5a, 5b, 6, 7, 12a, 12b, 13a, 13b, 14a, and 14b and is referenced herein with respect to this embodiment in FIGS. 45a-47, and 48a-50b. FIGS. 45a, 45b, 46, and 47 show the fastener that is the same as fastener 20 shown in FIGS. 5a, 5b, 6, 7, with like reference numbers shown for like elements. However, since the bit 10b shown in FIGS. 42a, 42b, 43 and 44 is different than bit 10 shown in FIGS. 1-4, the bit 10b contacts the flats 35 on the fastener 20 as shown in FIGS. 45a, 45b, 46, and 47 at contact points 32b.

Figure 45A:
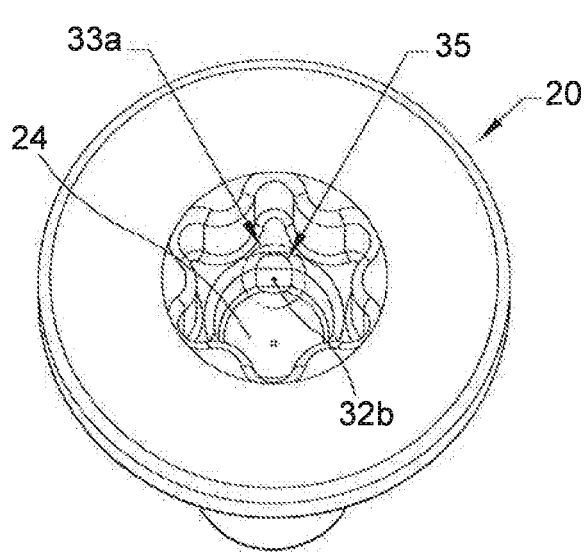
FIG. 45a is a perspective view of a top of a fastener having an internal pilot recess with recess flats on an inner recess wall that engages the fastener shown in FIG. 44.
Figure 45B:
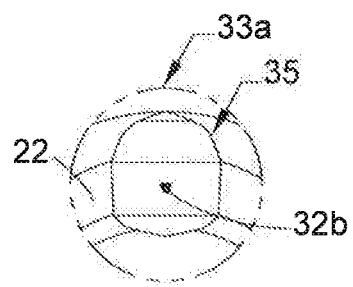

FIG. 45a is a perspective view of a top of the fastener 20, showing at least one point of contact 32 that occurs when between pilot end 12b of the drive bit 10b contacts the internal pilot recess 24 of the fastener 20; and FIG. 45b is a an enlarged view of the encircled portion 33a showing an inner pilot recess wall 22 having at least one flat 35 integrally formed with the inner pilot recess wall 22.

Figure 46:
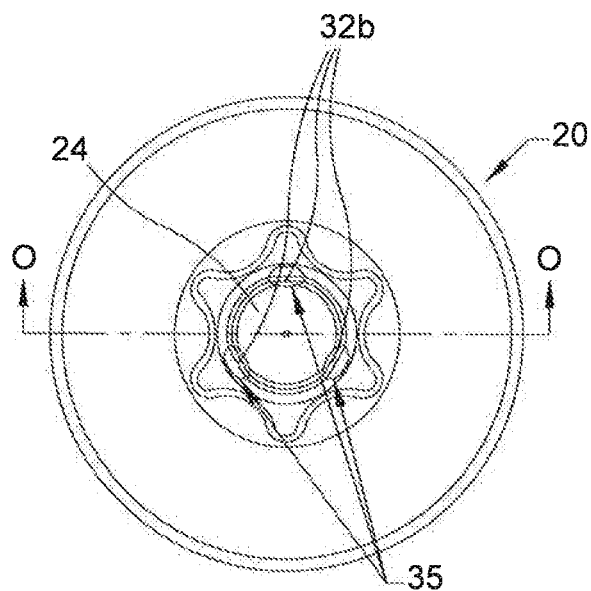

FIG. 46 is a top view of the fastener 20, showing the points of contact 32 between the pilot fastener recess 24 at the flats 35 and the pilot end 12b.

Figure 47:
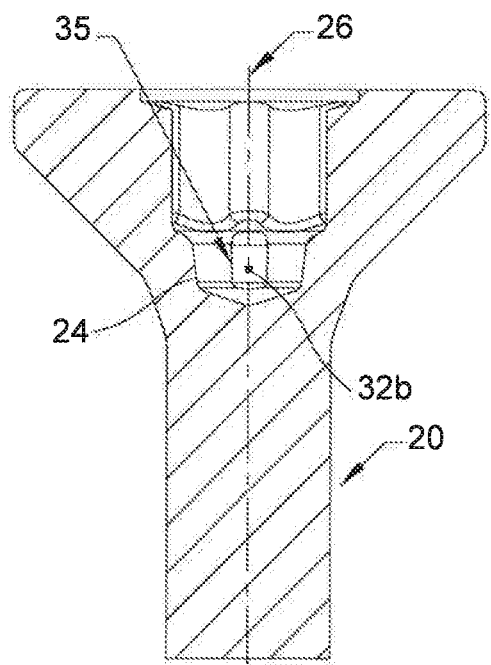
FIG. 47 is a cross-sectional view taken along line O-O of FIG. 46.

FIG. 47 is a cross-sectional view taken along line O-O of FIG. 46, showing the at least one point of contact 32b between pilot end 12b (the points of contact 32b on the pilot end 12b are shown in FIGS. 47, 48a, 48b, 50a, and 50b) and the pilot recess flat 35, the fastener having a longitudinal axis 26 (also shown in FIG. 48a), As shown in FIGS. 48a and 48b show bit 10b (FIG. 48a), having pilot end 12b (FIG. 48b) that engages fastener 20 in the pilot recess 24 having pilot recess flat 35 and longitudinal axis 26. FIG. 48a shows a side cross sectional view of a top portion of the fastener 20 engaged with the pilot end 12b; FIG. 48b provides an enlarged view of the encircled portion 67 shown in FIG. 48a.

As shown in more detail in FIG. 48b, the pilot end 12b outer leading wall 28b is tapered with respect to the pilot end longitudinal axis 30b to define a leading wall angle α3 having a plurality of leading wall angle values ranging within a leading wall angle tolerance band. Similarly, the inner pilot recess wall 22 is tapered with respect to the recess longitudinal axis 26 to define a recess wall angle β1 having a plurality of recess wall angle values ranging within a recess wall angle tolerance band.

The plurality of leading wall angle values are equal to or are between a maximum leading wall angle $α3_{max}$ and a minimum leading wall angle $α3_{min}$; and wherein the plurality of recess wall angle values are equal to or are between a maximum recess wall angle $β1_{max}$ and a minimum recess wall angle $β1_{min}$.

A tolerance band gap exists between the leading wall angle tolerance band and the recess wall tolerance band. In an embodiment of the invention, when the recess wall angle is greater than the leading wall angle, the tolerance band gap is the difference between $β1_{min}$ and $α3_{max}$.

There is no tolerance band overlap of the plurality of leading wall angle values within the leading wall angle tolerance band with the plurality of recess wall angle values within the recess wall angle tolerance band when the minimum recess wall angle is greater than or equal to the maximum leading wall angle $α3_{max}$.

If the tolerance band gap is equal to or greater than zero, then there is no tolerance band overlap between the leading wall tolerance angle band and the recess wall angle tolerance band.

In an embodiment, shown in FIG. 48b, the leading wall 28b of the pilot end 12b of the bit 10b is tapered at the angle α3, which is less than the angle β1 of the inner pilot recess wall 22 of the fastener 20. The relationship between: these two tapers and the bit end radius 71 is what provides the frictional engagement at the targeted focal area.

In an embodiment, the difference between α3 and β1, and the bit end radius, causes the point of contact to be in a targeted focal area. These variables ensure consistent contact at the targeted focal area, which is at the contact points 32b, and which allow for greater manufacturing variation of the recess pilot taper angle β1 and inner pilot recess wall 22 diameter.

More particularly, in an embodiment shown in FIG. 48b, the $β1_{min}$ is greater than $α3_{max}$ by a tolerance band gap greater than zero, thereby ensuring that the tangent to the bit end radius 71 of the pilot end 12b contacts the inner pilot recess wall 22 only at the targeted focal area and nowhere else between the leading wall 28b and the inner pilot recess wall 22. Since the tolerance band gap is greater than zero, then there cannot be an overlap of the angles α3 and β1.

If the tolerance band gap is less than zero, then $β1_{min}$ is less than $α3_{max}$ and then $β1_{min}$ would fall within the recess wall angle tolerance band and thus, there would be a tolerance band overlap of the leading wall angle tolerance band with the recess wall angle tolerance band, which is undesirable and which could cause the leading wall 28b of the pilot end 12b to contact the inner pilot recess wall 22 of the internal pilot recess 24 at another point or points other than at the targeted focal area.

In an embodiment of the invention, the tolerance band gap is greater than zero as shown in the chart 5 below, which is the Tolerance band gap chart for pilot end 12b and inner pilot recess 24 (Chart 5).

CHART 5

| Leading Wall Angle $\alpha 3$ | | Recess Wall Angle $\beta 1$ | | % Difference $(\beta 1_{min}\text{-}\alpha 3_{max})$ $\beta 1_{min}$ | % Difference $(\beta 1_{max}\text{-}\alpha 3_{min\text{-}})$ $\beta 1_{max}$ |
|---|---|---|---|---|---|
| $\alpha 3_{max}$ | 7.24° | $\beta 1_{max}$ | 7.75° | 0.14% | |
| $\alpha 3_{min}$ | 5.00° | $\beta 1_{min}$ | 7.25° | | 35% |
| $\alpha 3$ Tolerance Band | 2.24° | $\beta 1$ Tolerance Band | 0.50° | | |
| Tolerance Band Gap ($\alpha 3_{max} < \beta 1_{min}$) | 0.01° | | | | |

As shown in Chart 5, the tolerance band gap in particular, is the difference between $\beta 1_{min}$ and $\alpha 3_{max}$, wherein $\beta 1_{min} > \alpha 3_{max}$, and thus, the tolerance band gap is greater than zero (shown as) 0.01° and no tolerance band overlap occurs between the leading wall angle tolerance band (shown as 2.24°, which is the maximum span for the angle values for leading wall angle $\alpha 3$, i.e., $\alpha 3_{min} <= \alpha 3_{max}$) and the recess wall angle tolerance band (shown as 0.50°, which is the maximum span for the angle values for leading wall angle 131, i.e., $\beta 1_{min} <= \beta 1_{max}$).

In particular, as shown with respect to this non-limiting embodiment, the $\alpha 3_{min}$ (5.00°) is less than or equal to $\alpha 3_{max}$ (7.24°, the leading wall angle tolerance band, 2.24°, is the difference between $\alpha 3_{max}$ and $\alpha 3_{min}$, (7.24°-5.00°), and the wherein the recess wall angle tolerance band, 0.50°, is the difference between $\beta 1_{min}$ and $\beta 1_{max}$ (7.75°-7.25°).

In an embodiment of the invention, the tolerance band gap is the difference between $\beta 1_{min}$ and $\alpha 3_{max}$, wherein $\beta 1_{min} > \alpha 3_{max}$, thus $\beta 1_{min}$ (7.25°) is greater than $\alpha 3_{max}$ (7.24°) by the amount of the tolerance band gap (0.01°).

In this embodiment, the minimum recess wall angle $\beta 1_{min}$ (7.25°) is 0.14 percent greater than the maximum leading wall angle $\alpha 3_{max}$ (7.24°) and the maximum recess wall angle $\beta 1_{max}$ (7.75°) is 35 percent greater than the minimum leading wall angle $\alpha 3_{min}$ (5.00°). However, the embodiment described with respect to Chart 5 is not limited to the specific values for the variables disclosed in the chart as the chart is for illustrative purposes only.

As shown in FIG. 48b, pilot end 12b contacts the inner pilot recess wall 22 at a targeted focal area that defines the at least one point of contact 32b. The at least one point of contact 32b is at a point of tangency of bit end radius 71 and the leading wall 28b of the pilot end 12b, which is a predefined nominal distance both axially outward from and longitudinally above the end surface 11b. The pilot end 12b engages the inner pilot recess wall 22 at least one point of contact 32b, i.e., at the recess flats 35, to form a frictional engagement with the fastener 20. The level of frictional engagement at the targeted focal area can range between a friction fit up to a jam fit depending on the desired amount of deformation desired on the inner pilot recess wall 22.

The proportion of the area at the point of contact 32b, i.e. the contact area at the targeted focal area between the inner pilot recess wall 22 and the leading wall 28b, to the circumference of the inner pilot recess wall 22 is greatest at the bottom of the recess and the proportion of the contact area to the circumference of the recess wall decreases as the pilot end 12b moves longitudinally upward in the interior pilot recess 24. Thus, as the contact area between the inner pilot recess wall 22 and leading wall 28b is greatest at the bottom of the interior pilot recess 24, there is greater frictional engagement if the pilot end 12b contacts the interior pilot recess 24 at the bottom of the internal pilot recess 24 than longitudinally towards the top of the recess.

In an embodiment of the invention, the trailing wall 60a is optional and has than wall angle θ2 (shown in FIG. 48b) relative to the longitudinal axis 30b of the drive bit 10b that is greater than the leading wall angle $\alpha 3$ (shown in FIG. 48b) and the recess wall angle θ1. The angle θ2 exists to allow trailing wall 60a to form a back taper, thereby avoiding having the leading wall 28b contact recess wall 22 within the internal pilot recess 24 at another location other than at the recess flat 35 at the at least one point of contact 32b.

Figure 50A:
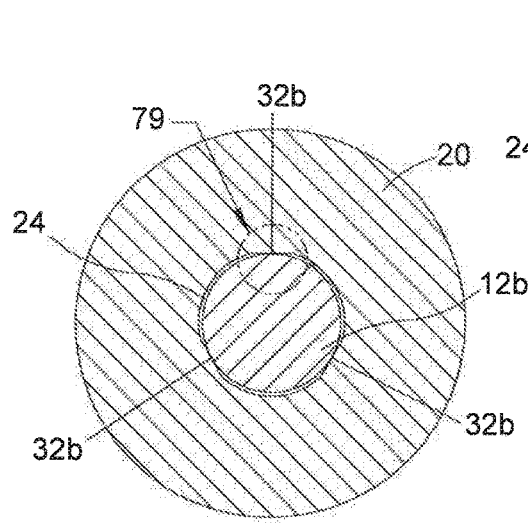
FIG. 50a is a cross-sectional view taken along line Q-Q of FIG. 48b.
Figure 50B:
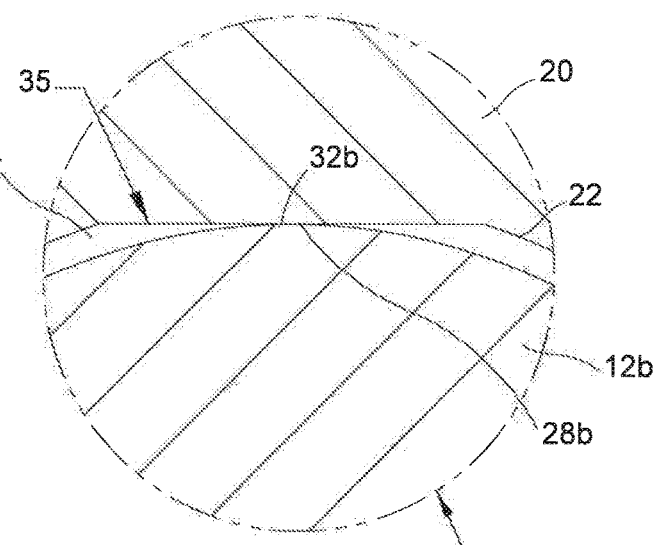
FIG. 50b is an enlarged view of the encircled portion 79 of FIG. 50b.

FIGS. 50a and 50b show more detailed views of the cross-sectional view taken along line Q-Q of FIG. 48b. More specifically, FIG. 50a is a cross-sectional view taken along line Q-Q of FIGS. 48b, and 50b is an enlarged view of the encircled portion 79 of FIG. 50a. FIGS. 50a and 50b show the contact points 32b between the leading wall 28b (FIG. 50b) of the pilot end 12b of the drive bit 10b (shown in FIG. 48b) and the pilot recess flat 35.

FIGS. 48a, 48b, 50a, 50b show the frictional engagement between the pilot end 12b of the bit 10b and the pilot recess 24 of the fastener 20. As shown in FIGS. 48a, 48b, 50a, 50b, the targeted focal area includes the at least one point of contact 32b at the point of tangency where the bit end radius 71 contacts the inner pilot recess wall 22 at the pilot recess flats 35 (shown in FIGS. 48b, and 50b).

When the bit end radius 71 of the pilot end 12b engages the internal pilot recess 24 at the pilot recess wall flats 35, the stress concentrations occur in the recess pilot wall at the flats 35 but are less than the stress concentrations occurring in the flats 35 shown with respect to FIGS. 12a-12b for pilot 12 having the apex 39 with minimal radius 13. The bit end radius 71 is greater than the radius 13, and thus, the bit end radius 71 allows for the contact stress to be distributed across the contact points 32b over a larger area than the higher contact stresses concentrated at apex 39 having the minimal radius 13 of pilot bit 10 (as shown in FIGS. 4, and 12b) to allow for a consistent and reliable frictional engagement between the drive bit 10b and the fastener 20 at the contact points 32b. The level of frictional engagement at the targeted focal area can range between a friction fit up to a jam fit depending on the desired amount of deformation desired on the inner pilot recess wall 22.

Figure 49A:
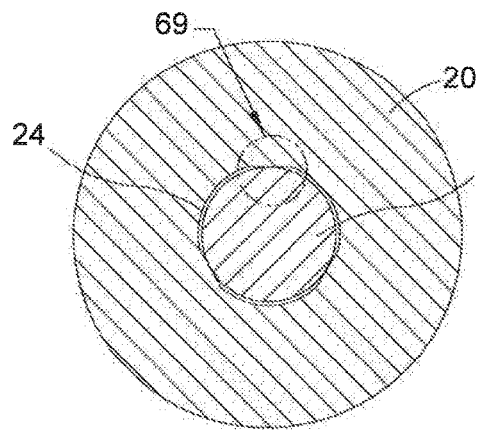
FIG. 49a is a cross-sectional view taken along line P-P of FIG. 48b.
Figure 49B:
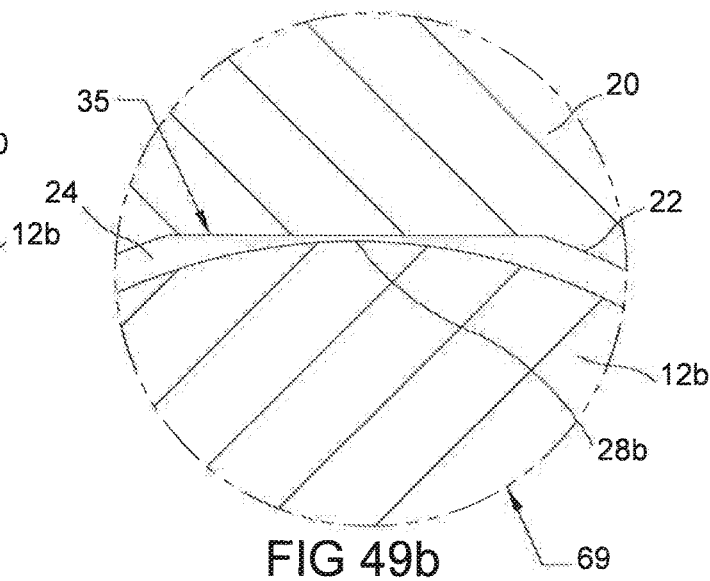

FIGS. 49a and 49b show more detailed views of the cross-sectional view taken along line P-P of FIG. 48b on a plane further up in the pilot recess 24 than the plane of the line Q-Q shown in FIG. 48b.

More specifically, FIG. 49a is a cross-sectional view taken along line P-P of FIGS. 48b, and 49b is an enlarged view of the encircled portion 69 of FIG. 48a. As shown in FIGS. 49a and 49b, the pilot end 12b does not contact the fastener 20 across section P-P. As shown in more detail in FIG. 49b, the leading wall 28b of the pilot end 12b of the drive bit 10b is spaced away from the pilot recess flats 35 of the pilot recess wall 22 of the pilot recess 24.

As discussed above, since respective tolerance bands for both the leading wall angle tolerance and the recess wall angle tolerance band do not overlap, then all portions of the pilot end 12b longitudinally above the tangent of the bit end radius 71 towards the drive portion 16b (shown in FIG. 42a) of the pilot end 12b of the drive bit 10b do not contact the pilot recess wall 22.

There is a predefined axial distance between the two tapered walls 22, 28b that is defined by the maximum value $\alpha3_{max}$ of the leading wall angle $\alpha3$, and the minimum value $\beta1_{min}$ of the recess wall angle $\beta1$, which, in an embodiment, $\alpha3_{max}$ is less than $\beta1_{min}$. Thus, this ensures that the targeted focal area is at the tangent of the bit end radius 71 of the drive bit 10b.

The foregoing description discussed the drive bit 10b engaging a pilot recess 24 having flats. However, the drive bit 10b can also be engaged with a fastener having an internal pilot recess that is round (i.e., in cross section, but tapers or is conical in terms of depth).

As such, FIGS. 51-57b are equally applicable to the drive bit 10b shown in FIGS. 42a-42b, and 43 with regard to providing a single circumferential line of contact 54b, instead of at least one point of contact 32b. Much like the embodiments described previously, the drive bit 10b shown in FIGS. 42a-42b, and 43-44 can engage many different pilot recess profiles. To this end, preferably the tapered pilot end 12b of the drive bit 10b engages a conical internal pilot recess 24a having a round cross-section. The fastener recess 24a is the same as the fastener recess 24a disclosed with respect to FIGS. 16-18 above.

Figure 51:
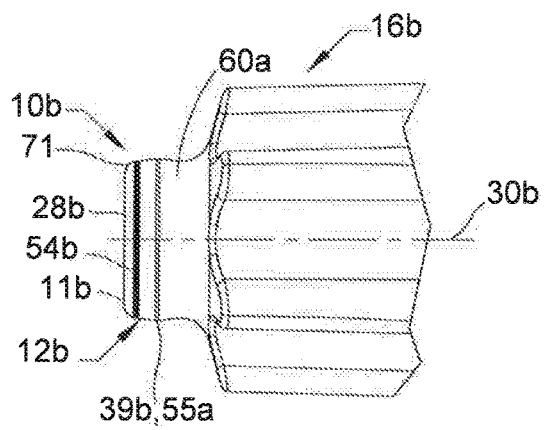
FIG. 51 is a cross-sectional view of a pilot end of the drive bit shown in FIGS. 42a-44 in accordance with an embodiment of the invention.

FIG. 51 is a cross-sectional view of pilot end 12b of the drive bit 10b, wherein the pilot end 12b is the same pilot end 12b as shown in FIGS. 42a-44 with like reference numbers shown for like elements as disclosed with respect to the bit 12b, except, instead of points of contact 32b as shown in 48a-48b, 50a, and 50b, the bit 12b has a circumferential line of contact 54b at the tangent of the bit radius 71 when the bit 10b contacts a fastener with a conical recess having a round cross-section.

Figure 52:
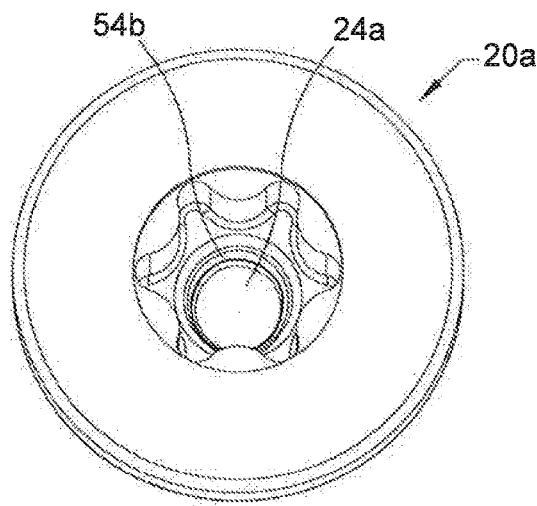
FIG. 52 is a top perspective view of a fastener having a pilot recess without the recess wall flats showing a circumferential line of contact.

FIG. 52 is a top perspective view of a fastener 20a, which is the same as fastener 20a shown in FIGS. 16-18 with like reference numbers shown for like elements as disclosed with respect to the fastener 20a having fastener recess 24a, except, instead of points of contact 32 as shown in 16-18, the bit 12b engages the fastener 20 to form a circumferential line of contact 54b FIG. 52 is a top perspective of the fastener 20a, showing the circumferential line of contact 54b that forms when the pilot end 12b of the drive bit engages the pilot recess 24a of the fastener 20a.

Figure 53:
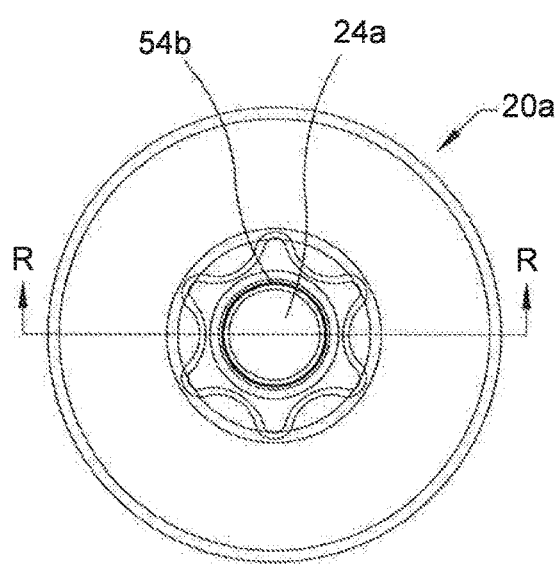
FIG. 53 is a top view of the fastener shown in FIG. 51.

FIG. 53 is a top view of the fastener 20a, showing the circumferential line of contact 54b between the pilot end 12b of the drive bit and the pilot recess 24a of the fastener 20a.

Figure 54:
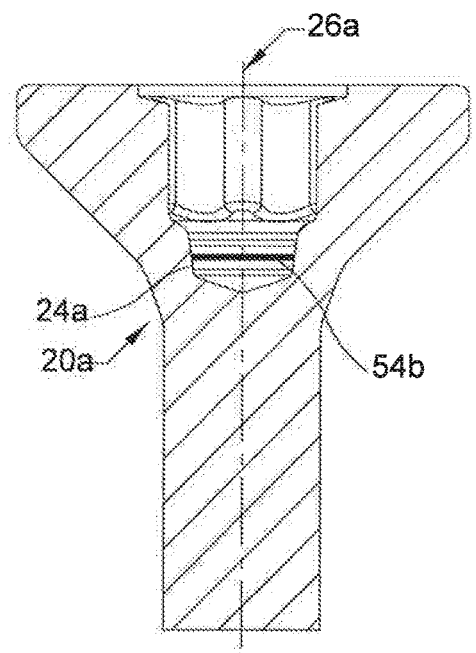
FIG. 54 is a cross-sectional view taken along line R-R of FIG. 52.
Figure 55A:
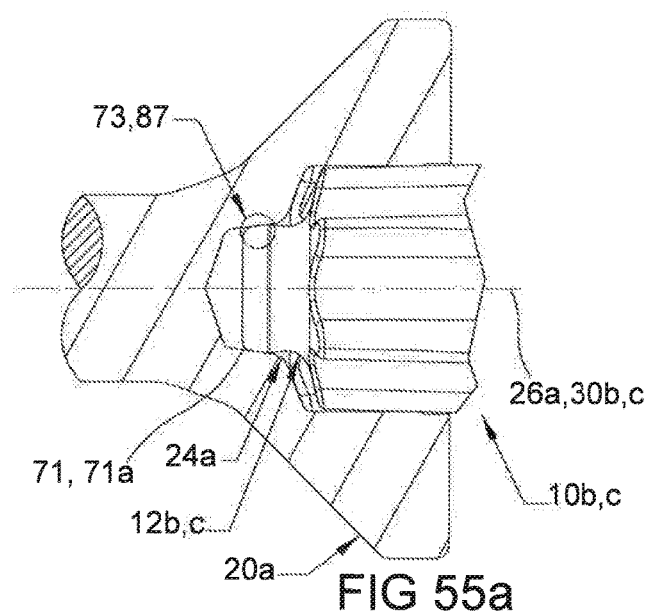
FIG. 55a shows the drive bit in accordance with an embodiment of the invention engaged with the fastener shown in FIGS. 52-54.
Figure 55B:
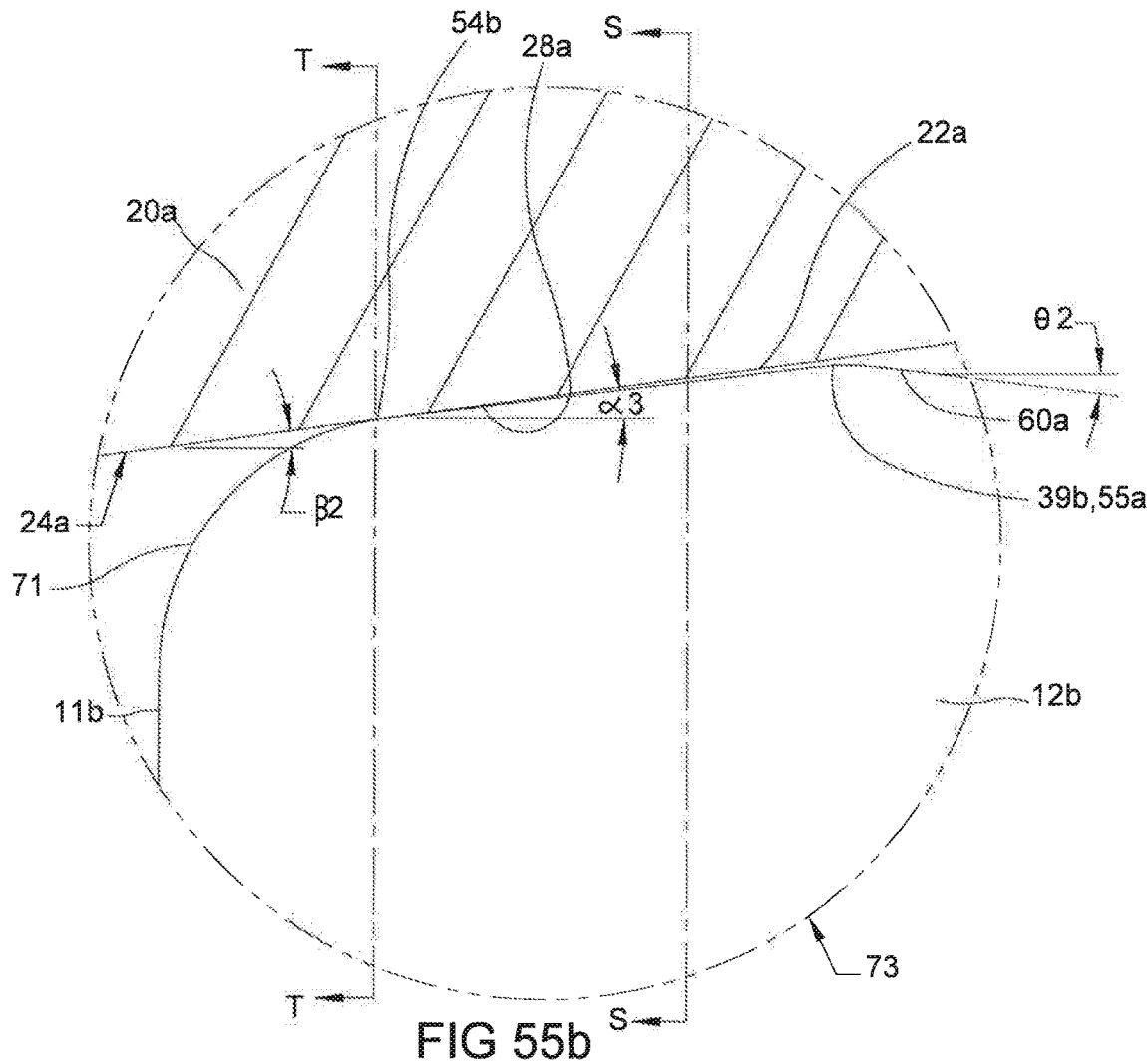

FIG. 54 is a cross-sectional view taken along line R-R of FIG. 53, showing the circumferential line of contact 54b between pilot end 12b of the drive bit 10b (shown in FIGS. 51, 55a-55b, 57a-57b), the fastener 20a having a longitudinal axis 26a and internal pilot recess 24a as shown in FIGS. 51, 55 and 55a.

FIGS. 55a-55b show the drive bit 10b engaged with the fastener 20a, wherein the fastener 20a is shown in cross-section (FIG. 55a), and FIG. 55b includes an enlarged view of encircled portion 73 shown in FIG. 55a.

As shown in FIGS. 55a and 55b, the bit 10b (also shown in FIGS. 42a-43, and 55a) having pilot end 12b and the longitudinal axis 30b engaging the fastener 20a having the longitudinal axis 26a in the internal pilot recess 24a (the internal pilot recess 24a shown engaged with the pilot end 12b in FIGS. 55a-57b).

As shown in more detail in FIG. 55b, the pilot end 12b has a circumferential line of contact 54b at the tangent to the bit end radius 71. The inner pilot recess wall 22a is tapered with respect to the recess longitudinal axis 26a to define a recess wall angle $\beta2$ having a plurality of recess wall angle values ranging within a recess wall angle tolerance band.

In an embodiment, as discussed with reference to FIG. 55b, the plurality of leading wall angle values are equal to or are between a maximum leading wall angle value $\alpha3_{max}$ and a minimum leading wall angle value $\alpha3_{min}$. Similarly, in an embodiment shown in FIG. 55b, the plurality of recess wall angle values are equal to or are between a maximum recess wall angle value $\beta2_{max}$ and a minimum recess wall angle value $\beta2_{min}$.

In an embodiment of the invention as shown in Chart 6, the recess wall angle $\beta2$ is the same as recess wall angle $\beta1$ as disclosed with reference to Chart 5, and the recess wall angle tolerance band for the recess wall angle $\beta2$ is the same as the recess wall angle tolerance band for the recess wall angle $\beta1$, and wherein $\beta2_{min}$ equals $\beta1_{min}$ and $\beta2_{max}$ equals $\beta1_{max}$. Thus, as all of the angle values for $\alpha3$, and $\beta2$, as well as their associated tolerance bands and tolerance band gaps are the same, the discussion above with regard to Chart 5 for bit 12b and internal pilot recess 24 equally applies to Chart 6 below, which is a tolerance band gap chart for bit 12b and internal pilot recess 24a.

CHART 6

| Leading Wall Angle $\alpha3$ | | Recess Wall Angle $\beta2$ | | % Difference ($\beta2_{min}$ − $\alpha3_{max}$)/$\beta2_{min}$ | % Difference ($\beta2_{max}$ − $\alpha3_{min}$)/$\beta2_{max}$ |
|---|---|---|---|---|---|
| $\alpha3_{max}$ | 7.24° | $\beta2_{max}$ | 7.75° | 0.14% | |
| $\alpha3_{min}$ | 5.00° | $\beta2_{min}$ | 7.25° | | 35% |
| $\alpha3$ Tolerance Band | 2.24° | $\beta2$ Tolerance Band | 0.50° | | |
| Tolerance Band Gap ($\alpha3_{max}$ < $\beta2_{min}$) | 0.01° | | | | |

As shown in FIG. 55b, pilot end 12b contacts the inner pilot recess wall 22a at a targeted focal area that defines the at least one circumferential line of contact 54b. The at least one circumferential line of contact 54b is at a point of tangency of bit end radius 71 and the leading wall 28b of the pilot end 12b, which is a predefined nominal distance both axially outward from and longitudinally above the end surface 11b. The pilot end 12b engages the inner pilot recess wall 22a at least one circumferential line of contact 54b, to form a frictional engagement with the fastener 20. The level of frictional engagement at the targeted focal area can range between a friction fit up to a jam fit depending on the desired amount of deformation desired on the inner pilot recess wall 22a.

The proportion of the area at the circumferential line of contact 54b, i.e. the contact area at the targeted focal area between the inner pilot recess wall 22a and the leading wall 28b, to the circumference of the inner pilot recess wall 22a is greatest at the bottom of the recess and the proportion of the contact area to the circumference of the recess wall decreases as the pilot end 12b moves longitudinally upward in the interior pilot recess 24. Thus, as the contact area between the inner pilot recess wall 22a and leading wall 28b is greatest at the bottom of the interior pilot recess 24, there is greater frictional engagement if the pilot end 12b contacts the interior pilot recess 24 at the bottom of the internal pilot recess 24 than longitudinally towards the top of the recess.

In an embodiment, the trailing wall 60a is optional and has trailing wall angle θ2 (shown in FIG. 55b) relative to the longitudinal axis 30b of the drive bit 10b that is greater than the leading wall angle α3 (shown in FIG. 55b) and the recess wall angle β1. The angle θ2 exists to allow trailing wall 60a to form a back taper, thereby avoiding having the leading wall 28b contact recess wall 22a within the internal pilot recess 24 at another location other than at the at least one circumferential line of contact 54b.

Figure 57A:
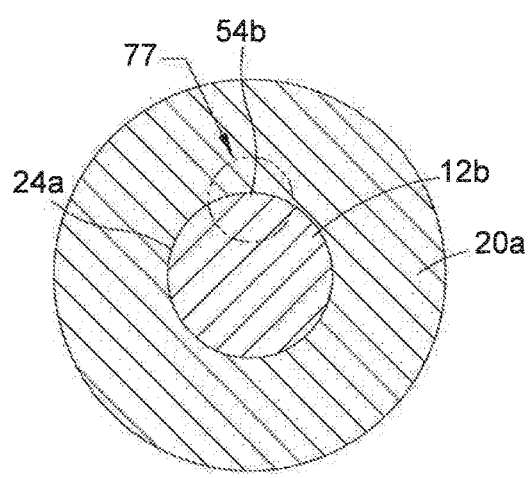
FIG. 57a is a cross-sectional view taken along line T-T of FIG. 55b.
Figure 57B:
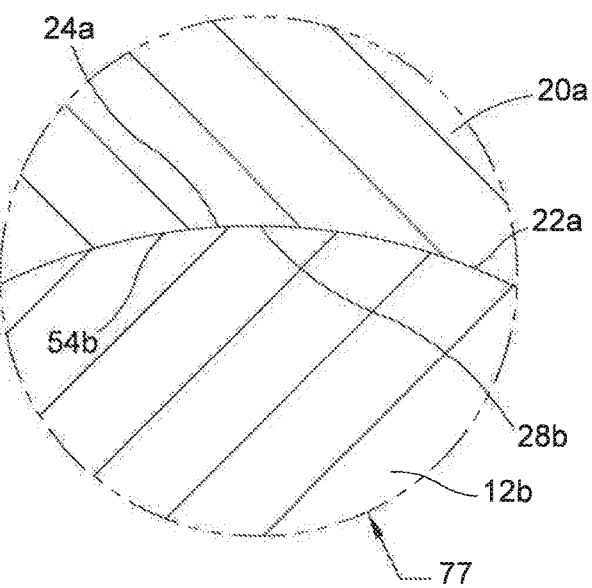

FIGS. 57a and 57b show more detailed views of the cross-sectional view taken along line T-T of FIG. 55b. More specifically, FIG. 57a is a cross-sectional view taken along line T-T of FIGS. 55b, and 57b is an enlarged view of the encircled portion 77 of FIG. 57a. FIGS. 57a and 57b show the circumferential line of contact 54b between the leading wall 28b (FIG. 57b) of the pilot end 12b of the drive bit 10b (shown in FIG. 55b) and the pilot recess wall 22a.

FIGS. 55a, 55b, 57a, 57b show the frictional engagement between the pilot end 12b of the bit 10b and the pilot recess 24a of the fastener 20. As shown in FIGS. 55a, 55b, 57a, 57b, the targeted focal area includes the at least one circumferential line of contact 54b at the point of tangency where the bit end radius 71 contacts the inner pilot recess wall 22a (shown in FIGS. 55b, and 57b).

Figure 56A:
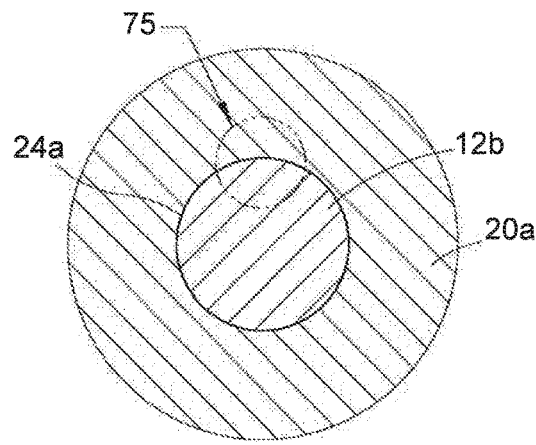
FIG. 56a is a cross-sectional view taken along line S-S of FIG. 55b.
Figure 56B:
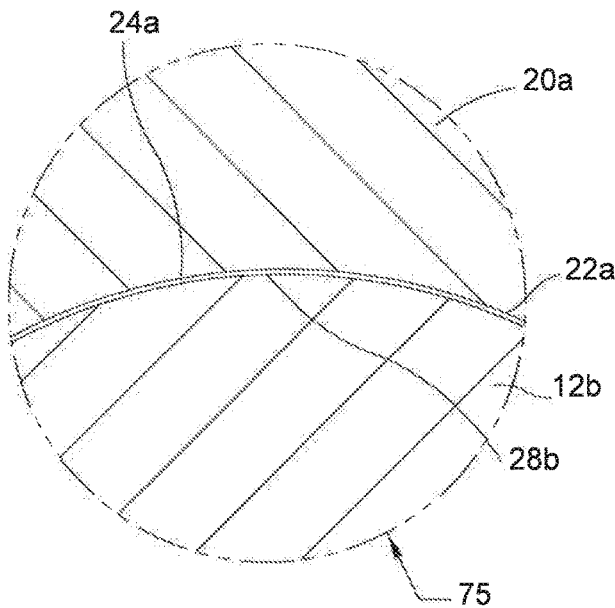

When the bit end radius 71 of the pilot end 12b engages the internal pilot recess 24 at the pilot recess wall 22a, the stress concentrations occur in the recess pilot wall 22a but are less than the stress concentrations occurring in the recess wall 22 shown with respect to FIGS. 23a-23b for pilot 12 having the apex 39 with minimal radius 13. The bit end radius 71 is greater than the apex radius 13, and thus, the bit end radius 71 allows for the contact stress to be distributed across the circumferential line of contact 54b over a larger area than the higher contact stresses concentrated at apex 39 having the minimal radius 13 of pilot bit 10 (as shown in FIGS. 4, and 12b) to allow for a consistent and reliable frictional engagement between the drive bit 10b and the fastener 20 at the circumferential line of contact 54b. The level of frictional engagement at the targeted focal area can range between a friction fit up to a jam fit depending on the desired amount of deformation desired on the inner pilot recess wall 22. FIGS. 56a and 56b show more detailed views of the cross-sectional view taken along line S-S of FIG. 55b on a plane further up in the pilot recess 24 than the plane of the line T-T shown in FIG. 55b.

More specifically, FIG. 56a is a cross-sectional view taken along line S-S of FIGS. 55b, and 56b is an enlarged view of the encircled portion 73 of FIG. 55a. As shown in FIGS. 56a and 56b, the pilot end 12b does not contact the fastener 20 across section S-S. As shown in more detail in FIG. 56b, the leading wall 28b of the pilot end 12b of the drive bit 10b is spaced away from the pilot recess wall 22a of the pilot recess 24.

As discussed above, since respective tolerance bands for both the leading wall angle tolerance and the recess wall angle tolerance band do not overlap, then all portions of the pilot end 12b longitudinally above the tangent of the bit end radius 71 towards the drive portion 16b (shown in FIG. 42a) of the pilot end 12b of the drive bit 10b do not contact the pilot recess wall 22a.

There is a predefined axial distance between the two tapered walls 22a, 28b that is defined by the maximum value $α3_{max}$ of the leading wall angle α3, and the minimum value $β1_{min}$ of the recess wall angle β1, which, in an embodiment, $α3_{max}$ is less than $β1_{min}$. Thus, this ensures that the targeted focal area is at the tangent of the bit end radius 71 of the drive bit 10b.

Initially, when a force is applied to achieve frictional engagement between the leading wall 28b and the inner pilot recess wall 22a, an initial contact between the leading wall 28b and the recess wall 22a is at the at least one point of contact 32b or at the circumferential line of contact 54b.

However, if additional force is applied then, depending on the tolerance band gap between the maximum value $α3_{max}$ of the leading wall angle α3, and the respective minimum value $β1_{min}$, $β2_{min}$ ($β1_{min}$ if the at least one point of contact 32b is at the flats 35 or $β2_{min}$ if the at least one point of contact is a circumferential line of contact 54b) of the respective recess wall angle β1, β2 then a gap between the leading wall 28b and the recess wall 22a may be reduced.

Referring now to the specific embodiments, in particular, FIGS. 58-63b illustrating several embodiments disclosed with respect to a pilot end 12c shown in FIGS. 42a-43, 48a, and 55a that engages two different embodiments of fastener recesses.

The bit 10c shown in 42a-43a, 48a, 55a is similar to the bit 10c described with reference to FIGS. 42a-43, and will be described with like reference numerals to identify like parts, and adding a letter suffix to the reference numerals.

In an embodiment of the invention, like bit 10b, shown in FIGS. 42a-43, and 48a, the bit 10c also engages fastener recess 20 as shown in FIGS. 45a-47, however, the bit 10c engages the fastener recess 24 at least one point of contact 32c, wherein the at least one point of contact 32c is a line of contact 32c shown in FIGS. 58, 59a-60b.

The bit end 12c includes all of the features of bit 12b but has a leading wall angle α4, wherein a maximum leading wall angle $α4_{max}$ is equal to the minimum recess wall angle $θ1_{min}$ at the at the line of contact 32c. The bit end radius 71a extends between the pilot end surface 11c and a lower portion of the outer leading wall 28c, wherein the targeted focal area is at a point of tangency longitudinally above the bit end radius 71a away from the pilot end surface 11c where the bit end radius 71a contacts the inner pilot recess wall 22 to form a frictional engagement with the fastener 20. The level of frictional engagement at the targeted focal area can range between a friction fit up to a jam fit depending on the desired amount of deformation desired on the inner pilot recess wall 22

Figure 58:
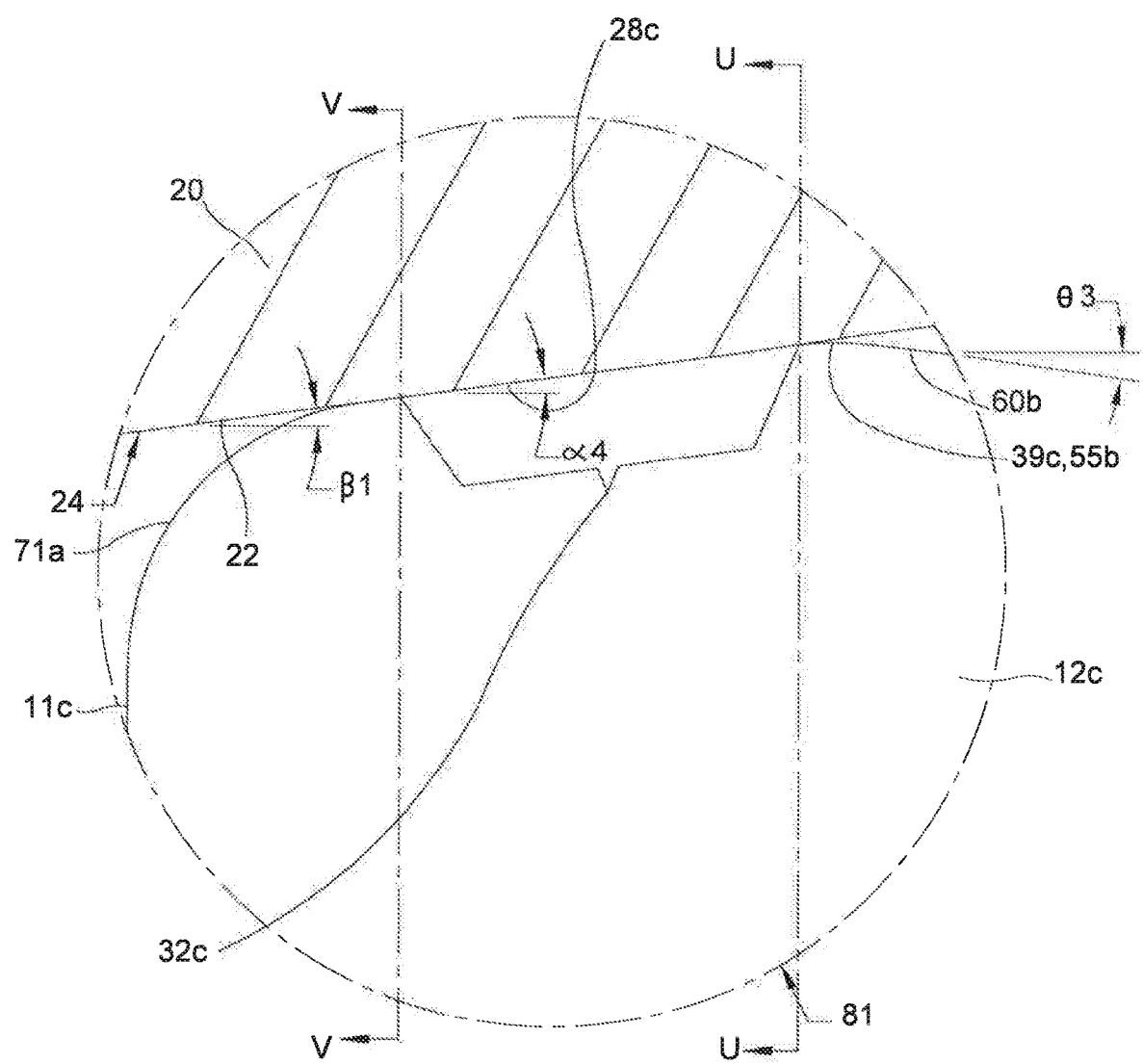
FIG. 58 is a cross-sectional view of a pilot end of the drive bit shown in FIGS. 42a-44, and 48a in accordance with an embodiment of the invention.

FIG. 58 is an enlarged view of the encircled portion 81 of FIG. 48a showing frictional engagement between bit end 12c and fastener 20 shown in FIG. 48a.

As shown in FIGS. 48a and 58, the bit 10c, having pilot end 12c that engages fastener 20 in the pilot recess 24 having piloted recess flats 35 on the internal pilot recess wall 22 and longitudinal axis 26. FIG. 48a shows a side cross sectional view of a top portion of the fastener 20 engaged with the pilot end 12c; FIG. 58 provides an enlarged view of the encircled portion 81 shown in FIG. 48a.

As shown in more detail in FIG. 58, the pilot end 12c outer leading wall 28c is tapered with respect to the pilot end longitudinal axis 30c to define a leading wall angle α4 having a plurality of leading wall angle values ranging within a leading wall angle tolerance band. Similarly, the inner pilot recess wall 22 is tapered with respect to the recess longitudinal axis 26 to define the recess wall angle θ1 having a plurality of recess wall angle values ranging within a recess wall angle tolerance band as discussed previously with respect to the fastener 20.

The plurality of leading wall angle values are equal to or are between a maximum leading wall angle value $α4_{max}$ and a minimum leading wall angle value $α4_{min}$; and wherein the plurality of recess wall angle values are equal to or are between a maximum recess wall angle value $\beta1_{max}$ and a minimum recess wall angle value $\beta1_{min}$.

As discussed previously with reference to bit ends 12, 12a, and 12b, a tolerance band gap exists between the leading wall angle tolerance band and the recess wall tolerance band, wherein the tolerance band gap is defined in an embodiment by a difference between $\beta1_{max}$ and $\alpha4_{min}$, wherein $\beta1_{max}$ equals $\alpha4_{min}$. When $\beta1_{max}$ and $\alpha4_{min}$ are equal, the respective leading wall angle tolerance band and the recess wall tolerance band do not overlap. If the tolerance band gap is equal to or greater than zero, then the leading wall tolerance angle band and the recess wall angle tolerance band do not overlap.

In an embodiment, shown in FIG. 58, the leading wall 28c of the pilot end 12c of the bit 10c is tapered at the angle $\alpha4$, which is less than or equal to the angle $\beta1$ of the inner pilot recess wall 22 of the fastener 20. The relationship between: these two tapers and the bit end radius 71a is what provides the frictional engagement at the targeted focal area.

In an embodiment, the difference between $\alpha4_{max}$ and $\beta1_{min}$, and the bit end radius 71a, causes the contact between leading wall 28c and internal pilot recess wall 22 to be in a targeted focal area. These variables ensure consistent contact at the targeted focal area, which is at the line of contact 32c only, when $\alpha4_{max}$ equals $\beta1_{min}$. More particularly, in an embodiment shown in FIG. 58, the $\beta1_{min}$ is equal to $\alpha4_{max}$ when the tolerance band gap is equal to zero, thereby ensuring that the tangent to the bit end radius 71a of the pilot end 12c contacts the inner pilot recess wall 22 only at the targeted focal area. When $\beta1_{min}$ is equal to $\alpha4_{max}$, the targeted focal area extends longitudinally as the line of contact 32c between cross section line V-V, wherein the cross section line V-V is the tangent of the bit end radius 71a to both the leading wall 28c and the inner pilot recess wall 22, to the cross section line U-U, wherein the cross section line U-U is the tangent of the apex radius 55b to both the leading wall 28c and the inner pilot recess wall 22. Since the tolerance band gap is equal to zero, then there cannot be an overlap of the angles $\alpha4$ and $\beta1$.

However, if $\alpha4_{max}$ is not equal to but is less than $\beta1_{min}$, then a point of contact instead of a line of contact occurs where the tangent of the bit radius 71a contacts the recess wall 22 at the flats 35 as disclosed previously with respect to FIGS. 48-48b, 50a, and 50b and bit radius 71.

If the tolerance band gap is less than zero, then $\beta1_{min}$ is less than $\alpha4_{max}$ and then $\beta1_{min}$ would fall within the leading wall angle tolerance band and thus, there would be an overlap of the leading wall angle tolerance band with the recess wall angle tolerance band, which is undesirable and which could cause the leading wall 28c of the pilot end 12c to contact the inner pilot recess wall of the internal pilot recess 24 at another point or points other than at the targeted focal area.

In another embodiment of the invention, the minimum recess wall angle $\beta1_{min}$ is 0 percent greater than the maximum leading wall angle $\alpha4_{max}$ and the maximum recess wall angle $\beta1_{max}$ is 32 percent greater than the minimum leading wall angle $\alpha4_{min}$ as shown in the chart 7 below when the tolerance band gap is equal to zero.

CHART 7

| Leading Wall Angle $\alpha4$ | | Recess Wall Angle $\beta1$ | | % Difference ($\beta1_{min}$ − $\alpha4_{max}$)/$\beta1_{min}$ | % Difference ($\beta1_{max}$ − $\alpha4_{min}$)/$\beta1_{max}$ |
|---|---|---|---|---|---|
| $\alpha4_{max}$ | 7.25° | $\beta1_{max}$ | 7.75° | 0% | |
| $\alpha4_{min}$ | 5.25° | $\beta1_{min}$ | 7.25° | | 32% |
| $\alpha4$ Tolerance Band | 2.00° | $\beta1$ Tolerance Band | 0.50° | | |
| Tolerance Band Gap ($\alpha4_{max}$ = $\beta1_{min}$) | 0° | | | | |

As shown in Chart 7, the tolerance band gap in particular, is the difference between $\alpha4_{max}$ and $\beta1_{min}$, wherein $\alpha4_{max}=\beta1_{min}$, and thus, the tolerance band gap is zero (shown as 0°) and no overlap occurs between the leading wall angle tolerance band (2.00°, which is the maximum span for the angle values for leading wall angle $\alpha4$, i.e., $\alpha4_{min}<=\alpha4_{max}$) and the recess wall angle tolerance band (shown as 0.5°, which is the maximum span for the angle values for leading wall angle $\beta1$, i.e., $\beta1_{min}<=\beta1_{max}$).

In particular, as shown with respect to this non-limiting embodiment, the $\alpha4_{min}$ (5.25°) is less than or equal to $\alpha4_{max}$ (7.25°) and the leading wall angle tolerance band, 2.00°, is the difference between $\alpha1_{max}$, and $\alpha1_{min}$ (7.25°-5.25°, and the wherein the recess wall angle tolerance band, 0.50°, is the difference between $\beta1_{min}$ and $\beta1_{max}$ (7.75°-7.25°), In an embodiment of the invention, the tolerance band gap is the difference between $\alpha4_{max}$ and $\beta1_{min}$, wherein $\alpha4_{max}=\beta1_{min}$, thus $\alpha4_{max}$ (7.25°) is equal to $\beta1_{min}$(7.25°) by the amount of the tolerance band gap (0°).

In this embodiment, the minimum recess wall angle $\beta1_{min}$ (7.25°) is equal to maximum leading wall angle $\alpha4_{max}$ (7.25°) and the maximum recess wall angle $\beta1_{max}$ (7.75°) is 32 percent greater than the minimum leading wall angle (5.25°). However, the embodiment described with respect to Chart 1 is not limited to the specific values for the variables disclosed in the chart as the chart is for illustrative purposes only.

As shown in FIG. 58, pilot end 12c contacts the inner pilot recess wall 22 at a targeted focal area that defines the line of contact 32c. The line contact 32c is at a point of tangency of bit end radius 71a to both the leading wall 28c of the pilot end 12c and the inner pilot recess wall 22, which is a predefined nominal distance both axially outward from and longitudinally above the end surface 11c. The pilot end 12c engages the inner pilot recess wall 22 along the line of contact 32c, i.e., at the recess flat 35, to form a frictional engagement with the fastener 20. The level of frictional engagement at the targeted focal area can range between a friction fit up to a jam fit depending on the desired amount of deformation desired on the inner pilot recess wall 22.

The proportion of the area at the point or line of contact, i.e. the contact area at the targeted focal area between the inner pilot recess wall 22 and the leading wall 28c, to the circumference of the inner pilot recess wall 22 is greatest at the bottom of the recess and the proportion of the contact area to the circumference of the recess wall decreases as the pilot end 12c moves longitudinally upward in the interior pilot recess 24. Thus, as the contact area between the inner pilot recess wall 22 and leading wall 28c is greatest at the bottom of the interior pilot recess 24, there is greater frictional engagement if the pilot end 12c contacts the interior pilot recess 24 at the bottom of the recess than longitudinally towards the top of the recess.

In an embodiment, the trailing wall 60b is optional and has trailing wall angle θ2 (shown in FIG. 58) relative to the longitudinal axis 30c of the drive bit 10c that is greater than the leading wall angle α4 (shown in FIG. 58) and the recess wall angle β1. The angle θ2 exists to allow trailing wall 60b to form a back taper, thereby avoiding having the leading wall 28c contact recess wall 22 at another location other than at the recess flat 35 along the line of contact 32c.

FIGS. 48a, 58-60 show the frictional engagement between the pilot end 12c of the bit 10c and the pilot recess 24 of the fastener 20. As shown in FIGS. 48a, 58-60, the targeted focal area includes the line of contact 32c between cross section lines U-U and V-V as disclosed above, where the outer leading wall 28c contacts the inner pilot recess wall 22 at the pilot recess flats 35 (shown in FIG. 59b, 60b).

By providing a tolerance band gap of zero, the contact stress between the outer leading wall 28c and the inner pilot recess wall 22 at the flats 35 is distributed over the targeted focal area along the line of contact 32c, thereby reducing the stress concentrations when compared to the stress concentrations occurring in the flats 35 at points of contact 32b disclosed with respect to the bit 12b disclosed with reference to FIGS. 42a-50b.

Figure 59A:
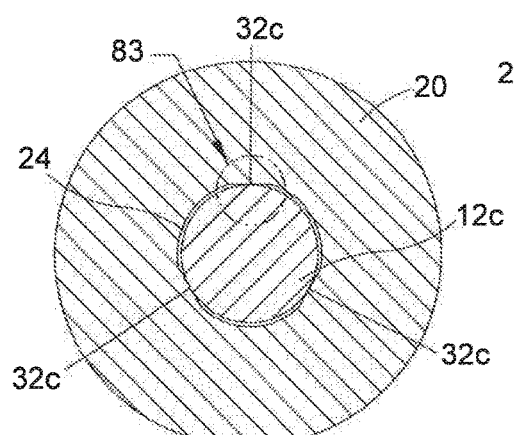
FIG. 59a is a cross-sectional view taken along line U-U of FIG. 58.
Figure 59B:
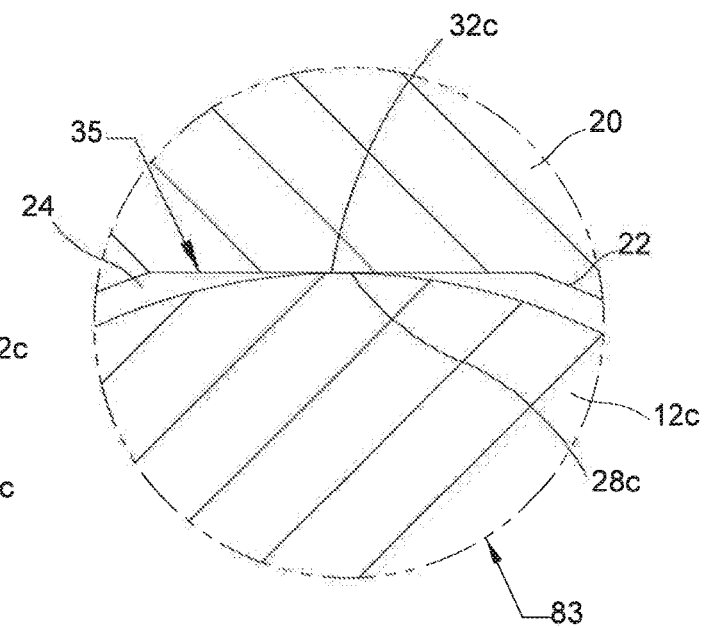

FIGS. 59a and 59b show more detailed views of the cross-sectional view taken along line U-U of FIG. 58. FIG. 59a is a cross-sectional view taken along line U-U of FIGS. 48b, and 59b is an enlarged view of the encircled portion 83 of FIG. 50. As shown in FIGS. 59a and 59b, the pilot end 12c contacts the fastener 20 across section U-U, at the pilot recess flats 35 of the pilot recess wall 22 of the pilot recess 24.

Figure 60A:
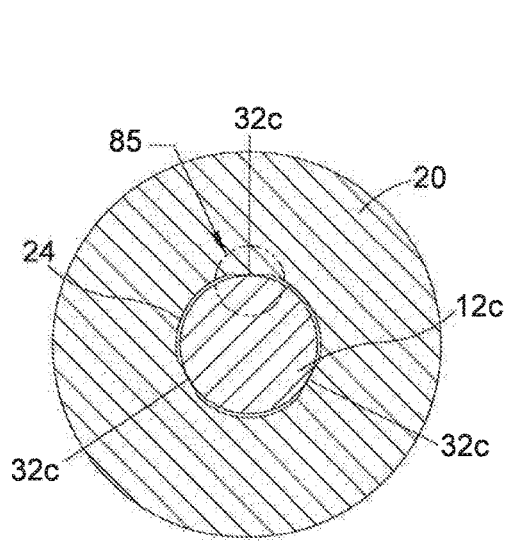
FIG. 60a is a cross-sectional view taken along line V-V of FIG. 58.
Figure 60B:
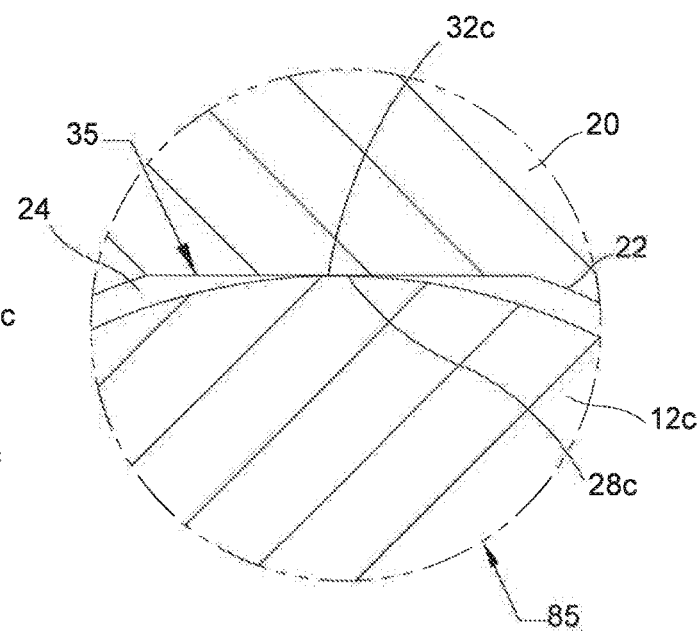

FIGS. 60a and 60b shows more detailed views of the cross-sectional view taken along line V-V of FIG. 58 on a plane further down in the pilot recess 24 than the plane of the line U-U shown in FIG. 58.

More specifically, FIG. 60a is a cross-sectional view taken along line V-V of FIGS. 58, and 60b is an enlarged view of the encircled portion 85 of FIG. 60b. FIGS. 60a and 60b show the contact points 32c between the leading wall 28c of the pilot end 12c of the drive bit 10c (shown in FIG. 50) and the pilot recess flat 35.

Because $\alpha 4_{max}$ equals $\beta 1_{min}$, there is no axial distance between the two tapered walls 22c, 28c as shown in FIG. 59a-60b along the line of contact 32c.

The foregoing description discussed the drive bit 10c engaging a pilot recess 24 having flats. However, the drive bit 10c can also be engaged with a fastener having an internal pilot recess that is round (i.e., in cross section, but tapers or is conical in terms of depth).

As such, FIG. 55a is equally applicable to the drive bit 10c shown in FIGS. 42a-42b, and 43 with regard to providing a single circumferential line of contact 54c, instead of at least one point of contact 32a. Much like the embodiments described previously, the drive bit 10c shown in FIGS. 42a-58, can engage many different pilot recess profiles. To this end, preferably the tapered pilot end 12c of the drive bit 10c engages a conical internal pilot recess 24aa having a round cross-section. The fastener recess 24a is the same as the fastener recess 24a disclosed with respect to FIGS. 16-18 above with like reference numbers shown for like elements as disclosed with respect to the fastener 20a, FIGS. 55a, 61 show the drive bit 10c engaged with the fastener 20a, wherein the fastener 20a is shown in cross-section (FIG. 55a), and FIG. 61 includes an enlarged view of encircled portion 87 shown in FIG. 55a.

As shown in FIGS. 55a and 61, the bit 10c (also shown in FIGS. 42a-43, and 55a) having pilot end 12c and the longitudinal axis 30c engaging the fastener 20a having the longitudinal axis 26a in the internal pilot recess 24aa (the internal pilot recess 24a shown engaged with the pilot end 12c in FIGS. 55a, 61-63b).

FIG. 61 is a cross-sectional view of a pilot end of the drive bit shown in FIGS. 42a-44, and 55a in accordance with an embodiment of the invention. As shown in more detail in FIG. 61, the pilot end 12b has a circumferential line of contact 54c that is the tangent of the bit end radius 71a to both the leading wall 28c and the inner pilot recess wall 22 that extends to the tangent of the apex radius 55b to both the leading wall 28c and the inner pilot recess wall 22a. The inner pilot recess wall 22a is tapered with respect to the recess longitudinal axis 26a to define a recess wall angle β2 having a plurality of recess wall angle values ranging within a recess wall angle tolerance band.

In an embodiment, as discussed with reference to FIG. 55b, the plurality of leading wall angle values are equal to or are between a maximum leading wall angle $\alpha 4_{max}$ and a minimum leading wall angle value $\alpha 4_{min}$. Similarly, in an embodiment shown in FIG. 61, the plurality of recess wall angle values are equal to or are between a maximum recess wall angle value $\beta 2_{max}$ and a minimum recess wall angle value $\beta 2_{min}$.

In an embodiment of the invention as shown in Chart 8, the recess wall angle β2 is the same as recess wall angle β1 as disclosed with reference to Chart 7, and the recess wall angle tolerance band for the recess wall angle β2 is the same as the recess wall angle tolerance band for the recess wall angle β1, and wherein $\beta 2_{min}$ equals $\beta 1_{min}$ and $\beta 2_{max}$ equals $\beta 1_{max}$.

Thus, as all of the angle values for α4, and β2, as well as their associated tolerance bands and tolerance band gaps are the same, the discussion above with regard to Chart 7 for bit 12c and internal pilot recess 24 equally applies to Chart 8 below, which is a tolerance band gap chart for bit 12c and internal pilot recess 24a.

CHART 8

| Leading Wall Angle α4 | | Recess Wall Angle β2 | | % Difference ($\beta 2_{min}$ − $\alpha 4_{max}$)/$\beta 2_{min}$ | % Difference ($\beta 2_{max}$ − $\alpha 4_{min}$)/$\beta 2_{max}$ |
|---|---|---|---|---|---|
| $\alpha 4_{max}$ | 7.25° | $\beta 2_{max}$ | 7.75° | 0% | |
| $\alpha 4_{min}$ | 5.25° | $\beta 2_{min}$ | 7.25° | | 32% |
| α4 Tolerance Band | 2.00° | β2 Tolerance Band | 0.50° | | |
| Tolerance Band Gap ($\alpha 4_{max}$ = $\beta 2_{min}$) | 0° | | | | |

As shown in FIGS. 55a, 61 pilot end 12c contacts the inner pilot recess wall 22a at a targeted focal area that defines the circumferential line of contact 54c. The line contact 32c is at a point of tangency of bit end radius 71a to both the leading wall 28c of the pilot end 12c and the inner pilot recess wall 22a, which is a predefined nominal distance both axially outward from and longitudinally above the end surface 11c. The pilot end 12c engages the inner pilot recess wall 22a along the circumferential line of contact 54c to form a frictional engagement with the fastener 20. The level of frictional engagement at the targeted focal area can range between a friction fit up to a jam fit depending on the desired amount of deformation desired on the inner pilot recess wall 22a.

The proportion of the area at the point or line of contact, i.e. the contact area at the targeted focal area between the inner pilot recess wall 22a and the leading wall 28c, to the circumference of the inner pilot recess wall 22a is greatest at the bottom of the recess and the proportion of the contact area to the circumference of the recess wall decreases as the pilot end 12c moves longitudinally upward in the interior pilot recess 24a. Thus, as the contact area between the inner pilot recess wall 22a and leading wall 28c is greatest at the bottom of the interior pilot recess 24a, there is greater frictional engagement if the pilot end 12c contacts the interior pilot recess 24a at the bottom of the recess than longitudinally towards the top of the recess.

In an embodiment, the trailing wall 60b is optional and has trailing wall angle θ2 (shown in FIG. 61) relative to the longitudinal axis 30c of the drive bit 10c that is greater than the leading wall angle α4 (shown in FIG. 61) and the recess wall angle β1. The angle θ2 exists to allow trailing wall 60b to form a back taper, thereby avoiding having the leading wall 28c contact recess wall 22a at another location other than at the recess flat 35 along the circumferential line of contact 54c.

FIGS. 55a, 61-63b show the frictional engagement between the pilot end 12c of the bit 10c and the pilot recess 24a of the fastener 20a. As shown in FIGS. 55a, 61-63b, the targeted focal area includes the circumferential line of contact 54c between cross section lines X-X and W-W as disclosed above, where the outer leading wall 28c contacts the inner pilot recess wall 22a along the circumferential line of contact 54c (shown in FIG. 61-63b).

By providing a tolerance band gap of zero, the contact stress between the outer leading wall 28c and the inner pilot recess wall 22a is distributed over the targeted focal area along the circumferential line of contact 54c, thereby reducing the stress concentrations when compared to the stress concentrations occurring in circumferential line of contact 54b disclosed with respect to the bit 12b disclosed with reference to FIGS. 55a-60b.

Figure 62A:
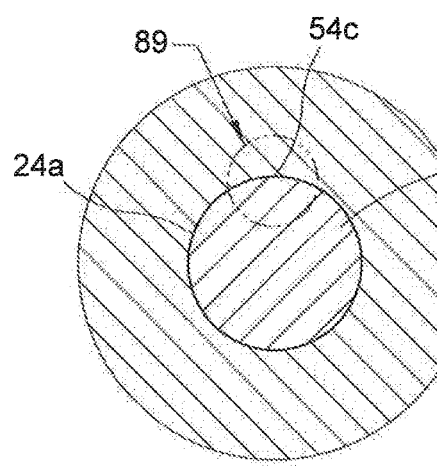
FIG. 62a is a cross-sectional view taken along line W-W of FIG. 61.
Figure 62B:
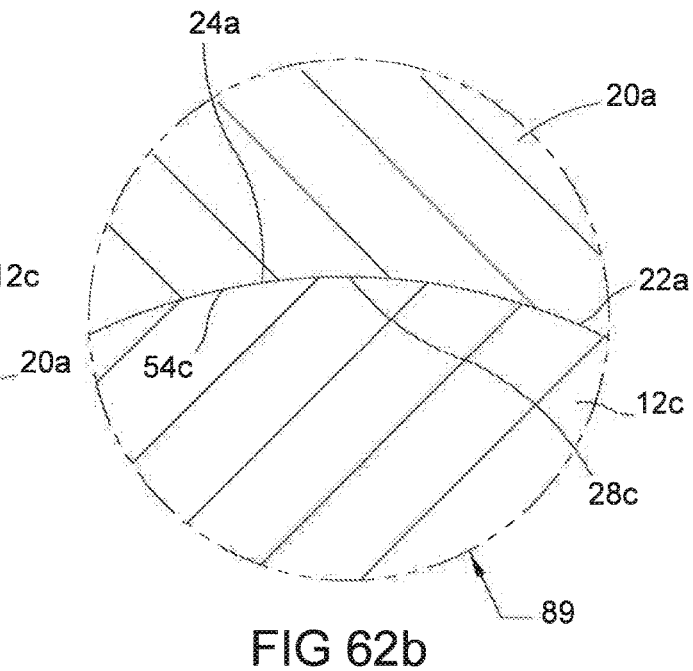

FIGS. 62a and 62b show more detailed views of the cross-sectional view taken along line W-W of FIG. 61. FIG. 62a is a cross-sectional view taken along line W-W of FIGS. 61, and 62b is an enlarged view of the encircled portion 89 of FIG. 62a. As shown in FIGS. 62a and 62b, the pilot end 12c contacts the fastener 20a across section W-W at the internal pilot recess wall 22a of the pilot recess 24a.

FIGS. 63a and 63b show more detailed views of the cross-sectional view taken along line X-X of FIG. 61 on a plane further down in the pilot recess 24a than the plane of the line W-W shown in FIG. 61.

More specifically, FIG. 63a is a cross-sectional view taken along line X-X of FIGS. 61, and 63b is an enlarged view of the encircled portion 91 of FIG. 63b. FIGS. 63a and 63b show circumferential line of contact 54c between the leading wall 28c of the pilot end 12c of the drive bit 10c and the pilot recess wall 22a.

Because $\alpha 4_{max}$ equals $\beta 1_{min}$, there is no axial distance between the two tapered walls 22a, 28c as shown in FIG. 55a, 61-63b along the circumferential line of contact 54c While specific embodiments of the invention have been shown and described, it is envisioned that those skilled in the art may devise various modifications without departing from the spirit and scope of the present invention.

What is claimed is:

1. A drive system comprising:
  a drive bit comprising a drive portion and a pilot end which extends from the drive portion and ends at a pilot end surface, the drive bit comprising
    a pilot end longitudinal axis, and
    an outer leading wall that is tapered with respect to the pilot end longitudinal axis to define a leading wall angle selected from a plurality of leading wall angle values ranging within a leading wall angle tolerance band; and
  a fastener having
    an internal pilot recess that receives the drive bit, the internal pilot recess having a recess longitudinal axis, and
    an inner pilot recess wall that is tapered with respect to the recess longitudinal axis to define a recess wall angle selected from a plurality of recess wall angle values ranging within a recess wall angle tolerance band,
  wherein the plurality of leading wall angles within the leading wall angle tolerance band and the plurality of recess wall angles within the recess wall angle tolerance band do not overlap when the outer leading wall of the pilot end contacts the inner pilot recess wall along a circumferential line of contact at a targeted focal area at a bottom of the outer leading wall proximate the pilot end surface to achieve a desired level of frictional engagement between the pilot end and the fastener wherein the outer leading wall has a circular cross section at the targeted focal area to provide the desired level of frictional engagement between the pilot end and the fastener.

2. The drive system of claim 1, wherein the plurality of leading wall angle values are equal to or are between a maximum leading wall angle and a minimum leading wall angle; and wherein the plurality of recess wall angle values are equal to or are between a maximum recess wall angle and a minimum recess wall angle, wherein there is no overlap of the plurality of leading wall angle values within the leading wall angle tolerance band with the plurality of recess wall angle values within the recess wall angle tolerance band when the minimum leading wall angle is greater than but not equal the maximum recess wall angle.

3. The drive system of claim 1, wherein the plurality of leading wall angle values are equal to or are between a maximum leading wall angle and a minimum leading wall angle; and wherein the plurality of recess wall angle values are equal to or are between a maximum recess wall angle and a minimum recess wall angle, wherein there is no overlap of the plurality of leading wall angles values within the leading wall angle tolerance band with the plurality of recess wall angle values within the recess wall angle tolerance band when the minimum recess wall angle is less than but not equal to the maximum leading wall angle.

4. The drive system of claim 1, further comprising
  wherein the plurality of leading wall angle values are equal to or are between a maximum leading wall angle and a minimum leading wall angle; and wherein the plurality of recess wall angle values are equal to or are between a maximum recess wall angle and a minimum recess wall angle, wherein there is no overlap of the plurality of leading wall angles values within the leading wall angle tolerance band with the plurality of recess wall angle values within the recess wall angle tolerance band when the minimum recess wall angle equals the maximum leading wall angle.

5. The drive system of claim 1, wherein the leading wall angle is greater than the recess wall angle.

6. The drive system of claim 5, wherein a minimum leading wall angle is 0.13 percent greater than the maximum recess wall angle and the maximum leading wall angle is 38 percent greater than a minimum recess wall angle.

7. The drive system of claim 5, wherein the pilot end further comprises:
an apex defined by a maximum diameter of the pilot end, wherein the apex contacts the inner pilot recess wall at the targeted focal area defining at least one point of contact between apex and the inner pilot recess wall.

8. The drive system of claim 7, wherein fastener recess further comprises:
at least one flat integrally formed with the inner pilot recess wall, wherein the apex contacts the at least one flat at the at least one point of contact.

9. The drive system of claim 8, wherein the inner pilot recess wall is conical and comprises a round cross-section, and wherein the apex contacts the inner pilot recess wall at the at least one point of contact to form a circumferential line of contact between the outer leading wall and the inner pilot recess wall.

10. The drive system of claim 1, wherein the pilot end further comprises:
an apex having an apex radius, wherein the targeted focal area is where a tangent of the apex radius longitudinally below the apex toward the pilot end surface contacts the inner pilot recess wall.

11. The drive system of claim 10, wherein pilot end further comprises:
a back trailing wall that extends from the apex longitudinally upward towards the drive portion at a back taper angle to form a back taper, wherein the back taper angle is greater than the leading wall angle and is greater than the recess wall angle, and wherein back taper angle prevents the outer leading wall from contacting the inner pilot recess wall at another point other than at the targeted focal area.

12. The drive system of claim 10, wherein fastener recess further comprises:
at least one flat integrally formed with the inner pilot recess wall, wherein the tangent of the apex radius contacts the at least one flat at the at least one point of contact.

13. The drive system of claim 10, wherein the inner pilot recess wall comprises a round circular cross-section, and
wherein the apex radius contacts the inner pilot recess wall at the at least one point of contact to form a circumferential line of contact between the outer leading wall and the inner pilot recess wall.

14. The drive system of claim 1, wherein the pilot end further comprises:
a bit end radius extending between the pilot end surface and a lower portion of the outer leading wall, wherein the targeted focal area is at a tangent of the bit end radius longitudinally above and away from the pilot end surface when the bit end radius contacts the inner pilot recess wall.

15. The drive system of claim 14, wherein fastener recess further comprises:
at least one flat integrally formed with the inner pilot recess wall, wherein the tangent of the bit end radius contacts the at least one flat at the at least one point of contact.

16. The drive system of claim 14, wherein the inner pilot recess wall is conical and comprises a round circular cross section, and wherein the bit end radius contacts the inner pilot recess wall at the at least one point of contact to form a circumferential line of contact between the outer leading wall and the inner pilot recess wall.

17. The drive system of claim 14, wherein the recess wall angle is greater than the leading wall angle.

18. The drive system of claim 17, wherein a minimum recess wall angle is 0.14 percent greater than a maximum leading wall angle and a maximum recess wall angle is 35 percent greater than a minimum leading wall angle.

19. The drive system of claim 14, wherein the recess wall angle is equal to the leading wall angle.

20. The drive system of claim 19, wherein a minimum recess wall angle is equal to a maximum leading wall angle and the maximum recess wall angle is 32 percent greater than a minimum leading wall angle.

21. The drive system of claim 1, wherein a proportion of contact area at the circumferential line of contact at the targeted focal area between the inner pilot recess wall and the outer leading wall to the circumference of the inner pilot recess wall is greatest at the bottom of the inner pilot recess, wherein the proportion of the contact area to the circumference of the inner pilot recess wall decreases as the pilot end moves longitudinally upward in the interior pilot recess.

22. A drive system comprising:
a drive bit comprising a drive portion and a pilot end which extends from the drive portion and ends at a pilot end surface, the drive bit comprising
a pilot end longitudinal axis, and
an outer leading wall that is tapered with respect to the pilot end longitudinal axis to define a leading wall angle; and
a fastener having
an internal pilot recess that receives the drive bit, the internal pilot recess having a recess longitudinal axis, and
an inner pilot recess wall that is tapered with respect to the recess longitudinal axis to define a recess wall angle, wherein the leading wall angle of the drive bit is greater than the recess wall angle of the inner pilot recess wall,
wherein the outer leading wall of the pilot end contacts the inner pilot recess wall along a circumferential line of contact at a targeted focal area at a bottom of the outer leading wall, proximate the pilot end surface, to achieve a desired level of frictional engagement between the pilot end and the fastener, wherein the outer leading wall has a circular cross section at the targeted focal area to provide the desired level of frictional engagement between the pilot end and the fastener.

* * * * *